(12) United States Patent
Kern et al.

(10) Patent No.: US 8,495,098 B1
(45) Date of Patent: Jul. 23, 2013

(54) METHOD AND SYSTEM FOR TRANSFORMING AND STORING DIGITAL CONTENT

(75) Inventors: Frederick A. Kern, Cedar Park, TX (US); Albert Leo McGuill, III, Austin, TX (US); William Joseph Champ, Leander, TX (US); Matthew Paul Bush, Austin, TX (US)

(73) Assignee: Libredigital, Inc., Austin, TX (US)

( * ) Notice: Subject to any disclaimer, the term of this patent is extended or adjusted under 35 U.S.C. 154(b) by 0 days.

(21) Appl. No.: 13/220,870

(22) Filed: Aug. 30, 2011

Related U.S. Application Data

(60) Provisional application No. 61/402,502, filed on Aug. 31, 2010, provisional application No. 61/402,543, filed on Aug. 31, 2010.

(51) Int. Cl.
*G06F 7/00* (2006.01)
*G06F 17/30* (2006.01)

(52) U.S. Cl.
USPC ............................ 707/793; 707/796; 707/804

(58) Field of Classification Search
USPC .......................................... 707/793, 796, 804
See application file for complete search history.

(56) References Cited

U.S. PATENT DOCUMENTS

| 8,370,956 B2 * | 2/2013 | Stefik et al. ..................... 726/29 |
| 2010/0070753 A1 * | 3/2010 | Kido et al. ..................... 713/150 |
| 2012/0278622 A1 * | 11/2012 | Lesavich et al. .............. 713/168 |

OTHER PUBLICATIONS

Adobe, Preliminary Mars File Format Specification, Version 0.8.0, Apr. 23, 2007, Adobe Systems Incorporated, San Jose, CA, 201 pgs.

* cited by examiner

*Primary Examiner* — Mariela Reyes
(74) *Attorney, Agent, or Firm* — Sprinkle IP Law Group

(57) ABSTRACT

Embodiments of systems and methods disclosed may serve to normalize digital content into a canonical format to in a way that decouples the digital content from a format that may be required by consuming devices. Specifically, certain embodiments may create a container for storing the digital content and store structured representations and metadata associated with that digital content in that container.

21 Claims, 116 Drawing Sheets

*FIG. 2*

| Directory / file name |
|---|
| LDFX/ —202<br>    mimetype —204<br>    backbone.xml —206<br>    META-INF/ —208<br>        metadata.xml —210<br>    page/ —212<br>        x/ —214<br>            info.xml —216<br>            metadata.xml —218<br>            pg.xml —220<br>            reflow.svg —222<br>            image/ —224<br>                pg.tif —226<br>            pdf/ —228<br>                pg_parse.pdf —230<br>                pg.pdf —232<br>                pg_swf.pdf —234<br>            swf/ —236<br>                pg.swf —238<br>    file/ —240 |

200

*FIG. 3B* attribute Page/@x1

| type | restriction of xs:decimal |
|---|---|
| properties | isRef   0<br>use   required |
| source | `<xs:attribute name="x1" use="required">`<br>  `<xs:simpleType>`<br>    `<xs:restriction base="xs:decimal"/>`<br>  `</xs:simpleType>`<br>`</xs:attribute>` | attribute Page/@x2

| type | restriction of xs:decimal |
|---|---|
| properties | isRef   0<br>use   required |
| source | `<xs:attribute name="x2" use="required">`<br>  `<xs:simpleType>`<br>    `<xs:restriction base="xs:decimal"/>`<br>  `</xs:simpleType>`<br>`</xs:attribute>` | attribute Page/@y1

| type | restriction of xs:decimal |
|---|---|
| properties | isRef   0<br>use   required |
| source | `<xs:attribute name="y1" use="required">`<br>  `<xs:simpleType>`<br>    `<xs:restriction base="xs:decimal"/>`<br>  `</xs:simpleType>`<br>`</xs:attribute>` | attribute Page/@y2

| type | restriction of xs:decimal |
|---|---|
| properties | isRef   0<br>use   required |
| source | `<xs:attribute name="y2" use="required">`<br>  `<xs:simpleType>`<br>    `<xs:restriction base="xs:decimal"/>`<br>  `</xs:simpleType>`<br>`</xs:attribute>` | attribute Page/@src

| type | restriction of xs:string |
|---|---|
| properties | isRef   0<br>use   required |
| source | `<xs:attribute name="src" use="required">`<br>  `<xs:simpleType>`<br>    `<xs:restriction base="xs:string"/>`<br>  `</xs:simpleType>`<br>`</xs:attribute>` |

FIG. 3C element Pages

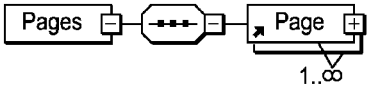

| diagram | |
|---|---|
| properties | content complex |
| children | Page |
| used by | element PDF |
| source | `<xs:element name="Pages">`<br>  `<xs:complexType>`<br>    `<xs:sequence>`<br>      `<xs:element ref="Page" maxOccurs="unbounded"/>`<br>    `</xs:sequence>`<br>  `</xs:complexType>`<br>`</xs:element>` | element PDF

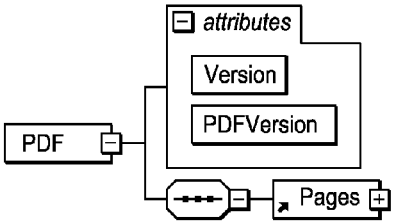

| diagram | | | | | | |
|---|---|---|---|---|---|---|
| properties | content complex | | | | | |
| children | Pages | | | | | |
| attributes | Name | Type | Use | Default | Fixed | annotation |
| | Version | derived by: xs:string | required | | | |
| | PDFVersion | derived by: xs:decimal | required | | | |
| source | `<xs:element name="PDF">`<br>  `<xs:complexType>`<br>    `<xs:sequence>`<br>      `<xs:element ref="Pages"/>`<br>    `</xs:sequence>`<br>    `<xs:attribute name="Version" use="required">`<br>      `<xs:simpleType>`<br>        `<xs:restriction base="xs:string"/>`<br>      `</xs:simpleType>`<br>    `</xs:attribute>`<br>    `<xs:attribute name="PDFVersion" use="required">`<br>      `<xs:simpleType>`<br>        `<xs:restriction base="xs:decimal"/>`<br>      `</xs:simpleType>`<br>    `</xs:attribute>`<br>  `</xs:complexType>`<br>`</xs:element>` | | | | | |

*FIG. 3D* attribute PDF/@Version

| type | restriction of xs:string |
|---|---|
| properties | isRef  0<br>use  required |
| source | `<xs:attribute name="Version" use="required">`<br>  `<xs:simpleType>`<br>    `<xs:restriction base="xs:string"/>`<br>  `</xs:simpleType>`<br>`</xs:attribute>` | attribute PDF/@PDFVersion

| type | restriction of xs:decimal |
|---|---|
| properties | isRef  0<br>use  required |
| source | `<xs:attribute name="PDFVersion" use="required">`<br>  `<xs:simpleType>`<br>    `<xs:restriction base="xs:decimal"/>`<br>  `</xs:simpleType>`<br>`</xs:attribute>` |

*FIG. 4A* element beid

| diagram | beid |
|---|---|
| type | T_beid |
| properties | content    simple |
| used by | complexType    T_bookinfo |
| source | <xs:element name="beid" type="T_beid"/> | element bookinfo

| diagram | T_bookinfo: bookinfo → beid, isbn, onix-product-id |
|---|---|
| type | T_bookinfo |
| properties | content    complex |
| children | beid isbn onix-product-id |
| used by | complexType    T_work |
| source | <xs:element name="bookinfo" type="T_bookinfo"/> |

*FIG. 4C* element group

| diagram | |
|---|---|
| type | T_group |
| properties | content    complex |
| used by | complexType   T_flow |
| attributes | Name         Type                    Use        Default    Fixed    annotation<br>id           derived by:             required<br>             xs:string |
| source | `<xs:element name="group" type="T_group"/>` | element id

| diagram | id |
|---|---|
| type | T_id |
| properties | content    simple |
| used by | complexType   T_workinfo |
| source | `<xs:element name="id" type="T_id"/>` | element isbn

| diagram | isbn |
|---|---|
| type | T_isbn |
| properties | content    simple |
| used by | complexType   T_bookinfo |
| source | `<xs:element name="isbn" type="T_isbn"/>` |

*FIG. 4D* element issn

| | |
|---|---|
| diagram | 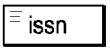 |
| type | T_issn |
| properties | content    simple |
| used by | complexType    T_issueinfo |
| source | `<xs:element name="issn" type="T_issn"/>` | element issue-id

| | |
|---|---|
| diagram | |
| type | T_issue-id |
| properties | content    simple |
| used by | complexType    T_issueinfo |
| source | `<xs:element name="issue-id" type="T_issue-id"/>` | element issueinfo

| | |
|---|---|
| diagram | 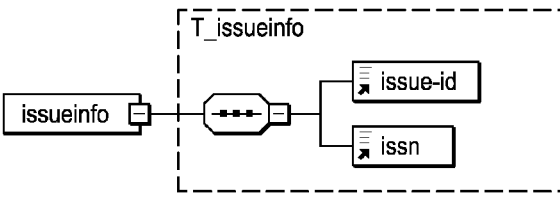 |
| type | T_issueinfo |
| properties | content    complex |
| children | issue-id issn |
| used by | complexType    T_work |
| source | `<xs:element name="issueinfo" type="T_issueinfo"/>` |

*FIG. 4E* element language

| diagram | language |
|---|---|
| type | T language |
| properties | content    simple |
| used by | complexType    T work |
| source | `<xs:element name="language" type="T_language"/>` | element language-id

| diagram | language-id |
|---|---|
| type | T language-id |
| properties | content    simple |
| used by | complexType    T work |
| source | `<xs:element name="language-id" type="T_language-id"/>` | element metadata

| diagram | T_metadata: metadata → work, sections, surfaces |
|---|---|
| type | T metadata |
| properties | content    complex |
| children | work sections surfaces |
| source | `<xs:element name="metadata" type="T_metadata"/>` |

*FIG. 4F* element onix-product-id

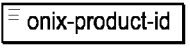

| | |
|---|---|
| diagram | onix-product-id |
| type | T onix-product-id |
| properties | content    simple |
| used by | complexType    T bookinfo |
| source | <xs:element name="onix-product-id" type="T_onix-product-id"/> | element publish-date

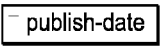

| | |
|---|---|
| diagram | publish-date |
| type | T publish-date |
| properties | content    simple |
| used by | complexType    T work |
| source | <xs:element name="publish-date" type="T_publish-date"/> | element publisher

| | |
|---|---|
| diagram | publisher |
| type | T publisher |
| properties | content    simple |
| used by | complexType    T work |
| source | <xs:element name="publisher" type="T_publisher"/> |

*FIG. 4G* element flow

| diagram | |
|---|---|
| | T_section with attributes (name, id) and surface (1..∞) — section |
| type | T section |
| properties | content    complex |
| children | surface |
| used by | complexType    T sections |
| attributes | Name    Type    Use    Default    Fixed    annotation<br>name    derived by: xs:string    required<br>id    derived by: xs:string    required |
| source | `<xs:element name="section" type="T_section"/>` | element sections

| diagram | |
|---|---|
| | T_sections — sections, section (0..∞) |
| type | T sections |
| properties | content    complex |
| children | section |
| used by | complexType    T metadata |
| source | `<xs:element name="sections" type="T_sections"/>` |

*FIG. 4H* element surface

| | |
|---|---|
| diagram | (diagram showing surface element with T_surface type, attributes: imposition, id, alpha, and flow child 0..∞) |
| type | T surface |
| properties | content    complex |
| children | flow |
| used by | complexType    T section  T surfaces |
| attributes | Name         Type              Use       Default   Fixed   annotation <br> imposition   derived by: xs:string <br> id           derived by: xs:string   required <br> alpha        derived by: xs:string |
| source | `<xs:element name="surface" type="T_surface"/>` | element surfaces

| | |
|---|---|
| diagram | (diagram showing sections element with T_surfaces type containing surface 0..∞) |
| type | T surfaces |
| properties | content    complex |
| children | surface |
| used by | complexType    T metadata |
| source | `<xs:element name="surfaces" type="T_surfaces"/>` |

*FIG. 4I*
element title
element type
element vend-date
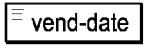

FIG. 4K element workinfo

| diagram | T_workinfo — workinfo — id |
|---|---|
| type | T_workinfo |
| properties | content complex |
| children | id |
| used by | complexType T_work |
| source | `<xs:element name="workinfo" type="T_workinfo"/>` | complexType T_bookinfo

| diagram | T_bookinfo — beid, isbn, onix-product-id |
|---|---|
| children | beid isbn onix-product-id |
| used by | element bookinfo |
| source | `<xs:complexType name="T_bookinfo">`<br>  `<xs:sequence>`<br>    `<xs:element ref="beid"/>`<br>    `<xs:element ref="isbn"/>`<br>    `<xs:element ref="onix-product-id"/>`<br>  `</xs:sequence>`<br>`</xs:complexType>` |

*FIG. 4L*

| complexType T_flow | |
|---|---|
| diagram | |
| children | group |
| used by | element flow |
| attributes | Name    Type    Use    Default    Fixed    annotation<br>type    derived by: xs:string<br>section    derived by: xs:string<br>id    derived by: xs:string    required |
| source | ```xml
<xs:complexType name="T_flow">
  <xs:sequence>
    <xs:element ref="group" minOccurs="0" maxOccurs="unbounded"/>
  </xs:sequence>
  <xs:attribute name="type">
    <xs:simpleType>
      <xs:restriction base="xs:string"/>
    </xs:simpleType>
  </xs:attribute>
  <xs:attribute name="section">
    <xs:simpleType>
      <xs:restriction base="xs:string"/>
    </xs:simpleType>
  </xs:attribute>
  <xs:attribute name="id" use="required">
    <xs:simpleType>
      <xs:restriction base="xs:string"/>
    </xs:simpleType>
  </xs:attribute>
</xs:complexType>
``` |

FIG. 4M attribute T_flow/@type

| type | restriction of xs:string |
|---|---|
| properties | isRef    0 |
| source | `<xs:attribute name="type">`<br>  `<xs:simpleType>`<br>    `<xs:restriction base="xs:string"/>`<br>  `</xs:simpleType>`<br>`</xs:attribute>` | attribute T_flow/@section

| type | restriction of xs:string |
|---|---|
| properties | isRef    0 |
| source | `xs:attribute name="section">`<br>  `<xs:simpleType>`<br>    `<xs:restriction base="xs:string"/>`<br>  `</xs:simpleType>`<br>`</xs:attribute>` | attribute T_flow/@id

| type | restriction of xs:string |
|---|---|
| properties | isRef    0<br>use       required |
| source | `<xs:attribute name="id" use="required">`<br>  `<xs:simpleType>`<br>    `<xs:restriction base="xs:string"/>`<br>  `</xs:simpleType>`<br>`</xs:attribute>` |

*FIG. 4N* complexType T_group

| diagram | |
|---|---|
| | T_group — attributes — id |
| used by | element group |
| attributes | Name · Type · Use · Default · Fixed · annotation<br>id · derived by: xs:string · required |
| source | `<xs:complexType name="T_group">`<br>  `<xs:attribute name="id" use="required">`<br>   `<xs:simpleType>`<br>    `<xs:restriction base="xs:string"/>`<br>   `</xs:simpleType>`<br>  `</xs:attribute>`<br>`</xs:complexType>` | attribute T_group/@id

| type | restriction of xs:string |
|---|---|
| properties | isRef 0<br>use required |
| source | `<xs:attribute name="id" use="required">`<br>  `<xs:simpleType>`<br>   `<xs:restriction base="xs:string"/>`<br>  `</xs:simpleType>`<br>`</xs:attribute>` | complexType T_issueinfo

| diagram | |
|---|---|
| | T_issueinfo — issue-id / issn |
| children | issue-id issn |
| used by | element issueinfo |
| source | `<xs:complexType name="T_issueinfo">`<br>  `<xs:sequence>`<br>   `<xs:element ref="issue-id"/>`<br>   `<xs:element ref="issn"/>`<br>  `</xs:sequence>`<br>`</xs:complexType>` |

*FIG. 4O* complexType T_metadata

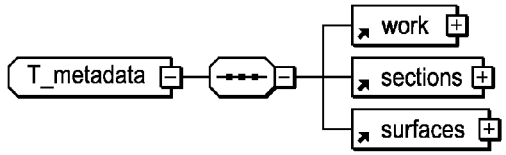

| diagram | |
|---|---|
| children | work sections surfaces |
| used by | element metadata |
| source | `<xs:complexType name="T_metadata">`<br>  `<xs:sequence>`<br>    `<xs:element ref="work"/>`<br>    `<xs:element ref="sections"/>`<br>    `<xs:element ref="surfaces"/>`<br>  `</xs:sequence>`<br>`</xs:complexType>` | complexType T_section

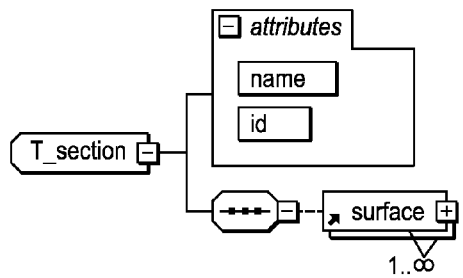

| | | | | | | |
|---|---|---|---|---|---|---|
| diagram | | | | | | |
| children | surface | | | | | |
| used by | element section | | | | | |
| attributes | Name | Type | Use | Default | Fixed | annotation |
| | name | derived by: xs:string | required | | | |
| | id | derived by: xs:string | required | | | |
| source | `<xs:complexType name="T_section">`<br>  `<xs:sequence>`<br>    `<xs:element ref="surface" maxOccurs="unbounded"/>`<br>  `</xs:sequence>`<br>  `<xs:attribute name="name" use="required">`<br>    `<xs:simpleType>`<br>      `<xs:restriction base="xs:string"/>`<br>    `</xs:simpleType>`<br>  `</xs:attribute>`<br>  `<xs:attribute name="id" use="required">`<br>    `<xs:simpleType>`<br>      `<xs:restriction base="xs:string"/>`<br>    `</xs:simpleType>`<br>  `</xs:attribute>`<br>`</xs:complexType>` | | | | | |

*FIG. 4P* attribute T_section/@name

| type | restriction of xs:string |
|---|---|
| properties | isRef 0<br>use required |
| source | `<xs:attribute name="name" use="required">`<br>  `<xs:simpleType>`<br>    `<xs:restriction base="xs:string"/>`<br>  `</xs:simpleType>`<br>`</xs:attribute>` | attribute T_section/@id

| type | restriction of xs:string |
|---|---|
| properties | isRef 0<br>use required |
| source | `<xs:attribute name="id" use="required">`<br>  `<xs:simpleType>`<br>    `<xs:restriction base="xs:string"/>`<br>  `</xs:simpleType>`<br>`</xs:attribute>` | complexType T_sections

| diagram | T_sections — section 0..∞ |
|---|---|
| children | section |
| used by | element sections |
| source | `<xs:complexType name="T_sections">`<br>  `<xs:sequence>`<br>    `<xs:element ref="section" minOccurs="0" maxOccurs="unbounded"/>`<br>  `</xs:sequence>`<br>`</xs:complexType>` |

*FIG. 4Q* complexType T_surface

| diagram | |
|---|---|
| children | flow |
| used by | element surface |
| attributes | Name Type Use Default Fixed annotation<br>imposition derived by: xs:string<br>id derived by: xs:string required<br>alpha derived by: xs:string |
| source | `<xs:complexType name="T_surface">`<br>`  <xs:sequence>`<br>`    <xs:element ref="flow" minOccurs="0" maxOccurs="unbounded"/>`<br>`  </xs:sequence>`<br>`  <xs:attribute name="imposition">`<br>`    <xs:simpleType>`<br>`      <xs:restriction base="xs:string">`<br>`        <xs:enumeration value="left"/>`<br>`        <xs:enumeration value="right"/>`<br>`      </xs:restriction>`<br>`    </xs:simpleType>`<br>`  </xs:attribute>`<br>`  <xs:attribute name="id" use="required">`<br>`    <xs:simpleType>`<br>`      <xs:restriction base="xs:string"/>`<br>`    </xs:simpleType>`<br>`  </xs:attribute>`<br>`  <xs:attribute name="alpha">`<br>`    <xs:simpleType>`<br>`      <xs:restriction base="xs:string"/>`<br>`    </xs:simpleType>`<br>`  </xs:attribute>`<br>`</xs:complexType>` |

FIG. 4R attribute T_surface/@imposition

| type | restriction of xs:string |
|---|---|
| properties | isRef 0 |
| facets | Kind        Value       annotation<br>enumeration  left<br>enumeration  right |
| source | `<xs:attribute name="imposition">`<br>  `<xs:simpleType>`<br>    `<xs:restriction base="xs:string">`<br>      `<xs:enumeration value="left"/>`<br>      `<xs:enumeration value="right"/>`<br>    `</xs:restriction>`<br>  `</xs:simpleType>`<br>`</xs:attribute>` | attribute T_surface/@id

| type | restriction of xs:string |
|---|---|
| properties | isRef 0<br>use   required |
| source | `<xs:attribute name="id" use="required">`<br>  `<xs:simpleType>`<br>    `<xs:restriction base="xs:string"/>`<br>  `</xs:simpleType>`<br>`</xs:attribute>` | attribute T_surface/@alpha

| type | restriction of xs:string |
|---|---|
| properties | isRef 0 |
| source | `<xs:attribute name="alpha">`<br>  `<xs:simpleType>`<br>    `<xs:restriction base="xs:string"/>`<br>  `</xs:simpleType>`<br>`</xs:attribute>` | complexType T_surfaces

| diagram | 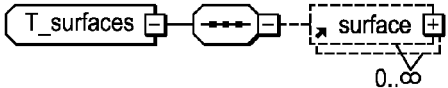 |
|---|---|
| children | surface |
| used by | element   surfaces |
| source | `<xs:complexType name="T_surfaces">`<br>  `<xs:sequence>`<br>    `<xs:element ref="surface" minOccurs="0" maxOccurs="unbounded"/>`<br>  `</xs:sequence>`<br>`</xs:complexType>` |

*FIG. 4S* complexType T_work

| | |
|---|---|
| diagram | T_work contains sequence of: type, workinfo, choice(issueinfo, bookinfo), title, publisher, language, language-id, publish-date, vend-date |
| children | type workinfo issueinfo bookinfo title publisher language language-id publish-date vend-date |
| used by | element work |
| source | ```<xs:complexType name="T_work"><br>  <xs:sequence><br>    <xs:element ref="type"/><br>    <xs:element ref="workinfo"/><br>    <xs:choice><br>      <xs:element ref="issueinfo"/><br>      <xs:element ref="bookinfo"/><br>    </xs:choice><br>    <xs:element ref="title"/><br>    <xs:element ref="publisher"/><br>    <xs:element ref="language"/><br>    <xs:element ref="language-id"/><br>    <xs:element ref="publish-date"/><br>    <xs:element ref="vend-date"/><br>  </xs:sequence><br></xs:complexType>``` |

*FIG. 4T*

| complexType T_workinfo | |
|---|---|
| diagram | 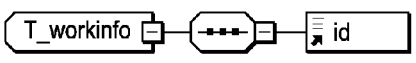 |
| children | id |
| used by | element workinfo |
| source | `<xs:complexType name="T_workinfo">`<br>  `<xs:sequence>`<br>    `<xs:element ref="id"/>`<br>  `</xs:sequence>`<br>`</xs:complexType>` | simpleType T_beid

| type | xs:string |
|---|---|
| used by | element beid |
| source | `<xs:simpleType name="T_beid">`<br>  `<xs:restriction base="xs:string"/>`<br>`</xs:simpleType>` | simpleType T_id

| type | xs:string |
|---|---|
| used by | element id |
| source | `<xs:simpleType name="T_id">`<br>  `<xs:restriction base="xs:string"/>`<br>`</xs:simpleType>` | simpleType T_isbn

| type | xs:string |
|---|---|
| used by | element isbn |
| source | `<xs:simpleType name="T_isbn">`<br>  `<xs:restriction base="xs:string"/>`<br>`</xs:simpleType>` |

FIG. 4U simpleType T_issn

| type | xs:string |
|---|---|
| used by | element   <u>issn</u> |
| source | `<xs:simpleType name="T_issn">`<br>  `<xs:restriction base="xs:string"/>`<br>`</xs:simpleType>` | simpleType T_issue-id

| type | xs:string |
|---|---|
| used by | element   <u>issue-id</u> |
| source | `<xs:simpleType name="T_issue-id">`<br>  `<xs:restriction base="xs:string"/>`<br>`</xs:simpleType>` | simpleType T_language

| type | xs:string |
|---|---|
| used by | element   <u>language</u> |
| source | `<xs:simpleType name="T_language">`<br>  `<xs:restriction base="xs:string"/>`<br>`</xs:simpleType>` | simpleType T_language-id

| type | xs:string |
|---|---|
| used by | element   <u>language-id</u> |
| source | `<xs:simpleType name="T_language-id">`<br>  `<xs:restriction base="xs:string"/>`<br>`</xs:simpleType>` | simpleType T_onix-product-id

| type | xs:string |
|---|---|
| used by | element   <u>onix-product-id</u> |
| source | `<xs:simpleType name="T_onix-product-id">`<br>  `<xs:restriction base="xs:string"/>`<br>`</xs:simpleType>` |

*FIG. 4V* simpleType T_publish-date

| type | xs:string |
|---|---|
| used by | element    publish-date |
| source | `<xs:simpleType name="T_publish-date">`<br>  `<xs:restriction base="xs:string"/>`<br>`</xs:simpleType>` | simpleType T_publisher

| type | xs:string |
|---|---|
| used by | element    publisher |
| source | `<xs:simpleType name="T_publisher">`<br>  `<xs:restriction base="xs:string"/>`<br>`</xs:simpleType>` | simpleType T_title

| type | xs:string |
|---|---|
| used by | element    title |
| source | `<xs:simpleType name="T_title">`<br>  `<xs:restriction base="xs:string"/>`<br>`</xs:simpleType>` | simpleType T_type

| type | restriction of xs:string |
|---|---|
| used by | element    type |
| facets | Kind          Value          annotation<br>enumeration    book<br>enumeration    magazine<br>enumeration    newspaper |
| source | `<xs:simpleType name="T_type">`<br>  `<xs:restriction base="xs:string">`<br>    `<xs:enumeration value="book"/>`<br>    `<xs:enumeration value="magazine"/>`<br>    `<xs:enumeration value="newspaper"/>`<br>  `</xs:restriction>`<br>`</xs:simpleType>` | simpleType T_vend-date

| type | xs:string |
|---|---|
| used by | element    vend-date |
| source | `<xs:simpleType name="T_vend-date">`<br>  `<xs:restriction base="xs:string"/>`<br>`</xs:simpleType>` |

FIG. 5A element Contents

| diagram | Contents ⊟ — attributes ⊟ src <br> Relative location to the reflow.svg (textual map) | | | | | |
|---|---|---|---|---|---|---|
| properties | content complex | | | | | |
| used by | element Page | | | | | |
| attributes | Name | Type | Use | Default | Fixed | annotation |
| | src | derived by: xs:string | required | | | |
| annotation | documentation <br> Relative location to the reflow.svg (textual map) | | | | | |
| source | `<xs:element name="Contents">` <br>   `<xs:annotation>` <br>     `<xs:documentation>`Relative location to the reflow.svg (textual map)`</xs:documentation>` <br>   `</xs:annotation>` <br>   `<xs:complexType>` <br>     `<xs:attribute name="src" use="required">` <br>       `<xs:simpleType>` <br>         `<xs:restriction base="xs:string"/>` <br>       `</xs:simpleType>` <br>     `</xs:attribute>` <br>   `</xs:complexType>` <br> `</xs:element>` | | | | | | attribute Contents/@src

| type | restriction of xs:string |
|---|---|
| properties | isRef   0 <br> use    required |
| source | `<xs:attribute name="src" use="required">` <br>   `<xs:simpleType>` <br>     `<xs:restriction base="xs:string"/>` <br>   `</xs:simpleType>` <br> `</xs:attribute>` |

*FIG. 5B*

| element CropBox | |
|---|---|
| diagram | CropBox — Surface bounds coordinates — attributes: x1, y1, x2, y2 |
| properties | content    complex |
| used by | element    Page |
| attributes | Name | Type | Use | Default | Fixed | annotation |
| | <u>x1</u> | derived by: xs:decimal | required | | | |
| | <u>y1</u> | derived by: xs:decimal | required | | | |
| | <u>x2</u> | derived by: xs:decimal | required | | | |
| | <u>y2</u> | derived by: xs:decimal | required | | | |
| annotation | documentation<br>Surface bounds coordinates |
| source | ```<br><xs:element name="CropBox"><br>  <xs:annotation><br>    <xs:documentation>Surface bounds coordinates</xs:documentation><br>  </xs:annotation><br>  <xs:complexType><br>    <xs:attribute name="x1" use="required"><br>      <xs:simpleType><br>        <xs:restriction base="xs:decimal"/><br>      </xs:simpleType><br>    </xs:attribute><br>    <xs:attribute name="y1" use="required"><br>      <xs:simpleType><br>        <xs:restriction base="xs:decimal"/><br>      </xs:simpleType><br>    </xs:attribute><br>    <xs:attribute name="x2" use="required"><br>      <xs:simpleType><br>        <xs:restriction base="xs:decimal"/><br>      </xs:simpleType><br>    </xs:attribute><br>    <xs:attribute name="y2" use="required"><br>      <xs:simpleType><br>        <xs:restriction base="xs:decimal"/><br>      </xs:simpleType><br>    </xs:attribute><br>  </xs:complexType><br></xs:element><br>``` |

*FIG. 5C* attribute CropBox/@x1

| type | restriction of xs:decimal |
|---|---|
| properties | isRef   0<br>use   required |
| source | `<xs:attribute name="x1" use="required">`<br>  `<xs:simpleType>`<br>    `<xs:restriction base="xs:decimal"/>`<br>  `</xs:simpleType>`<br>`</xs:attribute>` | attribute CropBox/@y1

| type | restriction of xs:decimal |
|---|---|
| properties | isRef   0<br>use   required |
| source | `<xs:attribute name="y1" use="required">`<br>  `<xs:simpleType>`<br>    `<xs:restriction base="xs:decimal"/>`<br>  `</xs:simpleType>`<br>`</xs:attribute>` | attribute CropBox/@x2

| type | restriction of xs:decimal |
|---|---|
| properties | isRef   0<br>use   required |
| source | `<xs:attribute name="x2" use="required">`<br>  `<xs:simpleType>`<br>    `<xs:restriction base="xs:decimal"/>`<br>  `</xs:simpleType>`<br>`</xs:attribute>` | attribute CropBox/@y2

| type | restriction of xs:decimal |
|---|---|
| properties | isRef   0<br>use   required |
| source | `<xs:attribute name="y2" use="required">`<br>  `<xs:simpleType>`<br>    `<xs:restriction base="xs:decimal"/>`<br>  `</xs:simpleType>`<br>`</xs:attribute>` |

*FIG. 5D* element Page

| diagram | |
|---|---|
| | Page — Top-level element for this surface<br>attributes: Rotate<br>Contents — Relative location to the reflow.svg (textual map)<br>CropBox — Surface bounds coordinates |
| properties | content    complex |
| children | Contents CropBox |
| attributes | Name | Type | Use | Default | Fixed | annotation |
| | Rotate | derived by: xs:integer | required | | | |
| annotation | documentation<br>Top-level element for this surface |
| source | `<xs:element name="Page">`<br>  `<xs:annotation>`<br>    `<xs:documentation>`Top-level element for this surface`</xs:documentation>`<br>  `</xs:annotation>`<br>  `<xs:complexType>`<br>    `<xs:sequence>`<br>      `<xs:element ref="Contents"/>`<br>      `<xs:element ref="CropBox"/>`<br>    `</xs:sequence>`<br>    `<xs:attribute name="Rotate" use="required">`<br>      `<xs:simpleType>`<br>        `<xs:restriction base="xs:integer"/>`<br>      `</xs:simpleType>`<br>    `</xs:attribute>`<br>  `</xs:complexType>`<br>`</xs:element>` | attribute Page/@Rotate

| type | restriction of xs:integer |
|---|---|
| properties | isRef    0<br>use      required |
| source | `<xs:attribute name="Rotate" use="required">`<br>  `<xs:simpleType>`<br>    `<xs:restriction base="xs:integer"/>`<br>  `</xs:simpleType>`<br>`</xs:attribute>` |

*FIG. 6B*

| element flow | | |
|---|---|---|
| diagram | \[diagram showing flow element connected to T_flow with attributes type, section, id, and group of associated flow elements\] | |
| type | T_flow | |
| properties | content   complex | |
| children | group | |
| used by | complexTypes   T_flows T_section | |
| attributes | Name    Type           Use        Default    Fixed    annotation<br>_type_    derived by:<br>            xs:string<br>_section_ derived by:<br>            xs:string<br>_id_      derived by:   required<br>            xs:string | |
| annotation | documentation<br>Individual sub-surface extraction element | |
| source | `<xs:element name="flow" type="T_flow">`<br>  `<xs:annotation>`<br>    `<xs:documentation>`Individual sub-surface extraction element`</xs:documentation>`<br>  `</xs:annotation>`<br>`</xs:element>` | |

Labels in diagram: flow — Individual sub-surface extraction element; Group of associated flow elements.

*FIG. 6C* element flows

| diagram | T_flows — flows (Associated flow elements) — flow 0..∞ (Individual sub-surface extraction element) |
|---|---|
| type | T flows |
| properties | content    complex |
| children | flow |
| used by | complexType    T metadata |
| annotation | documentation<br>Associated flow elements |
| source | `<xs:element name="flows" type="T_flows">`<br>  `<xs:annotation>`<br>    `<xs:documentation>Associated flow elements</xs:documentation>`<br>  `</xs:annotation>`<br>`</xs:element>` | element group

| diagram | T_group — group (Group of associated flow elements.) — attributes: id; block 0..∞ (Sub-flow element) | | | | |
|---|---|---|---|---|---|
| type | T group | | | | |
| properties | content    complex | | | | |
| children | block | | | | |
| used by | complexType    T flow | | | | |
| attributes | Name | Type | Use | Default | Fixed    annotation |
| | id | derived by:<br>xs:string | required | | |
| annotation | documentation<br>Group of associated flow elements. | | | | |
| source | `<xs:element name="group" type="T_group">`<br>  `<xs:annotation>`<br>    `<xs:documentation>Group of associated flow elements.</xs:documentation>`<br>  `</xs:annotation>`<br>`</xs:element>` | | | | |

FIG. 6D element image

| | |
|---|---|
| diagram | (diagram showing: image "Surface to sub-surface image map" → T_image with attributes: type, id) |
| type | T_image |
| properties | content    complex |
| used by | complexType    T_images |
| attributes | Name        Type                Use        Default    Fixed    annotation<br>*type*       derived by:     required<br>            xs:string<br>*id*         derived by:     required<br>            xs:string |
| annotation | documentation<br>Surface to sub-surface image map |
| source | `<xs:element name="image" type="T_image">`<br>`  <xs:annotation>`<br>`    <xs:documentation>Surface to sub-surface image map</xs:documentation>`<br>`  </xs:annotation>`<br>`</xs:element>` | element images

| | |
|---|---|
| diagram | (diagram showing: images "Associated flow sub-surface image map(s)" → T_images containing image 0..∞ "Surface to sub-surface image map") |
| type | T_images |
| properties | content    complex |
| children | *image* |
| used by | complexType    T_metadata |
| annotation | documentation<br>Associated flow sub-surface image map(s) |
| source | `<xs:element name="images" type="T_images">`<br>`  <xs:annotation>`<br>`    <xs:documentation>Associated flow sub-surface image map(s)</xs:documentation>`<br>`  </xs:annotation>`<br>`</xs:element>` |

FIG. 6E element metadata

| diagram | 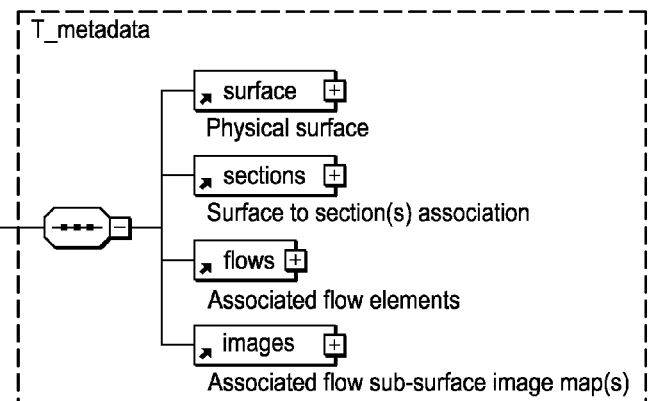 |
|---|---|
| type | T metadata |
| properties | content    complex |
| children | surface sections flows images |
| annotation | documentation<br>Top-level element for the surface-level metadata |
| source | `<xs:element name="metadata" type="T_metadata">`<br>  `<xs:annotation>`<br>    `<xs:documentation>`Top-level element for the surface-level metadata`</xs:documentation>`<br>  `</xs:annotation>`<br>`</xs:element>` |

*FIG. 6F*

| | | | | | | |
|---|---|---|---|---|---|---|
| element section | | | | | | |
| diagram | T_section — attributes: name, id — flow 0..∞ Individual sub-surface extraction element. section — Surface to section association | | | | | |
| type | T_section | | | | | |
| properties | content     complex | | | | | |
| children | flow | | | | | |
| used by | complexType     T_sections | | | | | |
| attributes | Name | Type | Use | Default | Fixed | annotation |
| | name | derived by: xs:string | required | | | |
| | id | derived by: xs:string | required | | | |
| annotation | documentation<br>Surface to section association | | | | | |
| source | `<xs:element name="section" type="T_section">`<br>  `<xs:annotation>`<br>    `<xs:documentation>Surface to section association</xs:documentation>`<br>  `</xs:annotation>`<br>`</xs:element>` | | | | | |

FIG. 6G

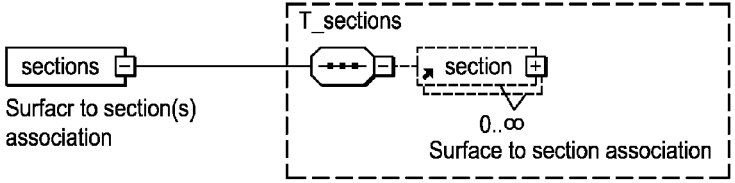

element sections

| diagram | (see above) |
|---|---|
| type | T_sections |
| properties | content    complex |
| children | section |
| used by | complexType    T_metadata |
| annotation | documentation<br>Surface to section(s) association |
| source | `<xs:element name="sections" type="T_sections">`<br>  `<xs:annotation>`<br>    `<xs:documentation>Surface to section(s) association</xs:documentation>`<br>  `</xs:annotation>`<br>`</xs:element>` |

FIG. 61

| | | | | | | |
|---|---|---|---|---|---|---|
| element surface | | | | | | |
| diagram | surface — Physical surface → T_surface { attributes: imposition, id, alpha; srcimage — Raster representation of the physical surface } | | | | | |
| type | T_surface | | | | | |
| properties | content    complex | | | | | |
| children | srcimage | | | | | |
| used by | complexType    T_metadata | | | | | |
| attributes | Name | Type | Use | Default | Fixed | annotation |
| | imposition | derived by: xs:string | required | | | |
| | id | derived by: xs:string | required | | | |
| | alpha | derived by: xs:string | required | | | |
| annotation | documentation<br>Physical surface | | | | | |
| source | `<xs:element name="surface" type="T_surface">`<br>  `<xs:annotation>`<br>    `<xs:documentation>Physical surface</xs:documentation>`<br>  `</xs:annotation>`<br>`</xs:element>` | | | | | |

*FIG. 6J*

| complexType T_block | |
|---|---|
| diagram | T_block — Block type — attributes: y, x, w, type, h |
| used by | element block |
| attributes | Name    Type    Use    Default    Fixed    annotation <br> y    derived by: xs:string    required <br> x    derived by: xs:string    required <br> w    derived by: xs:string    required <br> type    derived by: xs:string    required <br> h    derived by: xs:string    required |
| annotation | documentation <br> Block type |
| source | ```xml
<xs:complexType name="T_block">
  <xs:annotation>
    <xs:documentation>Block type</xs:documentation>
  </xs:annotation>
  <xs:attribute name="y" use="required">
    <xs:simpleType>
      <xs:restriction base="xs:string"/>
    </xs:simpleType>
  </xs:attribute>
  <xs:attribute name="x" use="required">
    <xs:simpleType>
      <xs:restriction base="xs:string"/>
    </xs:simpleType>
  </xs:attribute>
  <xs:attribute name="w" use="required">
    <xs:simpleType>
      <xs:restriction base="xs:string"/>
    </xs:simpleType>
  </xs:attribute>
  <xs:attribute name="type" use="required">
    <xs:simpleType>
      <xs:restriction base="xs:string"/>
    </xs:simpleType>
  </xs:attribute>
  <xs:attribute name="h" use="required">
    <xs:simpleType>
      <xs:restriction base="xs:string"/>
``` |

*FIG. 6K*

|  | `</xs:simpleType>`<br>`</xs:attribute>`<br>`</xs:complexType>` |
|---|---|

| attribute T_block/@y ||
|---|---|
| type | restriction of xs:string |
| properties | isRef  0<br>use   required |
| source | `<xs:attribute name="y" use="required">`<br>  `<xs:simpleType>`<br>    `<xs:restriction base="xs:string"/>`<br>  `</xs:simpleType>`<br>`</xs:attribute>` |

| attribute T_block/@x ||
|---|---|
| type | restriction of xs:string |
| properties | isRef  0<br>use   required |
| source | `<xs:attribute name="x" use="required">`<br>  `<xs:simpleType>`<br>    `<xs:restriction base="xs:string"/>`<br>  `</xs:simpleType>`<br>`</xs:attribute>` |

| attribute T_block/@w ||
|---|---|
| type | restriction of xs:string |
| properties | isRef  0<br>use   required |
| source | `<xs:attribute name="w" use="required">`<br>  `<xs:simpleType>`<br>    `<xs:restriction base="xs:string"/>`<br>  `</xs:simpleType>`<br>`</xs:attribute>` |

| attribute T_block/@type ||
|---|---|
| type | restriction of xs:string |
| properties | isRef  0<br>use   required |
| source | `<xs:attribute name="type" use="required">`<br>  `<xs:simpleType>`<br>    `<xs:restriction base="xs:string"/>`<br>  `</xs:simpleType>`<br>`</xs:attribute>` |

*FIG. 6L* attribute T_block/@h

| type | restriction of xs:string |
|---|---|
| properties | isRef    0 <br> use    required |
| source | `<xs:attribute name="h" use="required">`<br>  `<xs:simpleType>`<br>    `<xs:restriction base="xs:string"/>`<br>  `</xs:simpleType>`<br>`</xs:attribute>` | complexType T_flow

| diagram | T_flow — Flow type → attributes (type, section, id), group — Group of associated flow elements. |
|---|---|
| children | group |
| used by | element    flow |
| attributes | Name    Type    Use    Default    Fixed    annotation <br> type    derived by: xs:string <br> section    derived by: xs:string <br> id    derived by: xs:string    required |
| annotation | documentation <br> Flow type |
| source | `<xs:complexType name="T_flow">`<br>  `<xs:annotation>`<br>    `<xs:documentation>Flow type</xs:documentation>`<br>  `</xs:annotation>`<br>  `<xs:sequence>`<br>    `<xs:element ref="group"/>`<br>  `</xs:sequence>`<br>  `<xs:attribute name="type">`<br>    `<xs:simpleType>`<br>      `<xs:restriction base="xs:string"/>`<br>    `</xs:simpleType>`<br>  `</xs:attribute>`<br>  `<xs:attribute name="section">`<br>    `<xs:simpleType>`<br>      `<xs:restriction base="xs:string"/>`<br>    `</xs:simpleType>`<br>  `</xs:attribute>`<br>  `<xs:attribute name="id" use="required">`<br>    `<xs:simpleType>` |

*FIG. 6M*

| | `<xs:restriction base="xs:string"/>`<br>`  </xs:simpleType>`<br>` </xs:attribute>`<br>`</xs:complexType>` |
|---|---| attribute T_flow/@type

| type | restriction of xs:string |
|---|---|
| properties | isRef  0 |
| source | `<xs:attribute name="type">`<br>` <xs:simpleType>`<br>`  <xs:restriction base="xs:string"/>`<br>` </xs:simpleType>`<br>`</xs:attribute` | attribute T_flow/@section

| type | restriction of xs:string |
|---|---|
| properties | isRef  0 |
| source | `<xs:attribute name="section">`<br>` <xs:simpleType>`<br>`  <xs:restriction base="xs:string"/>`<br>` </xs:simpleType>`<br>`</xs:attribute>` | attribute T_flow/@id

| type | restriction of xs:string |
|---|---|
| properties | isRef  0<br>use    required |
| source | `<xs:attribute name="id" use="required">`<br>` <xs:simpleType>`<br>`  <xs:restriction base="xs:string"/>`<br>` </xs:simpleType>`<br>`</xs:attribute>` |

*FIG. 6N* complexType T_flows

| diagram | T_flows — Flows type —[...]— flow 0..∞ Individual sub-surface extraction element |
|---|---|
| children | flow |
| used by | element flows |
| annotation | documentation Flows type |
| source | ```<xs:complexType name="T_flows">
  <xs:annotation>
    <xs:documentation>Flows type</xs:documentation>
  </xs:annotation>
  <xs:sequence>
    <xs:element ref="flow" minOccurs="0" maxOccurs="unbounded"/>
  </xs:sequence>
</xs:complexType>``` | complexType T_group

| diagram | T_group — Group type — attributes: id — block 0..∞ Sub-flow element |
|---|---|
| children | block |
| used by | element group |
| attributes | Name: id — Type: derived by: xs:string — Use: required — Default — Fixed — annotation |
| annotation | documentation Group type |
| source | ```<xs:complexType name="T_group">
  <xs:annotation>
    <xs:documentation>Group type</xs:documentation>
  </xs:annotation>
  <xs:sequence>
    <xs:element ref="block" minOccurs="0" maxOccurs="unbounded"/>
  </xs:sequence>
  <xs:attribute name="id" use="required">
    <xs:simpleType>
      <xs:restriction base="xs:string"/>
    </xs:simpleType>
  </xs:attribute>
</xs:complexType>``` |

*FIG. 6O* attribute T_group/@id

| type | restriction of xs:string |
|---|---|
| properties | isRef 0<br>use required |
| source | `<xs:attribute name="id" use="required">`<br>  `<xs:simpleType>`<br>    `<xs:restriction base="xs:string"/>`<br>  `</xs:simpleType>`<br>`</xs:attribute>` | complexType T_image

| diagram | T_image — Image type — attributes: type, id |
|---|---|
| used by | complexType    <u>image</u> |
| attributes | Name    Type    Use    Default    Fixed    annotation<br><u>type</u>    derived by: xs:string    required<br><u>id</u>    derived by: xs:string    required |
| annotation | documentation<br>Image type |
| source | `<xs:complexType name="T_image">`<br>  `<xs:annotation>`<br>    `<xs:documentation>Image type</xs:documentation>`<br>  `</xs:annotation>`<br>  `<xs:attribute name="type" use="required">`<br>    `<xs:simpleType>`<br>      `<xs:restriction base="xs:string"/>`<br>    `</xs:simpleType>`<br>  `</xs:attribute>`<br>  `<xs:attribute name="id" use="required">`<br>    `<xs:simpleType>`<br>      `<xs:restriction base="xs:string"/>`<br>    `</xs:simpleType>`<br>  `</xs:attribute>`<br>`</xs:complexType>` |

FIG. 6P attribute T_image/@type

| type | restriction of xs:string |
|---|---|
| properties | isRef 0<br>use required |
| source | `<xs:attribute name="type" use="required">`<br>  `<xs:simpleType>`<br>    `<xs:restriction base="xs:string"/>`<br>  `</xs:simpleType>`<br>`</xs:attribute` | attribute T_image/@id

| type | restriction of xs:string |
|---|---|
| properties | isRef 0<br>use required |
| source | `<xs:attribute name="id" use="required">`<br>  `<xs:simpleType>`<br>    `<xs:restriction base="xs:string"/>`<br>  `</xs:simpleType>`<br>`</xs:attribute>` | complexType T_images

| diagram | 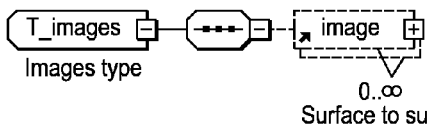 |
|---|---|
| children | image |
| used by | element images |
| annotation | documentation<br>Images type |
| source | `<xs:complexType name="T_images">`<br>  `<xs:annotation>`<br>    `<xs:documentation>Images type</xs:documentation>`<br>  `</xs:annotation>`<br>  `<xs:sequence>`<br>    `<xs:element ref="image" minOccurs="0" maxOccurs="unbounded"/>`<br>  `</xs:sequence>`<br>`</xs:complexType>` |

*FIG. 6R*

| | |
|---|---|
| complexType T_section | |
| diagram | T_section — Section type — attributes: name, id — flow 0..∞ Individual sub-surface extraction element |
| children | flow |
| used by | element section |
| attributes | Name — Type — Use — Default — Fixed — annotation<br>name — derived by: xs:string — required<br>id — derived by: xs:string — required |
| annotation | documentation<br>Section type |
| source | ```xml<br><xs:complexType name="T_section"><br>  <xs:annotation><br>    <xs:documentation>Section type</xs:documentation><br>  </xs:annotation><br>  <xs:sequence><br>    <xs:element ref="flow" minOccurs="0" maxOccurs="unbounded"/><br>  </xs:sequence><br>  <xs:attribute name="name" use="required"><br>    <xs:simpleType><br>      <xs:restriction base="xs:string"/><br>    </xs:simpleType><br>  </xs:attribute><br>  <xs:attribute name="id" use="required"><br>    <xs:simpleType><br>      <xs:restriction base="xs:string"/><br>    </xs:simpleType><br>  </xs:attribute><br></xs:complexType><br>``` |

*FIG. 6S* attribute T_section/@name

| type | restriction of xs:string |
|---|---|
| properties | isRef 0<br>use required |
| source | `<xs:attribute name="name" use="required">`<br>  `<xs:simpleType>`<br>    `<xs:restriction base="xs:string"/>`<br>  `</xs:simpleType>`<br>`</xs:attribute>` | attribute T_section/@id

| type | restriction of xs:string |
|---|---|
| properties | isRef 0<br>use required |
| source | `<xs:attribute name="id" use="required">`<br>  `<xs:simpleType>`<br>    `<xs:restriction base="xs:string"/>`<br>  `</xs:simpleType>`<br>`</xs:attribute>` | complexType T_sections

| diagram | 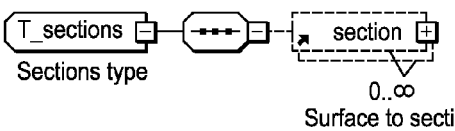 |
|---|---|
| children | section |
| used by | element sections |
| annotation | documentation<br>Sections type |
| source | `<xs:complexType name="T_sections">`<br>  `<xs:annotation>`<br>    `<xs:documentation>Sections type</xs:documentation>`<br>  `</xs:annotation>`<br>  `<xs:sequence>`<br>    `<xs:element ref="section" minOccurs="0" maxOccurs="unbounded"/>`<br>  `</xs:sequence>`<br>`</xs:complexType>` |

FIG. 6T complexType T_srcimage

| diagram | 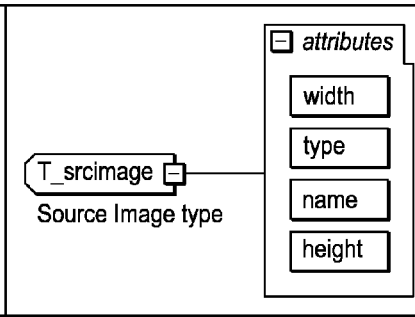 |
|---|---|
| used by | element srcimage |
| attributes | Name　　　Type　　　　　　　Use　　　Default　Fixed　annotation<br>width　　　derived by:　　required<br>　　　　　　xs:string<br>type　　　　derived by:　　required<br>　　　　　　xs:string<br>name　　　derived by:　　required<br>　　　　　　xs:string<br>height　　　derived by:　　required<br>　　　　　　xs:string |
| annotation | documentation<br>Source Image type |
| source | ```<br><xs:complexType name="T_srcimage"><br>  <xs:annotation><br>    <xs:documentation>Source Image type</xs:documentation><br>  </xs:annotation><br>  <xs:attribute name="width" use="required"><br>    <xs:simpleType><br>      <xs:restriction base="xs:string"/><br>    </xs:simpleType><br>  </xs:attribute><br>  <xs:attribute name="type" use="required"><br>    <xs:simpleType><br>      <xs:restriction base="xs:string"/><br>    </xs:simpleType><br>  </xs:attribute><br>  <xs:attribute name="name" use="required"><br>    <xs:simpleType><br>      <xs:restriction base="xs:string"/><br>    </xs:simpleType><br>  </xs:attribute><br>  <xs:attribute name="height" use="required"><br>    <xs:simpleType><br>      <xs:restriction base="xs:string"/><br>    </xs:simpleType><br>  </xs:attribute><br></xs:complexType><br>``` |

*FIG. 6U* attribute T_srcimage/@width

| type | restriction of xs:string |
|---|---|
| properties | isRef    0 <br> use    required |
| source | `<xs:attribute name="width" use="required">`<br>  `<xs:simpleType>`<br>    `<xs:restriction base="xs:string"/>`<br>  `</xs:simpleType>`<br>`</xs:attribute>` | attribute T_srcimage/@type

| type | restriction of xs:string |
|---|---|
| properties | isRef    0 <br> use    required |
| source | `<xs:attribute name="type" use="required">`<br>  `<xs:simpleType>`<br>    `<xs:restriction base="xs:string"/>`<br>  `</xs:simpleType>`<br>`</xs:attribute>` | attribute T_srcimage/@name

| type | restriction of xs:string |
|---|---|
| properties | isRef    0 <br> use    required |
| source | `<xs:attribute name="name" use="required">`<br>  `<xs:simpleType>`<br>    `<xs:restriction base="xs:string"/>`<br>  `</xs:simpleType>`<br>`</xs:attribute>` | attribute T_srcimage/@height

| type | restriction of xs:string |
|---|---|
| properties | isRef    0 <br> use    required |
| source | `<xs:attribute name="height" use="required">`<br>  `<xs:simpleType>`<br>    `<xs:restriction base="xs:string"/>`<br>  `</xs:simpleType>`<br>`</xs:attribute>` |

FIG. 6W attribute T_surface/@imposition

| type | restriction of xs:string |
|---|---|
| properties | isRef 0<br>use required |
| source | `<xs:attribute name="imposition" use="required">`<br>`  <xs:simpleType>`<br>`    <xs:restriction base="xs:string"/>`<br>`  </xs:simpleType>`<br>`</xs:attribute>` | attribute T_surface/@id

| type | restriction of xs:string |
|---|---|
| properties | isRef 0<br>use required |
| source | `<xs:attribute name="id" use="required">`<br>`  <xs:simpleType>`<br>`    <xs:restriction base="xs:string"/>`<br>`  </xs:simpleType>`<br>`</xs:attribute>` | attribute T_surface/@alpha

| type | restriction of xs:string |
|---|---|
| properties | isRef 0<br>use required |
| source | `<xs:attribute name="alpha" use="required">`<br>`  <xs:simpleType>`<br>`    <xs:restriction base="xs:string"/>`<br>`  </xs:simpleType>`<br>`</xs:attribute>` |

*FIG. 7A* attribute coord

| type | restriction of xs:string | | |
|---|---|---|---|
| used by | complexTypes | ImageBlockType ImageTextBlockType RefLinkType TextBlockType | |
| facets | Kind<br>pattern | Value<br>[0-9\.]*,[0-9\.]*,[0-9\.]*,[0-9\.]* | annotation |
| source | `<xs:attribute name="coord">`<br>  `<xs:simpleType>`<br>    `<xs:restriction base="xs:string">`<br>      `<xs:pattern value="[0-9\.]*,[0-9\.]*,[0-9\.]*,[0-9\.]*"/>`<br>    `</xs:restriction>`<br>  `</xs:simpleType>`<br>`</xs:attribute>` | | | attribute grttag

| type | restriction of xs:string | | |
|---|---|---|---|
| used by | complexType | GroupType | |
| facets | Kind<br>enumeration<br>enumeration | Value<br>article<br>chapter | annotation |
| source | `<xs:attribute name="grttag">`<br>  `<xs:simpleType>`<br>    `<xs:restriction base="xs:string">`<br>      `<xs:enumeration value="article"/>`<br>      `<xs:enumeration value="chapter"/>`<br>    `</xs:restriction>`<br>  `</xs:simpleType>`<br>`</xs:attribute>` | | |

*FIG. 7B* attribute ibttag

| type | restriction of xs:string | | |
|---|---|---|---|
| used by | complexType | ImageTextBlockType | |
| facets | Kind<br>enumeration<br>enumeration | Value<br>imagecaption<br>imagecredit | annotation |
| source | ```<xs:attribute name="ibttag">```<br>  ```<xs:simpleType>```<br>    ```<xs:restriction base="xs:string">```<br>      ```<xs:enumeration value="imagecaption"/>```<br>      ```<xs:enumeration value="imagecredit"/>```<br>    ```</xs:restriction>```<br>  ```</xs:simpleType>```<br>```</xs:attribute>``` | | | attribute imgtag

| type | restriction of xs:string | | |
|---|---|---|---|
| used by | complexType | ImageBlockType | |
| facets | Kind<br>enumeration<br>enumeration<br>enumeration | Value<br>advert<br>graphic<br>photo | annotation |
| source | ```<xs:attribute name="imgtag">```<br>  ```<xs:simpleType>```<br>    ```<xs:restriction base="xs:string">```<br>      ```<xs:enumeration value="advert"/>```<br>      ```<xs:enumeration value="graphic"/>```<br>      ```<xs:enumeration value="photo"/>```<br>    ```</xs:restriction>```<br>  ```</xs:simpleType>```<br>```</xs:attribute>``` | | | attribute page

| type | restriction of xs:string |
|---|---|
| used by | complexType    ContLinkType |
| source | ```<xs:attribute name="page">```<br>  ```<xs:simpleType>```<br>    ```<xs:restriction base="xs:string"/>```<br>  ```</xs:simpleType>```<br>```</xs:attribute>``` |

FIG. 7C attribute point

| type | restriction of xs:string |
|---|---|
| used by | complexType    ContLinkType |
| facets | Kind    Value    annotation<br>pattern    [0-9\.]*,[0-9\.]* |
| source | `<xs:attribute name="point">`<br>  `<xs:simpleType>`<br>    `<xs:restriction base="xs:string">`<br>      `<xs:pattern value="[0-9\.]*,[0-9\.]*"/>`<br>    `</xs:restriction>`<br>  `</xs:simpleType>`<br>`</xs:attribute>` | attribute seq

| type | restriction of xs:positiveInteger |
|---|---|
| used by | complexTypes    GroupType ImageBlockType ImageTextBlockType TextBlockType |
| source | `<xs:attribute name="seq">`<br>  `<xs:simpleType>`<br>    `<xs:restriction base="xs:positiveInteger"/>`<br>  `</xs:simpleType>`<br>`</xs:attribute>` | attribute shared

| type | restriction of xs:string |
|---|---|
| used by | complexTypes    ImageBlockType ImageTextBlockType TextBlockType |
| source | `<xs:attribute name="shared">`<br>  `<xs:simpleType>`<br>    `<xs:restriction base="xs:string"/>`<br>  `</xs:simpleType>`<br>`</xs:attribute>` | attribute target

| type | restriction of xs:string |
|---|---|
| used by | complexTypes    ImageBlockType RefLinkType |
| source | `<xs:attribute name="target">`<br>  `<xs:simpleType>`<br>    `<xs:restriction base="xs:string"/>`<br>  `</xs:simpleType>`<br>`</xs:attribute>` |

*FIG. 7D* attribute tbttag

| type | restriction of xs:string |
|---|---|
| used by | complexType TextBlockType |
| facets | Kind      Value      annotation<br>enumeration    articletext<br>enumeration    byline<br>enumeration    dateline<br>enumeration    headline<br>enumeration    ignoretext<br>enumeration    preheadline<br>enumeration    subheadline |
| source | `<xs:attribute name="tbttag">`<br>  `<xs:simpleType>`<br>    `<xs:restriction base="xs:string">`<br>      `<xs:enumeration value="articletext"/>`<br>      `<xs:enumeration value="byline"/>`<br>      `<xs:enumeration value="dateline"/>`<br>      `<xs:enumeration value="headline"/>`<br>      `<xs:enumeration value="ignoretext"/>`<br>      `<xs:enumeration value="preheadline"/>`<br>      `<xs:enumeration value="subheadline"/>`<br>    `</xs:restriction>`<br>  `</xs:simpleType>`<br>`</xs:attribute>` | element ContLink

| diagram | ContLink → ContLink Type (attributes: point, page) |
|---|---|
| type | ContLinkType |
| properties | content     complex |
| used by | complexType GroupType |
| attributes | Name      Type      Use      Default      Fixed      annotation<br>point                      required<br>page                       required |
| source | `<xs:element name="ContLink" type="ContLinkType"/>` |

FIG. 7E element Group

| diagram | |
|---|---|
| type | extension of GroupType |
| properties | content complex |
| children | RefLink ContLink TextBlock ImageBlock |
| used by | complexType PageType |
| attributes | Name Type Use Default Fixed annotation<br>seq             required<br>grttag |
| source | `<xs:element name="Group">`<br> `<xs:complexType>`<br>  `<xs:complexContent>`<br>   `<xs:extension base="GroupType"/>`<br>  `</xs:complexContent>`<br> `</xs:complexType>`<br>`</xs:element>` |

Diagram shows Group element with GroupType (extension), attributes seq and grttag, and children RefLink (0..∞), ContLink, TextBlock (1..∞), ImageBlock (1..∞).

*FIG. 7G* element ImageTextBlock

| | |
|---|---|
| diagram | ImageTextBlockType — ImageBlock — attributes: coord, seq, ibttag, shared |
| type | ImageTextBlockType |
| properties | content    complex |
| used by | complexType    ImageBlockType |
| attributes | Name | Type | Use | Default | Fixed | annotation |
| | coord | | required | | | |
| | seq | | required | | | |
| | ibttag | | required | | | |
| | shared | | | | | |
| source | `<xs:element name="ImageTextBlock" type="ImageTextBlockType"/>` | element Page

| | |
|---|---|
| diagram | PageType — Page — Group 0..∞ |
| type | PageType |
| properties | content    complex |
| children | Group |
| source | `<xs:element name="Page" type="PageType"/>` |

*FIG. 7H* element RefLink

| diagram | (RefLinkType with attributes: coord, target) |
|---|---|
| type | RefLinkType |
| properties | content    complex |
| used by | complexType   GroupType |
| attributes | Name         Type    Use          Default    Fixed    annotation<br>coord                 required<br>target                required |
| source | `<xs:element name="RefLink" type="RefLinkType"/>` | element TextBlock

| diagram | (TextBlockType with attributes: coord, seq, tbttag, shared) |
|---|---|
| type | TextBlockType |
| properties | content    complex |
| used by | complexType   GroupType |
| attributes | Name         Type    Use          Default    Fixed    annotation<br>coord                 required<br>seq                   required<br>tbttag                required<br>shared |
| source | `<xs:element name="TextBlock" type="TextBlockType"/>` |

*FIG. 7J*

| complexType GroupType | |
|---|---|
| diagram | (diagram showing GroupType with attributes seq, grttag; children RefLink 0..∞, ContLink, choice of TextBlock 1..∞ or ImageBlock 1..∞) |
| children | RefLink ContLink TextBlock ImageBlock |
| used by | element Group |
| attributes | Name   Type   Use   Default   Fixed   annotation<br>seq                       required<br>grttag |
| source | ```<xs:complexType name="GroupType"><br>  <xs:sequence><br>    <xs:element ref="RefLink" minOccurs="0" maxOccurs="unbounded"/><br>    <xs:element ref="ContLink" minOccurs="0"/><br>    <xs:choice maxOccurs="unbounded"><br>      <xs:element ref="TextBlock" maxOccurs="unbounded"/><br>      <xs:element ref="ImageBlock" maxOccurs="unbounded"/><br>    </xs:choice><br>  </xs:sequence><br>  <xs:attribute ref="seq" use="required"/><br>  <xs:attribute ref="grttag"/><br></xs:complexType>``` |

*FIG. 7L* complexType ImageTextBlockType

| diagram | ImageTextBlockType — attributes: coord, seq, ibttag, shared |
|---|---|
| used by | element ImageTextBlock |
| attributes | Name / Type / Use / Default / Fixed / annotation<br>coord — required<br>seq — required<br>ibttag — required<br>shared |
| source | `<xs:complexType name="ImageTextBlockType">`<br>  `<xs:attribute ref="coord" use="required"/>`<br>  `<xs:attribute ref="seq" use="required"/>`<br>  `<xs:attribute ref="ibttag" use="required"/>`<br>  `<xs:attribute ref="shared"/>`<br>`</xs:complexType>` | complexType PageType

| diagram | PageType — Group 0..∞ |
|---|---|
| children | Group |
| used by | element Page |
| source | `<xs:complexType name="PageType">`<br>  `<xs:sequence>`<br>    `<xs:element ref="Group" minOccurs="0" maxOccurs="unbounded"/>`<br>  `</xs:sequence>`<br>`</xs:complexType>` |

*FIG. 7M* complexType RefLinkType

| diagram | |
|---|---|
| | RefLinkType — attributes: coord, target |
| used by | element RefLink |
| attributes | Name · Type · Use · Default · Fixed · annotation<br>coord — — required<br>target — — required |
| source | ```<xs:complexType name="RefLinkType"><br>  <xs:attribute ref="coord" use="required"/><br>  <xs:attribute ref="target" use="required"/><br></xs:complexType>``` | complexType TextBlockType

| diagram | |
|---|---|
| | TextBlockType — attributes: coord, seq, tbttag, shared |
| used by | element TextBlock |
| attributes | Name · Type · Use · Default · Fixed · annotation<br>coord — — required<br>seq — — required<br>tbttag — — required<br>shared |
| source | ```<xs:complexType name="TextBlockType"><br>  <xs:attribute ref="coord" use="required"/><br>  <xs:attribute ref="seq" use="required"/><br>  <xs:attribute ref="tbttag" use="required"/><br>  <xs:attribute ref="shared"/><br></xs:complexType>``` |

*FIG. 8A* element defs

| diagram | |
|---|---|
| | T_defs: defs → font-face (0..∞) |
| namespace | http://www.w3.org/2000/svg |
| type | T defs |
| properties | content    complex |
| children | font-face |
| used by | complexType    T svg |
| source | <xs:element name="defs" type="T_defs"/> | element font-face

| diagram | | | | | |
|---|---|---|---|---|---|
| | T_font-face: font-face → attributes (font-family), font-face-src | | | | |
| namespace | http://www.w3.org/2000/svg | | | | |
| type | T font-face | | | | |
| properties | content    complex | | | | |
| children | font-face-src | | | | |
| used by | complexType    T defs | | | | |
| attributes | Name | Type | Use | Default | Fixed    annotation |
| | font-family | derived by: xs:string | required | | |
| source | <xs:element name="font-face" type="T_font-face"/> | | | | |

*FIG. 8B* element font-face-name

| diagram | |
|---|---|
| namespace | http://www.w3.org/2000/svg |
| type | T font-face-name |
| properties | content    complex |
| used by | complexType    T font-face-src |
| attributes | Name        Type                Use           Default      Fixed        annotation<br>name        derived by:    required<br>            xs:string |
| source | <xs:element name="font-face-name" type="T_font-face-name"/> | element font-face-src

| diagram | |
|---|---|
| namespace | http://www.w3.org/2000/svg |
| type | T font-face-src |
| properties | content    complex |
| children | font-face-name font-face-uri |
| used by | complexType    T font-face |
| source | <xs:element name="font-face-src" type="T_font-face-src"/> | element font-face-uri

| | |
|---|---|
| diagram | |
| namespace | http://www.w3.org/2000/svg |
| type | T font-face-uri |
| properties | content   complex |
| used by | complexType   T font-face-src |
| attributes | Name         Type         Use         Default         Fixed         annotation<br>href                       required |
| source | <xs:element name="font-face-uri" type="T_font-face-uri"/> |

FIG. 8D

| element g | | |
|---|---|---|
| diagram | \[diagram showing T_g (extension) with attributes: yPct, y, xPct, x, w, type, label, id, h, dest, class, flow-root, revision; and children: g (1..∞), image, text (1..∞)\] | |
| namespace | http://www.w3.org/2000/svg | |
| type | extension of T_g | |
| properties | content    complex | |
| children | g image text | |
| used by | complexTypes    T_g T_svg | |
| attributes | Name    Type    Use    Default    Fixed    annotation | |
| | yPct    derived by: xs:string | |
| | y    derived by: xs:string | |
| | xPct    derived by: xs:string | |
| | x    derived by: xs:string | |
| | w    derived by: | |

*FIG. 8E*

|  |  | xs:string | |
|---|---|---|---|
|  | type | derived by:<br>xs:string | required |
|  | label | derived by:<br>xs:string | |
|  | id | derived by:<br>xs:string | |
|  | h | derived by:<br>xs:string | |
|  | dest | derived by:<br>xs:string | |
|  | class | derived by:<br>xs:string | required |
|  | flow-root | derived by:<br>xs:string | |
|  | revision | derived by:<br>xs:string | |
| source | `<xs:element name="g">`<br>  `<xs:complexType>`<br>    `<xs:complexContent>`<br>      `<xs:extension base="T_g"/>`<br>    `</xs:complexContent>`<br>  `</xs:complexType>`<br>`</xs:element>` | | |

*FIG. 8H*

| | | | processing discipline is intended for the content of the element; its value is inherited. This name is reserved by virtue of its definition in the XML specification.</p></div> |
|---|---|---|---|
| | width | derived by: xs:string | required |
| | stroke | derived by: xs:string | required |
| | height | derived by: xs:string | required |
| | fill | derived by: xs:string | required |
| | ldfx-api | derived by: xs:string | required |
| source | <xs:element name="svg" type="T_svg"/> | | |

*FIG. 8J* element tspan

| diagram | (T_tspan with attributes font-size, font-family) |
|---|---|
| namespace | http://www.w3.org/2000/svg |
| type | T_tspan |
| properties | content    complex |
| used by | complexType    T text |
| attributes | Name           Type              Use        Default    Fixed    annotation<br>font-size      derived by:      required<br>               xs:string<br>font-family    derived by:      required<br>               xs:string |
| source | <xs:element name="tspan" type="T_tspan"/> | complexType T_defs

| diagram | (T_defs → font-face 0..∞) |
|---|---|
| namespace | http://www.w3.org/2000/svg |
| children | font-face |
| used by | element    defs |
| source | <xs:complexType name="T_defs"><br>  <xs:sequence><br>    <xs:element ref="font-face" minOccurs="0" maxOccurs="unbounded"/><br>  </xs:sequence><br></xs:complexType> |

*FIG. 8K* complexType T_font-face

| diagram | |
|---|---|
| namespace | http://www.w3.org/2000/svg |
| children | font-face-src |
| used by | element font-face |
| attributes | Name    Type    Use    Default    Fixed    annotation<br>font-family  derived by:  required<br>              xs:string |
| source | `<xs:complexType name="T_font-face">`<br>  `<xs:sequence>`<br>    `<xs:element ref="font-face-src"/>`<br>  `</xs:sequence>`<br>  `<xs:attribute name="font-family" use="required">`<br>    `<xs:simpleType>`<br>      `<xs:restriction base="xs:string"/>`<br>    `</xs:simpleType>`<br>  `</xs:attribute>`<br>`</xs:complexType>` | attribute T_font-face/@font-family

| type | restriction of xs:string |
|---|---|
| properties | isRef    0<br>use    required |
| source | `<xs:attribute name="font-family" use="required">`<br>  `<xs:simpleType>`<br>    `<xs:restriction base="xs:string"/>`<br>  `</xs:simpleType>`<br>`</xs:attribute>` |

FIG. 8L complexType T_font-face-name

| diagram | 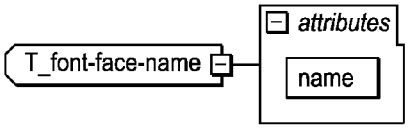 |
|---|---|
| namespace | http://www.w3.org/2000/svg |
| used by | element font-face-name |
| attributes | Name Type Use Default Fixed annotation<br>name derived by: required<br>     xs:string |
| source | `<xs:complexType name="T_font-face-name">`<br>  `<xs:attribute name="name" use="required">`<br>    `<xs:simpleType>`<br>      `<xs:restriction base="xs:string"/>`<br>    `</xs:simpleType>`<br>  `</xs:attribute>`<br>`</xs:complexType>` | attribute T_font-face-name/@name

| type | restriction of xs:string |
|---|---|
| properties | isRef  0<br>use   required |
| source | `<xs:attribute name="name" use="required">`<br>  `<xs:simpleType>`<br>    `<xs:restriction base="xs:string"/>`<br>  `</xs:simpleType>`<br>`</xs:attribute>` |

*FIG. 8M* complexType T_font-face-src

| diagram | 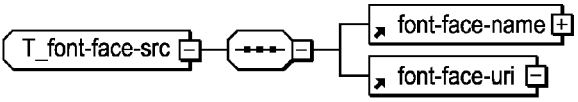 |
|---|---|
| namespace | http://www.w3.org/2000/svg |
| children | font-face-name font-face-uri |
| used by | element    font-face-src |
| source | `<xs:complexType name="T_font-face-src">`<br>  `<xs:sequence>`<br>    `<xs:element ref="font-face-name"/>`<br>    `<xs:element ref="font-face-uri"/>`<br>  `</xs:sequence>`<br>`</xs:complexType>` | complexType T_font-face-uri

| diagram | 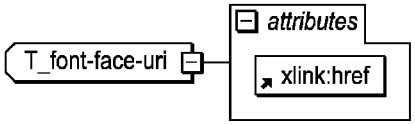 | | | | | |
|---|---|---|---|---|---|---|
| namespace | http://www.w3.org/2000/svg | | | | | |
| used by | element   font-face-uri | | | | | |
| attributes | Name | Type | Use | Default | Fixed | annotation |
|  | href |  | required |  |  |  |
| source | `<xs:complexType name="T_font-face-uri">`<br>  `<xs:attribute ref="xlink:href" use="required"/>`<br>`</xs:complexType>` | | | | | |

*FIG. 8N*

| complexType T_g | |
|---|---|
| diagram | T_g — attributes: yPct, y, xPct, x, w, type, label, id, h, dest, class, flow-root, revision; children: g (1..∞), image, text (1..∞) |
| namespace | http://www.w3.org/2000/svg |
| children | g image text |
| used by | complexTypes    g |

| attributes | Name | Type | Use | Default | Fixed | annotation |
|---|---|---|---|---|---|---|
| | yPct | derived by: xs:string | | | | |
| | y | derived by: xs:string | | | | |
| | xPct | derived by: xs:string | | | | |
| | x | derived by: xs:string | | | | |
| | w | derived by: xs:string | | | | |
| | type | derived by: xs:string | required | | | |
| | label | derived by: xs:string | | | | |
| | id | derived by: xs:string | | | | |

*FIG. 8O*

| | | | |
|---|---|---|---|
| | h | derived by: xs:string | |
| | dest | derived by: xs:string | |
| | class | derived by: xs:string | required |
| | flow-root | derived by: xs:string | |
| | revision | derived by: xs:string | |
| source | `<xs:complexType name="T_g">`<br>  `<xs:choice minOccurs="0">`<br>    `<xs:element ref="g" maxOccurs="unbounded"/>`<br>    `<xs:element ref="image"/>`<br>    `<xs:element ref="text" maxOccurs="unbounded"/>`<br>  `</xs:choice>`<br>  `<xs:attribute name="yPct">`<br>    `<xs:simpleType>`<br>      `<xs:restriction base="xs:string"/>`<br>    `</xs:simpleType>`<br>  `</xs:attribute>`<br>  `<xs:attribute name="y">`<br>    `<xs:simpleType>`<br>      `<xs:restriction base="xs:string"/>`<br>    `</xs:simpleType>`<br>  `</xs:attribute>`<br>  `<xs:attribute name="xPct">`<br>    `<xs:simpleType>`<br>      `<xs:restriction base="xs:string"/>`<br>    `</xs:simpleType>`<br>  `</xs:attribute>`<br>  `<xs:attribute name="x">`<br>    `<xs:simpleType>`<br>      `<xs:restriction base="xs:string"/>`<br>    `</xs:simpleType>`<br>  `</xs:attribute>`<br>  `<xs:attribute name="w">`<br>    `<xs:simpleType>`<br>      `<xs:restriction base="xs:string"/>`<br>    `</xs:simpleType>`<br>  `</xs:attribute>`<br>  `<xs:attribute name="type" use="required">`<br>    `<xs:simpleType>`<br>      `<xs:restriction base="xs:string"/>`<br>    `</xs:simpleType>`<br>  `</xs:attribute>`<br>  `<xs:attribute name="label">`<br>    `<xs:simpleType>`<br>      `<xs:restriction base="xs:string"/>`<br>    `</xs:simpleType>`<br>  `</xs:attribute>`<br>  `<xs:attribute name="id">`<br>    `<xs:simpleType>`<br>      `<xs:restriction base="xs:string"/>`<br>    `</xs:simpleType>`<br>  `</xs:attribute>`<br>  `<xs:attribute name="h">` | | |

*FIG. 8P*

```
            <xs:simpleType>
              <xs:restriction base="xs:string"/>
            </xs:simpleType>
          </xs:attribute>
          <xs:attribute name="dest">
            <xs:simpleType>
              <xs:restriction base="xs:string"/>
            </xs:simpleType>
          </xs:attribute>
          <xs:attribute name="class" use="required">
            <xs:simpleType>
              <xs:restriction base="xs:string">
                <xs:enumeration value="block"/>
                <xs:enumeration value="flow"/>
                <xs:enumeration value="surface"/>
              </xs:restriction>
            </xs:simpleType>
          </xs:attribute>
          <xs:attribute name="flow-root">
            <xs:simpleType>
              <xs:restriction base="xs:string"/>
            </xs:simpleType>
          </xs:attribute>
          <xs:attribute name="revision">
            <xs:simpleType>
              <xs:restriction base="xs:string"/>
            </xs:simpleType>
          </xs:attribute>
        </xs:complexType>
``` attribute T_g/@yPct

| | |
|---|---|
| type | restriction of xs:string |
| properties | isRef   0 |
| source | `<xs:attribute name="yPct">`<br>`  <xs:simpleType>`<br>`    <xs:restriction base="xs:string"/>`<br>`  </xs:simpleType>`<br>`</xs:attribute>` | attribute T_g/@y

| | |
|---|---|
| type | restriction of xs:string |
| properties | isRef   0 |
| source | `<xs:attribute name="y">`<br>`  <xs:simpleType>`<br>`    <xs:restriction base="xs:string"/>`<br>`  </xs:simpleType>`<br>`</xs:attribute>` |

FIG. 8Q attribute T_g/@xPct

| type | restriction of xs:string |
|---|---|
| properties | isRef   0 |
| source | `<xs:attribute name="xPct">`<br>  `<xs:simpleType>`<br>    `<xs:restriction base="xs:string"/>`<br>  `</xs:simpleType>`<br>`</xs:attribute>` | attribute T_g/@x

| type | restriction of xs:string |
|---|---|
| properties | isRef   0 |
| source | `<xs:attribute name="x">`<br>  `<xs:simpleType>`<br>    `<xs:restriction base="xs:string"/>`<br>  `</xs:simpleType>`<br>`</xs:attribute>` | attribute T_g/@w

| type | restriction of xs:string |
|---|---|
| properties | isRef   0 |
| source | `<xs:attribute name="w">`<br>  `<xs:simpleType>`<br>    `<xs:restriction base="xs:string"/>`<br>  `</xs:simpleType>`<br>`</xs:attribute>` | attribute T_g/@type

| type | restriction of xs:string |
|---|---|
| properties | isRef   0<br>use     required |
| source | `<xs:attribute name="type" use="required">`<br>  `<xs:simpleType>`<br>    `<xs:restriction base="xs:string"/>`<br>  `</xs:simpleType>`<br>`</xs:attribute>` |

*FIG. 8R* attribute T_g/@label

| type | restriction of xs:string |
|---|---|
| properties | isRef  0 |
| source | `<xs:attribute name="label">`<br>  `<xs:simpleType>`<br>    `<xs:restriction base="xs:string"/>`<br>  `</xs:simpleType>`<br>`</xs:attribute>` | attribute T_g/@id

| type | restriction of xs:string |
|---|---|
| properties | isRef  0 |
| source | `<xs:attribute name="id">`<br>  `<xs:simpleType>`<br>    `<xs:restriction base="xs:string"/>`<br>  `</xs:simpleType>`<br>`</xs:attribute>` | attribute T_g/@h

| type | restriction of xs:string |
|---|---|
| properties | isRef  0 |
| source | `<xs:attribute name="h">`<br>  `<xs:simpleType>`<br>    `<xs:restriction base="xs:string"/>`<br>  `</xs:simpleType>`<br>`</xs:attribute>` | attribute T_g/@dest

| type | restriction of xs:string |
|---|---|
| properties | isRef  0 |
| source | `<xs:attribute name="dest">`<br>  `<xs:simpleType>`<br>    `<xs:restriction base="xs:string"/>`<br>  `</xs:simpleType>`<br>`</xs:attribute>` |

*FIG. 8S* attribute T_g/@class

| type | restriction of xs:string |
|---|---|
| properties | isRef 0<br>use required |
| facets | Kind          Value          annotation<br>enumeration  block<br>enumeration  flow<br>enumeration  surface |
| source | `<xs:attribute name="class" use="required">`<br>  `<xs:simpleType>`<br>    `<xs:restriction base="xs:string">`<br>      `<xs:enumeration value="block"/>`<br>      `<xs:enumeration value="flow"/>`<br>      `<xs:enumeration value="surface"/>`<br>    `</xs:restriction>`<br>  `</xs:simpleType>`<br>`</xs:attribute>` | attribute T_g/@flow-root

| type | restriction of xs:string |
|---|---|
| properties | isRef 0 |
| source | `<xs:attribute name="flow-root">`<br>  `<xs:simpleType>`<br>    `<xs:restriction base="xs:string"/>`<br>  `</xs:simpleType>`<br>`</xs:attribute>` | attribute T_g/@revision

| type | restriction of xs:string |
|---|---|
| properties | isRef 0 |
| source | `<xs:attribute name="revision">`<br>  `<xs:simpleType>`<br>    `<xs:restriction base="xs:string"/>`<br>  `</xs:simpleType>`<br>`</xs:attribute>` |

FIG. 8T complexType T_image

| diagram | [diagram: T_surface → attributes: xlink:href, y, x, width, height] |
|---|---|
| namespace | http://www.w3.org/2000/svg |
| used by | element image |
| attributes | Name — Type — Use — Default — Fixed — annotation<br>href — — required<br>y — derived by: xs:string — required<br>x — derived by: xs:string — required<br>width — derived by: xs:string — required<br>height — derived by: xs:string — required |
| source | ```xml
<xs:complexType name="T_image">
  <xs:attribute ref="xlink:href" use="required"/>
  <xs:attribute name="y" use="required">
    <xs:simpleType>
      <xs:restriction base="xs:string"/>
    </xs:simpleType>
  </xs:attribute>
  <xs:attribute name="x" use="required">
    <xs:simpleType>
      <xs:restriction base="xs:string"/>
    </xs:simpleType>
  </xs:attribute>
  <xs:attribute name="width" use="required">
    <xs:simpleType>
      <xs:restriction base="xs:string"/>
    </xs:simpleType>
  </xs:attribute>
  <xs:attribute name="height" use="required">
    <xs:simpleType>
      <xs:restriction base="xs:string"/>
    </xs:simpleType>
  </xs:attribute>
</xs:complexType>
``` |

*FIG. 8U* attribute T_image/@y

| type | restriction of xs:string |
|---|---|
| properties | isRef 0<br>use required |
| source | `<xs:attribute name="y" use="required">`<br>  `<xs:simpleType>`<br>    `<xs:restriction base="xs:string"/>`<br>  `</xs:simpleType>`<br>`</xs:attribute>` | attribute T_image/@x

| type | restriction of xs:string |
|---|---|
| properties | isRef 0<br>use required |
| source | `<xs:attribute name="x" use="required">`<br>  `<xs:simpleType>`<br>    `<xs:restriction base="xs:string"/>`<br>  `</xs:simpleType>`<br>`</xs:attribute>` | attribute T_image/@width

| type | restriction of xs:string |
|---|---|
| properties | isRef 0<br>use required |
| source | `<xs:attribute name="width" use="required">`<br>  `<xs:simpleType>`<br>    `<xs:restriction base="xs:string"/>`<br>  `</xs:simpleType>`<br>`</xs:attribute>` |

*FIG. 8V* attribute T_image/@height

| type | restriction of xs:string |
|---|---|
| properties | isRef 0<br>use required |
| source | `<xs:attribute name="height" use="required">`<br>  `<xs:simpleType>`<br>    `<xs:restriction base="xs:string"/>`<br>  `</xs:simpleType>`<br>`</xs:attribute>` | complexType T_svg

| diagram | T_svg<br><br>attributes<br>xml:space<br>`<div>`<br>    `<h3>`space (as an attribute name)`<\h3>`<br>    `<p>`<br>    denotes an attribute whose<br>    value is a keyword indicating what whitespace processing<br>    discipline is intended for the content of the element: its<br>    value is inherited. This name is reserved by virtue of its<br>    definition in the XML specification.`</p>`<br>`</div>`<br><br>T_svg — width, stroke, height, fill, ldfx-api<br><br>defs, g |
|---|---|
| namespace | http://www.w3.org/2000/svg |

*FIG. 8W*

| children | defs g | | | | | |
|---|---|---|---|---|---|---|
| used by | element | svg | | | | |
| attributes | Name | Type | Use | Default | Fixed | annotation |
| | space | | required | | | documentation<br><div><br>  <h3>space (as an attribute name)</h3><br>  <p><br>  denotes an attribute whose value is a keyword indicating what whitespace processing<br>    discipline is intended for the content of the element; its<br>    value is inherited. This name is reserved by virtue of its<br>    definition in the XML specification.</p><br></div> |
| | width | derived by: xs:string | required | | | |
| | stroke | derived by: xs:string | required | | | |
| | height | derived by: xs:string | required | | | |
| | fill | derived by: xs:string | required | | | |
| | ldfx-api | derived by: xs:string | required | | | |
| source | ```<xs:complexType name="T_svg"><br>  <xs:sequence><br>    <xs:element ref="defs"/><br>    <xs:element ref="g"/><br>  </xs:sequence><br>  <xs:attribute ref="xml:space" use="required"/><br>  <xs:attribute name="width" use="required"><br>    <xs:simpleType><br>      <xs:restriction base="xs:string"/><br>    </xs:simpleType><br>  </xs:attribute><br>  <xs:attribute name="stroke" use="required"><br>    <xs:simpleType><br>      <xs:restriction base="xs:string"/><br>    </xs:simpleType><br>  </xs:attribute><br>  <xs:attribute name="height" use="required"><br>    <xs:simpleType><br>      <xs:restriction base="xs:string"/><br>    </xs:simpleType><br>  </xs:attribute><br>  <xs:attribute name="fill" use="required"><br>    <xs:simpleType><br>      <xs:restriction base="xs:string"/>``` | | | | | |

*FIG. 8X*

```
      </xs:simpleType>
    </xs:attribute>
    <xs:attribute name="ldfx-api" use="required">
      <xs:simpleType>
        <xs:restriction base="xs:string"/>
      </xs:simpleType>
    </xs:attribute>
  </xs:complexType>
``` attribute T_svg/@width

| type | restriction of xs:string |
|---|---|
| properties | isRef   0<br>use    required |
| source | `<xs:attribute name="width" use="required">`<br>  `<xs:simpleType>`<br>    `<xs:restriction base="xs:string"/>`<br>  `</xs:simpleType>`<br>`</xs:attribute>` | attribute T_svg/@stroke

| type | restriction of xs:string |
|---|---|
| properties | isRef   0<br>use    required |
| source | `<xs:attribute name="stroke" use="required">`<br>  `<xs:simpleType>`<br>    `<xs:restriction base="xs:string"/>`<br>  `</xs:simpleType>`<br>`</xs:attribute>` |

FIG. 8Y attribute T_svg/@height

| type | restriction of xs:string |
|---|---|
| properties | isRef  0<br>use  required |
| source | `<xs:attribute name="height" use="required">`<br>  `<xs:simpleType>`<br>    `<xs:restriction base="xs:string"/>`<br>  `</xs:simpleType>`<br>`</xs:attribute>` | attribute T_svg/@fill

| type | restriction of xs:string |
|---|---|
| properties | isRef  0<br>use  required |
| source | `<xs:attribute name="fill" use="required">`<br>  `<xs:simpleType>`<br>    `<xs:restriction base="xs:string"/>`<br>  `</xs:simpleType>`<br>`</xs:attribute>` | attribute T_svg/@ldfx-api

| type | restriction of xs:string |
|---|---|
| properties | isRef  0<br>use  required |
| source | `<xs:attribute name="ldfx-api" use="required">`<br>  `<xs:simpleType>`<br>    `<xs:restriction base="xs:string"/>`<br>  `</xs:simpleType>`<br>`</xs:attribute>` |

*FIG. 8Z*

| complexType | T_text | | | | | |
|---|---|---|---|---|---|---|
| diagram | (diagram showing T_text with attributes: y, x, tattr, font-size, font-family, fill-rule, fill; and child tspan) | | | | | |
| namespace | http://www.w3.org/2000/svg | | | | | |
| properties | mixed    true | | | | | |
| children | tspan | | | | | |
| used by | element   <u>text</u> | | | | | |
| attributes | Name | Type | Use | Default | Fixed | annotation |
| | <u>y</u> | xs:string | required | | | |
| | <u>x</u> | xs:string | required | | | |
| | <u>tattr</u> | xs:string | required | | | |
| | <u>font-size</u> | derived by: xs:string | required | | | |
| | <u>font-family</u> | derived by: xs:string | required | | | |
| | <u>fill-rule</u> | derived by: xs:string | required | | | |
| | <u>fill</u> | derived by: xs:string | required | | | |
| source | `<xs:complexType name="T_text" mixed="true">`<br>  `<xs:sequence>`<br>    `<xs:element ref="tspan" minOccurs="0"/>` | | | | | |

*FIG. 8AA*

```
</xs:sequence>
<xs:attribute name="y" type="xs:string" use="required"/>
<xs:attribute name="x" type="xs:string" use="required"/>
<xs:attribute name="tattr" type="xs:string" use="required"/>
<xs:attribute name="font-size" use="required">
  <xs:simpleType>
    <xs:restriction base="xs:string"/>
  </xs:simpleType>
</xs:attribute>
<xs:attribute name="font-family" use="required">
  <xs:simpleType>
    <xs:restriction base="xs:string"/>
  </xs:simpleType>
</xs:attribute>
<xs:attribute name="fill-rule" use="required">
  <xs:simpleType>
    <xs:restriction base="xs:string"/>
  </xs:simpleType>
</xs:attribute>
<xs:attribute name="fill" use="required">
  <xs:simpleType>
    <xs:restriction base="xs:string"/>
  </xs:simpleType>
</xs:attribute>
</xs:complexType>
``` attribute T_text/@y

| type | xs:string |
|---|---|
| properties | isRef　0<br>use　required |
| source | `<xs:attribute name="y" type="xs:string" use="required"/>` | attribute T_text/@x

| type | xs:string |
|---|---|
| properties | isRef　0<br>use　required |
| source | `<xs:attribute name="x" type="xs:string" use="required"/>` | attribute T_text/@tattr

| type | xs:string |
|---|---|
| properties | isRef　0<br>use　required |
| source | `<xs:attribute name="tattr" type="xs:string" use="required"/>` |

*FIG. 8AB* attribute T_text/@font-size

| type | restriction of xs:string |
|---|---|
| properties | isRef 0<br>use required |
| source | `<xs:attribute name="font-size" use="required">`<br>  `<xs:simpleType>`<br>    `<xs:restriction base="xs:string"/>`<br>  `</xs:simpleType>`<br>`</xs:attribute>` | attribute T_text/@font-family

| type | restriction of xs:string |
|---|---|
| properties | isRef 0<br>use required |
| source | `<xs:attribute name="font-family" use="required">`<br>  `<xs:simpleType>`<br>    `<xs:restriction base="xs:string"/>`<br>  `</xs:simpleType>`<br>`</xs:attribute>` | attribute T_text/@fill-rule

| type | restriction of xs:string |
|---|---|
| properties | isRef 0<br>use required |
| source | `<xs:attribute name="fill-rule" use="required">`<br>  `<xs:simpleType>`<br>    `<xs:restriction base="xs:string"/>`<br>  `</xs:simpleType>`<br>`</xs:attribute>` | attribute T_text/@fill

| type | restriction of xs:string |
|---|---|
| properties | isRef 0<br>use required |
| source | `<xs:attribute name="fill" use="required">`<br>  `<xs:simpleType>`<br>    `<xs:restriction base="xs:string"/>`<br>  `</xs:simpleType>`<br>`</xs:attribute>` |

FIG. 8AC

| | |
|---|---|
| complexType T_tspan | |
| diagram | T_span — attributes: font-size, font-family |
| namespace | http://www.w3.org/2000/svg |
| type | extension of ST tspan |
| properties | base    ST_tspan |
| used by | element    tspan |
| attributes | Name     Type     Use     Default     Fixed     annotation<br>font-size     derived by: xs:string     required<br><br>font-family     derived by: xs:string     required |
| source | ```<xs:complexType name="T_tspan"><br>  <xs:simpleContent><br>    <xs:extension base="ST_tspan"><br>      <xs:attribute name="font-size" use="required"><br>        <xs:simpleType><br>          <xs:restriction base="xs:string"/><br>        </xs:simpleType><br>      </xs:attribute><br>      <xs:attribute name="font-family" use="required"><br>        <xs:simpleType><br>          <xs:restriction base="xs:string"/><br>        </xs:simpleType><br>      </xs:attribute><br>    </xs:extension><br>  </xs:simpleContent><br></xs:complexType>``` |

*FIG. 8AD* attribute T_tspan/@font-size

| type | restriction of xs:string |
|---|---|
| properties | isRef 0<br>use required |
| source | `<xs:attribute name="font-size" use="required">`<br>  `<xs:simpleType>`<br>    `<xs:restriction base="xs:string"/>`<br>  `</xs:simpleType>`<br>`</xs:attribute>` | attribute T_tspan/@font-family

| type | restriction of xs:string |
|---|---|
| properties | isRef 0<br>use required |
| source | `<xs:attribute name="font-family" use="required">`<br>  `<xs:simpleType>`<br>    `<xs:restriction base="xs:string"/>`<br>  `</xs:simpleType>`<br>`</xs:attribute>` | simpleType ST_tspan

| namespace | http://www.w3.org/2000/svg |
|---|---|
| type | xs:string |
| used by | complexType   <u>T tspan</u> |
| source | `<xs:simpleType name="ST_tspan">`<br>  `<xs:restriction base="xs:string"/>`<br>`</xs:simpleType>` |

*FIG. 8AE* attribute base

| namespace | http://www.w3.org/XML/1998/namespace |
|---|---|
| type | xs:anyURI |
| used by | attributeGroup    specialAttrs |
| annotation | documentation<br><div><br>    <h3>base (as an attribute name)</h3><br>    <p><br>denotes an attribute whose value<br>provides a URI to be used as the base for interpreting any<br>relative URIs in the scope of the element on which it<br>appears; its value is inherited. This name is reserved<br>by virtue of its definition in the XML Base specification.</p><br>    <p><br>See <a href="http://www.w3.org/TR/xmlbase/">http://www.w3.org/TR/xmlbase/</a><br>for information about this attribute.<br>    </p><br></div> |
| source | <xs:attribute name="base" type="xs:anyURI"><br>  <xs:annotation><br>    <xs:documentation><br>      <div><br>        <h3>base (as an attribute name)</h3><br>        <p><br>denotes an attribute whose value<br>provides a URI to be used as the base for interpreting any<br>relative URIs in the scope of the element on which it<br>appears; its value is inherited. This name is reserved<br>by virtue of its definition in the XML Base specification.</p><br>        <p><br>See <a href="http://www.w3.org/TR/xmlbase/">http://www.w3.org/TR/xmlbase/</a><br>for information about this attribute.<br>        </p><br>      </div><br>    </xs:documentation><br>  </xs:annotation><br></xs:attribute> |

*FIG. 8AF* attribute id

| namespace | http://www.w3.org/XML/1998/namespace |
|---|---|
| type | xs:ID |
| used by | attributeGroup     specialAttrs |
| annotation | documentation<br><div><br>    <h3>id (as an attribute name)</h3><br>    <p><br>    denotes an attribute whose value<br>    should be interpreted as if declared to be of type ID.<br>    This name is reserved by virtue of its definition in the<br>    xml:id specification.</p><br>    <p><br>    See <a href="http://www.w3.org/TR/xml-id/">http://www.w3.org/TR/xml-id/</a><br>    for information about this attribute.<br>    </p><br></div> |
| source | <xs:attribute name="id" type="xs:ID"><br>  <xs:annotation><br>    <xs:documentation><br>      <div><br>        <h3>id (as an attribute name)</h3><br>        <p><br>        denotes an attribute whose value<br>        should be interpreted as if declared to be of type ID.<br>        This name is reserved by virtue of its definition in the<br>        xml:id specification.</p><br>        <p><br>        See <a href="http://www.w3.org/TR/xml-id/">http://www.w3.org/TR/xml-id/</a><br>        for information about this attribute.<br>        </p><br>      </div><br>    </xs:documentation><br>  </xs:annotation><br></xs:attribute> |

*FIG. 8AG* attribute lang

| namespace | http://www.w3.org/XML/1998/namespace |
|---|---|
| type | union of (xs:language, restriction of xs:string) |
| used by | attributeGroup    specialAttrs |
| annotation | documentation<br><div><br>    <h3>lang (as an attribute name)</h3><br>    <p><br>denotes an attribute whose value<br>is a language code for the natural language of the content of<br>any element; its value is inherited.  This name is reserved<br>by virtue of its definition in the XML specification.</p><br></div><br><div><br>    <h4>Notes</h4><br>    <p><br>Attempting to install the relevant ISO 2- and 3-letter<br>codes as the enumerated possible values is probably never<br>going to be a realistic possibility.<br></p><br>    <p><br>See BCP 47 at <a href="http://www.rfc-editor.org/rfc/bcp/bcp47.txt"><br>http://www.rfc-editor.org/rfc/bcp/bcp47.txt</a><br>and the IANA language subtag registry at<br><a href="http://www.iana.org/assignments/language-subtag-registry"><br>http://www.iana.org/assignments/language-subtag-registry</a><br>for further information.<br></p><br>    <p><br>The union allows for the 'un-declaration' of xml:lang with<br>the empty string.<br></p> |

FIG. 8AH

| | |
|---|---|
| | `</div>` |
| source | `<xs:attribute name="lang">`<br>  `<xs:annotation>`<br>    `<xs:documentation>`<br>      `<div>`<br>        `<h3>lang (as an attribute name)</h3>`<br>        `<p>`<br>        denotes an attribute whose value<br>        is a language code for the natural language of the content of<br>        any element; its value is inherited.  This name is reserved<br>        by virtue of its definition in the XML specification.`</p>`<br>      `</div>`<br>      `<div>`<br>        `<h4>Notes</h4>`<br>        `<p>`<br>        Attempting to install the relevant ISO 2- and 3-letter<br>        codes as the enumerated possible values is probably never<br>        going to be a realistic possibility.<br>        `</p>`<br>        `<p>`<br>        See BCP 47 at `<a href="http://www.rfc-editor.org/rfc/bcp/bcp47.txt">`<br>        http://www.rfc-editor.org/rfc/bcp/bcp47.txt`</a>`<br>        and the IANA language subtag registry at<br>        `<a href="http://www.iana.org/assignments/language-subtag-registry">`<br>        http://www.iana.org/assignments/language-subtag-registry`</a>`<br>        for further information.<br>        `</p>`<br>        `<p>`<br>        The union allows for the 'un-declaration' of xml:lang with<br>        the empty string.<br>        `</p>`<br>      `</div>`<br>    `</xs:documentation>`<br>  `</xs:annotation>`<br>  `<xs:simpleType>`<br>    `<xs:union memberTypes="xs:language">`<br>      `<xs:simpleType>`<br>        `<xs:restriction base="xs:string">`<br>          `<xs:enumeration value=""/>`<br>        `</xs:restriction>`<br>      `</xs:simpleType>`<br>    `</xs:union>`<br>  `</xs:simpleType>`<br>`</xs:attribute>` |

*FIG. 8AI* attribute space

| namespace | http://www.w3.org/XML/1998/namespace |
|---|---|
| type | restriction of xs:NCName |
| used by | complexType    T svg<br>attributeGroup    specialAttrs |
| facets | Kind          Value         annotation<br>enumeration    default<br>enumeration    preserve |
| annotation | documentation<br><div><br>    <h3>space (as an attribute name)</h3><br>    <p><br>  denotes an attribute whose<br>  value is a keyword indicating what whitespace processing<br>  discipline is intended for the content of the element; its<br>  value is inherited. This name is reserved by virtue of its<br>  definition in the XML specification.</p><br></div> |
| source | <xs:attribute name="space"><br>  <xs:annotation><br>    <xs:documentation><br>      <div><br>        <h3>space (as an attribute name)</h3><br>        <p><br>      denotes an attribute whose<br>      value is a keyword indicating what whitespace processing<br>      discipline is intended for the content of the element; its<br>      value is inherited. This name is reserved by virtue of its<br>      definition in the XML specification.</p><br>      </div><br>    </xs:documentation><br>  </xs:annotation><br>  <xs:simpleType><br>    <xs:restriction base="xs:NCName"><br>      <xs:enumeration value="default"/><br>      <xs:enumeration value="preserve"/><br>    </xs:restriction><br>  </xs:simpleType><br></xs:attribute> |

*FIG. 8AJ*

| attributeGroup specialAttrs | |
|---|---|
| namespace | http://www.w3.org/XML/1998/namespace |
| attributes | Name  Type  Use  Default  Fixed  annotation<br>base                                 documentation<br>                                      <div><br>                                          <h3>base (as an attribute name)</h3><br>                                          <p><br>                                   denotes an attribute whose value<br>                                   provides a URI to be used as the base for interpreting any<br>                                   relative URIs in the scope of the element on which it<br>                                   appears; its value is inherited.  This name is reserved<br>                                   by virtue of its definition in the XML Base specification.</p><br>                                          <p><br>                                   See <a<br>href="http://www.w3.org/TR/xmlbase/">http://www.w3.org/TR/xmlbase/</a><br>                                   for information about this attribute.<br>                                   </p><br>                                   </div><br>lang                                 documentation<br>                                   <div><br>                                         <h3>lang (as an attribute name)</h3><br>                                         <p><br>                                 denotes an attribute whose value<br>                                 is a language code for the natural language of the content of<br>                                 any element; its value is inherited.  This name is reserved |

*FIG. 8AK*

| | | |
|---|---|---|
| | | by virtue of its definition in the XML specification.</p><br></div><br><div><br>    <h4>Notes</h4><br>    <p><br>Attempting to install the relevant ISO 2- and 3-letter<br>codes as the enumerated possible values is probably never<br>going to be a realistic possibility.<br></p><br>    <p><br>See BCP 47 at <a href="http://www.rfc-editor.org/rfc/bcp/bcp47.txt"><br>http://www.rfc-editor.org/rfc/bcp/bcp47.txt</a><br>and the IANA language subtag registry at<br><a href="http://www.iana.org/assignments/language-subtag-registry"><br>http://www.iana.org/assignments/language-subtag-registry</a><br>for further information.<br></p><br>    <p><br>The union allows for the 'un-declaration' of xml:lang with<br>the empty string.<br></p><br></div> |
| | space | documentation<br><div><br>    <h3>space (as an attribute name)</h3><br>    <p><br>denotes an attribute whose<br>value is a keyword indicating what whitespace processing<br>discipline is intended for the content of the element; its<br>value is inherited.  This name is reserved by virtue of its<br>definition in the XML specification.</p><br></div> |
| | id | documentation<br><div><br>    <h3>id (as an attribute name)</h3><br>    <p><br>denotes an attribute whose value<br>should be interpreted as if declared to be of type ID.<br>This name is reserved by virtue of its definition in the<br>xml:id specification.</p><br>    <p><br>See <a href="http://www.w3.org/TR/xml-id/">http://www.w3.org/TR/xml-id/</a><br>for information about this attribute.<br></p><br></div> |
| source | <xs:attributeGroup name="specialAttrs"><br>  <xs:attribute ref="xml:base"/><br>  <xs:attribute ref="xml:lang"/><br>  <xs:attribute ref="xml:space"/><br>  <xs:attribute ref="xml:id"/><br></xs:attributeGroup> | |

FIG. 8AL
| attribute href | |
|---|---|
| namespace | http://www.w3.org/1999/xlink |
| type | restriction of xs:string |
| used by | complexTypes    T font-face-uri   T image |
| source | `<xs:attribute name="href">`<br>  `<xs:simpleType>`<br>    `<xs:restriction base="xs:string"/>`<br>  `</xs:simpleType>`<br>`</xs:attribute>` |
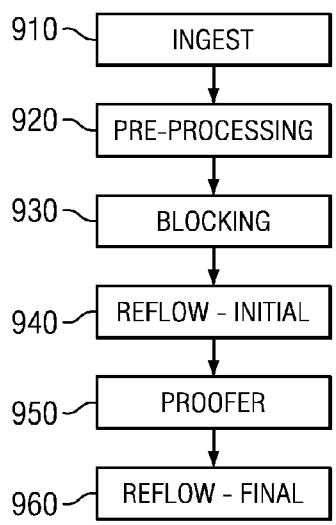
FIG. 9
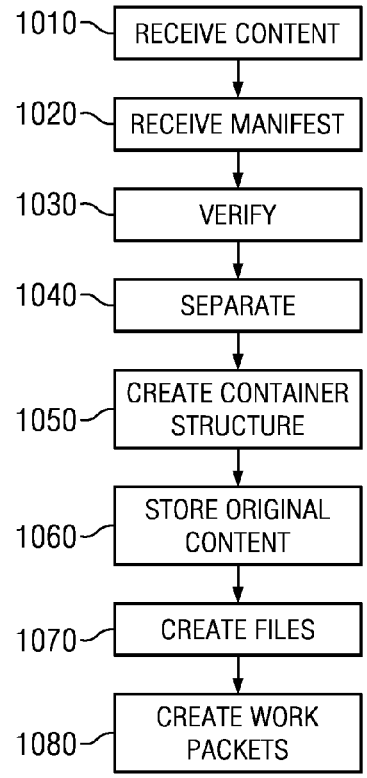
FIG. 10

*FIG. 11A* element alpha

| diagram | alpha<br>System abbreviation for the parent element |
|---|---|
| type | xs:string |
| properties | content    simple |
| used by | elements    edition publication zone |
| annotation | documentation<br>System abbreviation for the parent element |
| source | `<xs:element name="alpha" type="xs:string">`<br>  `<xs:annotation>`<br>    `<xs:documentation>`System abbreviation for the parent element`</xs:documentation>`<br>  `</xs:annotation>`<br>`</xs:element>` | element date

| diagram | date<br>Publication date in YYYYMMDD format |
|---|---|
| type | xs:integer |
| properties | content    simple |
| used by | element    toc |
| annotation | documentation<br>Publication date in YYYYMMDD format |
| source | `<xs:element name="date" type="xs:integer">`<br>  `<xs:annotation>`<br>    `<xs:documentation>`Publication date in YYYYMMDD format`</xs:documentation>`<br>  `</xs:annotation>`<br>`</xs:element>` |

FIG. 11B

| element edition | |
|---|---|
| diagram | edition — Publication source edition → alpha (System abbreviation for the parent element), name (Description/file name for the parent element) |
| properties | content    complex |
| children | alpha name |
| used by | element   toc |
| annotation | documentation<br>Publication source edition |
| source | `<xs:element name="edition">`<br>  `<xs:annotation>`<br>    `<xs:documentation>Publication source edition</xs:documentation>`<br>  `</xs:annotation>`<br>  `<xs:complexType>`<br>    `<xs:sequence>`<br>      `<xs:element ref="alpha"/>`<br>      `<xs:element ref="name"/>`<br>    `</xs:sequence>`<br>  `</xs:complexType>`<br>`</xs:element>` |

*FIG. 11D* element name

| diagram |   Description/file name for the parent element |
|---|---|
| type | xs:string |
| properties | content    simple |
| used by | elements    edition file publication zone |
| annotation | documentation Description/file name for the parent element |
| source | `<xs:element name="name" type="xs:string">`  `<xs:annotation>`  `<xs:documentation>`Description/file name for the parent element`</xs:documentation>`  `</xs:annotation>`  `</xs:element>` | element page

| diagram |   Surface folio (page number) |
|---|---|
| type | xs:string |
| properties | content    simple |
| used by | element    file |
| annotation | documentation Surface folio (page number) |
| source | `<xs:element name="page" type="xs:string">`  `<xs:annotation>`  `<xs:documentation>`Surface folio (page number)`</xs:documentation>`  `</xs:annotation>`  `</xs:element>` |

FIG. 11E element publication

| diagram | 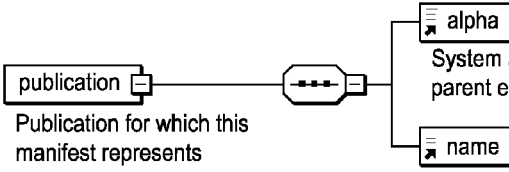 |
|---|---|
| properties | content    complex |
| children | alpha name |
| used by | element    toc |
| annotation | documentation<br>Publication for which this manifest represents |
| source | `<xs:element name="publication">`<br>  `<xs:annotation>`<br>    `<xs:documentation>Publication for which this manifest represents</xs:documentation>`<br>  `</xs:annotation>`<br>  `<xs:complexType>`<br>    `<xs:sequence>`<br>      `<xs:element ref="alpha"/>`<br>      `<xs:element ref="name"/>`<br>    `</xs:sequence>`<br>  `</xs:complexType>`<br>`</xs:element>` | element section

| diagram | 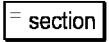 |
|---|---|
| type | xs:string |
| properties | content    simple |
| used by | element    file |
| annotation | documentation<br>Section(s) associated with this content element |
| source | `<xs:element name="section" type="xs:string">`<br>  `<xs:annotation>`<br>    `<xs:documentation>Section(s) associated with this content element</xs:documentation>`<br>  `</xs:annotation>`<br>`</xs:element>` |

FIG. 11F element seq

| diagram | seq<br>Surface-level sequencing |
|---|---|
| type | xs:integer |
| properties | content    simple |
| used by | element    file |
| annotation | documentation<br>Surface-level sequencing |
| source | `<xs:element name="seq" type="xs:integer">`<br>  `<xs:annotation>`<br>    `<xs:documentation>Surface-level sequencing</xs:documentation>`<br>  `</xs:annotation>`<br>`</xs:element>` | element size

| diagram | size<br>Size (in bytes) of this content component |
|---|---|
| type | xs:integer |
| properties | content    simple |
| used by | element    file |
| annotation | documentation<br>Size (in bytes) of this content component |
| source | `<xs:element name="size" type="xs:integer">`<br>  `<xs:annotation>`<br>    `<xs:documentation>Size (in bytes) of this content component</xs:documentation>`<br>  `</xs:annotation>`<br>`<xs:element` |

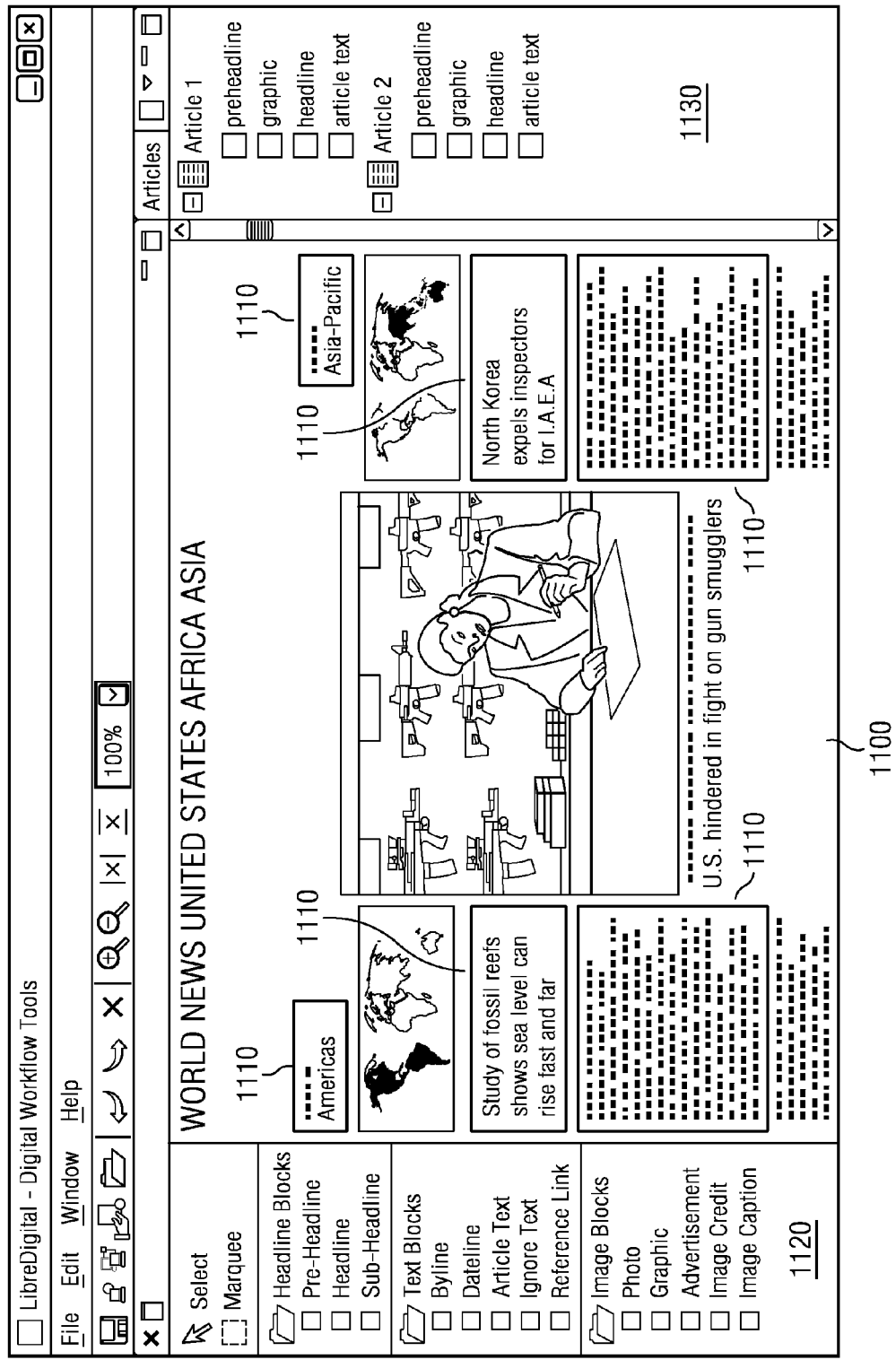

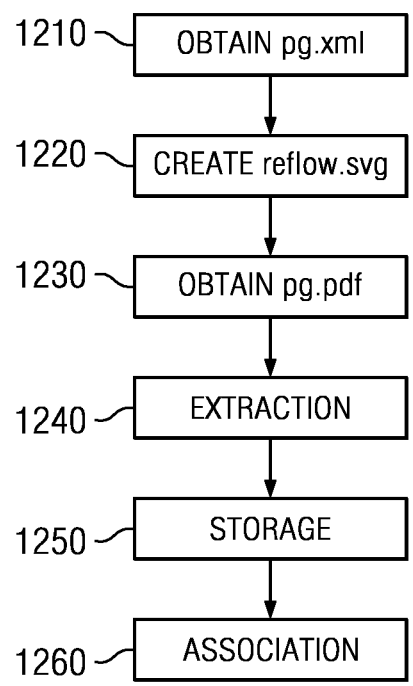

METHOD AND SYSTEM FOR TRANSFORMING AND STORING DIGITAL CONTENT

RELATED APPLICATIONS

This application claims a benefit of priority under 35 U.S.C. §119 to U.S. Provisional Patent Application No. 61/402,502 entitled "Method and System for Transforming Digital Content" by Frederick A. Kern, et al., filed Aug. 31, 2010, and U.S. Provisional Patent Application No. 61/402,543 entitled "Method and System for Managing Digital Content" by Robert E. Beauchamp et al., filed Aug. 31, 2010, the entire contents of each are hereby expressly incorporated by reference for all purposes.

TECHNICAL FIELD

This disclosure relates generally to digital content. Specifically, this disclosure relates to the transformation and storage of digital content. Even more particularly, this disclosure relates to the transformation of digital content into a canonical format and the storage of this digital content in the canonical format.

BACKGROUND

Newspapers, magazines, trade journals, books and other types of visual content have existed in various forms for several hundred years. With the advent of electronic communication devices, however, it is increasingly desired by consumers to view such content using such electronic devices.

Accordingly, digital content has become popular. However, most electronic publications are generated in a single, final form, suitable for a specific purpose or device. Adapting these electronic publications to a different device entails reprocessing the original content. In some cases, point-to-point file generation (i.e., transforming the original content format to the required output format) may be utilized. If the requirements of the output format change or if an additional output format is required, these approaches entail repeating the entire file transformation and generation process, including the quality control steps necessary to ensure that the file transformation is accurate. Additionally, since various formats have their own distinct capabilities regarding the details of the content, point to point transformation has the potential for loss of fidelity with each transformation. This is similar to the loss of fidelity in transforming graphic files from one format (e.g., tif) to another (e.g., jpeg).

What is desired are methods and systems to transform the digital content into a canonical format to normalize the digital content in a way that decouples the digital content from the file format required by consuming devices.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 2 is a depiction of one embodiment of a canonical format for digital content.

FIGS. 3A-3D are depictions of one embodiment of a schema.

FIGS. 5A-5D are depictions of one embodiment of a schema.

FIGS. 7A-7M are depictions of one embodiment of a schema.

FIG. 9 is a flow diagram of one embodiment of a method for transforming digital content.

FIG. 10 is a flow diagram of one embodiment of a method for ingesting and processing digital content.

FIGS. 11A-11H are depictions of one embodiment of a schema.

FIG. 12 is a depiction of one embodiment of an interface for blocking digital content.

FIG. 13 is a flow diagram of one embodiment of a method for associating artifacts of digital content.

SUMMARY

Figure 1:
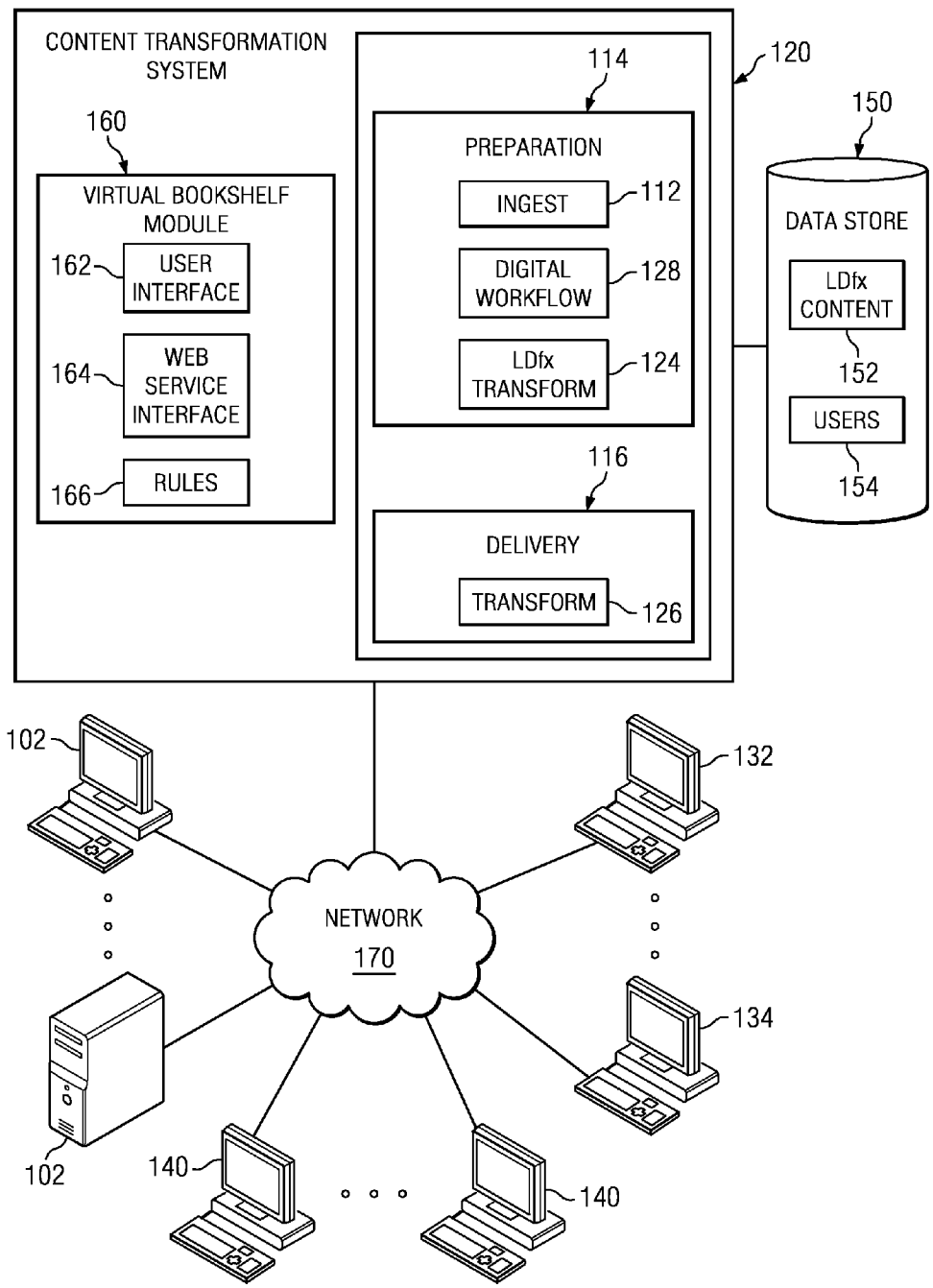
FIG. 1 is a depiction of an embodiment of a system.
Figure 3A:
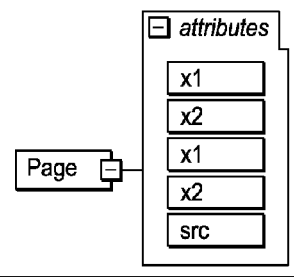

Systems and methods to transform and store digital content are disclosed. These systems and methods may serve to normalize digital content into canonical format to in a way that decouples the digital content from a format that may be required by consuming devices. This decoupling may increase the efficiency of the file processing (since much of it is done only once) and provide flexibility to support additional and changing output formats, while being able to maintain the fidelity of the original source content.

In one embodiment a method for transforming content is disclosed. Digital content comprising one or more files associated with a surface of the digital content may be received. A container for storing the digital content may be created and each of the one or more files stored in a directory of the container. A set of artifacts and a set of associations between the set of artifacts for each surface may be obtained, where each of the set of artifacts is associated with an area of a visual representation of the surface. A structured representation of the set of artifacts for each surface may be created by extracting the content of each of the set of artifacts from the file associated with that surface based on the association between the artifact and the visual representation of the surface. A metadata file describing the association between the artifacts within that surface can also be created and the structured representation and the metadata file for each surface stored in a directory of the container corresponding to that surface. A metadata file describing any associations between one or more artifacts on different surfaces of the digital content may also be created and stored in the container.

In other embodiments, a manifest describing the files comprising the digital content may be received and used to verify the files or create one or more additional files.

In one embodiment, a metadata file describing where each surface exists in the container and a location of each artifact within the container may be created.

In one embodiment, each artifact is associated with an area of the visual representation of a surface by identifying an area of the visual representation of the surface comprising the artifact and associating a type with the artifact.

Thus, embodiments as presented herein may present a number of advantages. Digital content may be received in a variety of formats. This digital content may be presented visually (or in other manners) to a user. As such, these formats may include replica formats that may have an absolute surface layout (regardless of whether there is a corresponding physical publication or not). Accordingly, replica formats may be used for digital content where is may be desired to emulate a physical publication, including publishers of print media publications such as magazines or newspapers, that desire for their digital content to emulate the look and feel of their physical publications. Non-replica formats may not have an absolute layout and may be, for example, used for feeds, etc. where the content may be presented to a user differentially based on the consuming application being utilized by the user.

Using embodiments as disclosed herein, no matter the format in which digital content is received it may be transformed into a canonical format. The representation of the digital content in this canonical format can then be transformed into a different replica or non-replica format where the visual presentation of the new replica of non-replica format may be the same or different than a visual presentation of the original digital content. In other words, suppose that original digital content represents a physical publication and is in a replica format such that when the original digital content is rendered the visual presentation of the digital content substantially emulates the physical publication. This digital content may be represented in a canonical format using embodiments as disclosed. The canonical representation of this digital content may then be transformed into a replica format where the visual presentation of the digital content may emulate a different layout or may be transformed into a non-replica format which may be visually presented in variety of ways that may be different from a representation of the physical publication. Thus, digital content representing a physical publication may be transformed into a variety of formats that may represent other physical layouts or that may otherwise be presented differently than the physical publication.

Before continuing, it may be helpful to be familiar with certain terms and concepts. The first concept may be the Adobe Mars File Format Specification by Adobe Systems Incorporated. Mars is Adobe's specification for XML representation of portable document format data. Mars data is stored within a PDFXML structure. PDFXML is an eXtensible Markup Language (XML)-friendly representation for PDF documents. The PDFXML file format incorporates additional industry standards such as SVG, PNG, JPG, JPG2000, OpenType, Xpath and XML into ZIP-based document container. Portable Document Format (PDF) is a file format created by Adobe Systems in 1993 for document exchange. PDF is used for representing two-dimensional documents in a manner independent of the application software, hardware, and operating system. Scalable Vector Graphics (SVG) is a language for describing two-dimensional graphics and graphical applications in XML.

A surface corresponds to a single page of the source document. In a replica, the surface may comprise a physical layout of content. It will be understood that as used herein, the term surface may also be used to refer to a top-level component of a non-replica format. An artifact is any portion of digital content that was originally received or anything derived from, created based on, or representing the digital content. A flow is an association of artifacts, for example within a surface and a group or grouping is an association of flows across surfaces.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

DETAILED DESCRIPTION

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a HD), hardware circuitry or the like, or any combination.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Embodiments of the present invention can be implemented in a computer communicatively coupled to a network (for example, the Internet), another computer, or in a standalone computer. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, etc.), or the like. In embodiments of the invention, the computer has access to at least one database over the network.

ROM, RAM, and HD are computer memories for storing computer-executable instructions executable by the CPU or capable of being complied or interpreted to be executable by the CPU. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment of the invention, the computer-executable instructions may be lines of C++, Java, HTML, or any other programming or scripting code. Other software/hardware/network architectures may be used. For example, the functions of the present invention may be implemented on one computer or shared among two or more computers. In one embodiment, the functions of the present invention may be distributed in the network. Communications between computers implementing embodiments of the invention can be accomplished using any electronic, optical, ratio frequency signals, or other suitable methods and tools of communication in compliance with known network protocols.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As may be recalled from the above discussion, most digital content is generated in a single, final format, suitable for a specific purpose or device. Adapting this digital content to a different device entails reprocessing the original content. However, direct conversion of digital content into a desired format may be less than ideal, as there may be many formats into which it is desired to convert the original content and such point-to-point conversions may each entail specialized processes. In addition, each of these processes will be susceptible to breakage based on changes in either the input format or the output format. It is thus desired to transform digital content into a canonical format to normalize the digital content in a way that decouples the digital content from the file format required by consuming devices.

To that end, attention is now directed to embodiments of the systems and method presented herein. These embodiments may present a container (data storage format) for the storage of digital content and systems and method for the transformation of digital content such that the digital content is stored in this type of container (referred to herein as the LDfx container). The container may comprise a hierarchically structured set of directories and files comprising a substantially lossless and a lossy portion. The lossless portion may comprise a digital replica of the content and the lossy portion may comprise a representation of the digital content.

Thus, embodiments of the systems and methods disclosed may receive digital content and transform the digital content such that the ingested digital content is stored in a container having a canonical format (known as the LDfx format). When digital content is ingested, an LDfx container associated with the digital content may be created. A manifest identifying and classifying all the input files associated with the content may be stored in the LDfx container along with one or more files comprising this digital content. Artifacts within the digital content and the association between these artifacts may then be identified and stored in the LDfx container associated with the digital content. In this manner, the LDfx container may comprise a structured representation of the artifacts of ingested digital content. Output of a desired format may then be generated from the LDfx container associated with the digital content by using the lossless portion of the LDfx container, the lossy portion of the LDfx container or both.

Accordingly, the representation of the digital content in the LDfx container is decoupled from both the input format in which it was received and any desired output format in which it is desired to obtain the digital content. This decoupling may increase the efficiency of the processing of digital content, since it only needs to be transformed into the LDfx container once and provides flexibility to support additional and changing output formats, while being able to maintain the fidelity of the original source content.

FIG. 1 is a diagram of an embodiment of a content transformation system 120 that may utilize the LDfx format. Content transformation system 120 is coupled to one or more content provider systems 102, user systems 132, 134 and workflow agents 140 over a network 170 (which may, for example, be an intranet, a LAN, a WAN, the Internet, etc.). The content transformation system distribution system may receive digital content in one or more formats from the content providers 102. These content providers 102 may include publishers of printed content (e.g. books, newspapers, magazines, etc.) such as entities in the publishing industry, government entities, private or public entities, etc. who wish to have digital content distributed online or almost any other entity who wants digital content distributed. Digital content may include any almost any material desired, for example digital versions of papers, newsprint material, newspapers, magazines, books, web based content, etc. In many cases, content providers may wish such content to be presented visually to consumers of such content.

Accordingly, these formats may include, for example, a PDF format, text, an XML feed (e.g. RSS, NewsML, etc.), an ePub (for example, as promulgated by the International Digital Publishing Forum), etc. This digital content may be received in a replica format where the position of artifacts within the digital content are defined absolutely with reference to a surface or a reflow format where an artifact is defined relative to one or more other artifacts. Content transformation system 120 may be used to provide digital content to one or more user systems 132, 134.

In order to view such digital content, reader applications may be present on user systems 132, 134. Thus, for example, such user systems 132, 134 may include home or laptop computers executing a reader application such a Microsoft Reader, a mobile device executing a reader application, a dedicated document reader such as a Kindle, a Sony Reader, an Agebook by EBS Technology, or almost any other type of computing device that comprises one or more reader applications for viewing digital documents. These reader applications may, however, only be operable to be utilized with digital documents of certain formats. For example, an Amazon Kindle may not be operable for use with a digital document in the .epub format while a Sony Reader may be operable for use with this type of format.

As the digital content may be provided in one format from content provider 102 but may be desired by users at computer systems 132, 134 in a format compatible with their reader application, content transformation system 120 may transform digital content received in one format from content provider system 102 to one or more second formats that may be compatible with readers at the user's computer systems 132, 134.

It will be noticed, as discussed above, that if multiple formats are utilized by content providers 102 and multiple distinct formats are utilized by readers at user computer system 132, 134 the task of providing digital content in a suitable format becomes increasingly difficult. To address this situation, embodiments of content transformation system 120 may utilize a canonical format such that digital content received from content providers 102 may be transformed into this canonical format (referred to herein as the LDfx container format) and stored in data store 150 in this canonical format. This canonical format may facilitate the transformation of the digital document to other formats desired by user devices 132, 134, 136. Thus, embodiments may provide numerous advantages including consuming less storage as only the digital content in the LDfx format may need to be stored, providing for easier and less resource intensive transformation into the desired format(s) with better fidelity to the original source material, extensibility to new formats that may be developed all while simultaneously reducing costs to the content providers and operators of content transformation system 120.

In one embodiment, a container in the LDfx format may include XML and auxiliary assets that captures substantially all attributes of the digital content necessary to preserve the fidelity of the original source material. Once the digital content is stored in a container of the LDfx format, the content transformation system 116 may use the LDfx container storing the digital content to produce an output format that may comprise, for example, static files, a feed, or real-time custom variations of that content. These custom variations can, for example, be tuned to optimize the content given the capabilities and limitations of any new or future reading device.

Therefore, content transformation system 120 includes a content preparation module 114 for receiving digital content and transforming such digital content from a first format to the LDFx format and store the content 152 in a container of the LDfx format (referred to as an LDfx container) in the data store 150. Content preparation module 114 may, in turn, comprise an ingest module 112 for receiving digital content from content provider systems 102, an LDfx transform module 124 for transforming ingested digital content into the LDfx format and storing the content in an LDfx container at the content transformation system 120 and a digital workflow tool (DWT) module 128.

DWT module 128 may allow associated users at computing device 140 to perform one or more tasks associated with the transformation of digital content. More specifically, the DWT module 128 may facilitate the packaging and communication of tasks associated with the transformation of a piece of digital content to one or more computing devices 140. Users at these computing devices 140 may perform these tasks using, for example, a client application installed on the users computing device 140 and the results may be returned to the DWT module 128 which stores them in association with the LDfx container associated with the digital content being transformed. Such tasks will be elaborated on in more detail herein at a later point.

Content delivery module 116 can access the digital content in the LDfx format 152 to provide this digital content to a user. Thus, content delivery module 116 may have a transform service module 126 that may process the digital content in the LDfx container to generate the digital content in a desired format (for example, for a user computer systems 132, 134) or a Universal Reader API module (not shown) that may be used to respond to requests for certain digital content.

In one embodiment, as digital content is stored in the data store 150 in a canonical format and can be easily transformed to multiple different formats, types of encryption, etc., a user may be provided with the ability to access digital content to which they have rights and have that content delivered to them in a desired manner, including an appropriate format. Content transformation system 120 may therefore, in one embodiment, comprise one or more modules which allow users to access the content. One example of such a module is virtual bookshelf module 160. Virtual bookshelf module 160 may comprise a user interface module 162, a web service interface module 164 and a rules module 166.

Virtual bookshelf module 160 may receive a user identifier or other type of user authentication information and based on user accounts 154 stored in the data store 150 obtain a set of identifiers for content items to which the user has access rights. For example, the user account 154 may have a list of ISBN numbers corresponding to books that the user has purchased, either through the content transformation system or another location. The virtual bookshelf module 160 can present a list of the identified content items to the user. For example, a display that resembles a bookshelf having books associated with the identified content items may be presented or another format may be used. A user may select a particular content item whose identifier is provided to virtual bookshelf module 160. Based on the identifier and the account 154 associated with the user, rules module 166 may identify one or more actions to be taken. These actions may include providing the content in a particular format, using a particular encryption, a method or location for delivering the formatted content, etc.

Based on these actions, virtual bookshelf module 160 may obtain the identified content in the LDfx format from LDfx content 152 in the data store 150 and perform the various actions with respect to the digital content in the LDfx format including transforming the digital content from the LDfx format to a desired format or encrypting the digital content according to the actions or delivering the digital content in a particular manner. Virtual bookshelf module 160 may utilize delivery module 116 to perform formatting, encryption or delivery of the digital content, or alternatively may interface with one or more third party systems to perform the encryption or delivery, for example using web service provided by these third party sites.

More specifically, in certain embodiments, user interface module 162 may provide an interface such as a web site or application interface that may be accessed by a user from the user's device 132, 134. The user may be authenticated through this interface such that a user identifier may be provided to the virtual bookshelf module 160. Using the provided user identifier then, the user account 154 corresponding to the user may be accessed and the content items to which the user has access rights determined. The user interface module 162 may then form an interface to present the list of these content items to the user at the user's device 132, 134. This interface may, for example, render a likeness of books with titles corresponding to the content items to which the user has access. The user may select a desired content item using the presented interface. The user may also use the interface to identify the type of device, reader application or other criteria associated with the user. Alternatively, criteria associated with the user may be identified from the user account 154 corresponding to the user or the metadata associated with the content item specified or identified using a request received by the virtual bookshelf module which may include values for such criteria as device type, application, browser types, etc. Virtual bookshelf module 160 may then access the digital content in LDfx format corresponding to the content item identified by the user, transform the digital content according to the user's specified criteria and deliver this digital content to the user.

Similar functionality may be provided through web services interface module 164. These web services may be utilized by a third party (such as a content provider 102) to provide similar functionality through, or in conjunction with, an interface provided by that content provider. Specifically, in one embodiment, a content provider 102 may have their own interface (for example, a web site or the like) through which a user can purchase or otherwise access content items which they provide. If a user purchases a content item through the content provider 102 interface, a user identifier and an identifier for that content item may be sent to the content transformation system 120 such that the purchased content item may be associated with that user. In one embodiment, if a user account 154 for that user has not been created, a user account is created, and the content item is associated with the user's account (for example, by associating the identifier for the content item with the user account). It should be noted that the digital content associated with that content item may be provided by content provider system 102 to content transformation system 120 for ingest and transformation to LDfx format (as discussed above) asynchronously to the purchase of this content item (for example, at some time before or after the content item is purchased).

In any event, a user may also access the interface provided by the content provider 102 to access their content. The user may be authenticated through the interface provided by content provider 102. The content provider 102 may then use web interface module 164 to provide a user identifier corresponding to the user to the virtual bookshelf module 160. Using the provided user identifier then, the user account 154 corresponding to the user may be accessed and the content items to which the user has access rights determined. It will be noted here that there be a single user account for a user where all content items to which the user has access may be associated with the is account. In this case, the content items associated with both that particular content provider 102 and that user may be determined. Alternatively, the user may have an account associated with that content provider 102 such that only content associated with that user and that content provider 102 is associated with that user account. Other arrangements are possible.

An interface to present the list of these content items to the user at the user's device 132, 134 may be formed and returned to the content provider 102 for presentation to the user or the interface may be presented by virtual bookshelf module 160 to the user (for example, using a pop-up window or the like). Alternatively, the list of content items may be returned to the content provider 102 and the content provider 102 may form such an interface using the returned list. Using the interface presented then, the user may identify a content item to which he desires access. An identifier for this content item may then be provided to the virtual bookshelf module 160 through the web services interface module 164. The user may also use the interface to identify the type of device, reader application or other criteria associated with the user. Alternatively, criteria associated with the user may be identified from the user account 154 corresponding to the user or the metadata associated with the content item specified Virtual bookshelf module 160 may then access the digital content in LDfx format corresponding to the content item identified by the user, transform the digital content according to the user's specified criteria and deliver this digital content to the user.

Thus, notice that in the user cases presented with respect to the virtual bookshelf module 160 the content transformation system 120 allows a user's ownership rights in a content item to be separated from any particular format, encryption, delivery method, device, etc. The content transformation system 120 serves as a central repository for the digital content in a canonical format such that a content item in which the user has rights may be utilized by a user regardless of the devices or applications a user desires to use to access this content item.

It will be helpful to an understanding of certain embodiment to discuss embodiments of a canonical format herein in more detail. It will be understood that though the following embodiments is described with respect to a hierarchically organized directory structure other embodiments may be implemented using other storage formats or methods that allow such a hierarchy or similar associations to be made, such as, for example, a relational database or the like.

Turning then to FIG. 2, one embodiment of a canonical format, referred to herein as LDfx format, is depicted. Such a canonical format may be utilized to store the digital content in a manner that is independent from an original format of the content (for example, the format in which the content was originally received). The LDfx format is therefore a set of hierarchically organized assets. These assets may comprise a replica portion and a representation, including a textual representation or the like. It will be helpful to an understanding the replica portion to understand the Adobe Mars File Format Specification by Adobe Systems Incorporated, which is hereby incorporated fully herein by reference for all purposes. The replica portion (and the representative portion) can be utilized in the transformation of the digital content from the LDfx format to a replica format, while the representation may be utilized in the transformation of the digital content from the LDfx format to a non-replica format.

Referring now to FIG. 2, LDfx container 200 is a hierarchically structured collection of elements that is a canonical format for the storage of a digital content. The LDFX directory 202 is the top-level directory within the LDfx container. Thus, all the artifacts used to represent a piece of digital content in an LDfx container would be stored under a corresponding LDfx directory 200. An artifact is any portion of digital content that was originally received or anything derived from, created based on, or representing the digital content. Artifacts may be nested such that one artifact may comprise or reference other artifacts.

In the LDFX directory 200 there are a mimetype file 204, a backbone.xml file 206, a META-INF directory 208, a page directory 212, and a file directory 240. The mimetype file 204 describes the structure and types of artifacts within the digital content. The mimetype file 204 may be a Multipurpose Internet Mail Extensions (MIME) file describing the structure of artifacts within digital content. For example, as digital content may be associated with a newspaper, artifacts may include such things as articles, headlines, bylines, images, credits, advertisements, etc., artifacts for digital content that is a book may include such things as, for example, chapters and pages, etc., artifacts for feeds may include such things section, article, headline, etc. The mimetype file 204 may describe all, or a subset, of artifacts which it is desired to use to represent digital content. In some embodiments, it may be the case the mimetype file 204 is the first file in the LDfx container 200.

The backbone.xml file 206 may be the root file of the document, describing the digital content within the LDfx container 200, referencing artifacts that comprise the digital content and reference to surface-level information files that comprise the digital content and other files that add features to the digital content, such as forms, page labels, bookmarks, and articles. In one embodiment, the backbone.xml file may be a high level of definition of surfaces in the digital content of the container 200 and act as a manifest for the container 200 describing where each surface exists in the container 200, the location of each artifact within the LDFX container 200 and relating the artifacts on each surface to its location within the LDfx container 200. If the original digital content has no physical surface information (e.g. in the case of a feed) backbone.xml may identify the location of one or more types of artifacts, such as a section or article.

META-INF directory 208 may be a directory where the highest-level metadata may be placed. This directory may comprise a metadata.xml file 210. This metadata file may comprise data on groupings corresponding to the digital content represented by the container 200, including data relating individual surfaces or high-level artifacts on each of the surfaces to one another. In one embodiment, metadata.xml 210 may comprise digital content level metadata as well as a section or surface to flow to artifact mapping within the digital content in XML format. In one embodiment, metadata.xml 210 may comprise one or more associations between artifacts of different surfaces or sections of the digital content.

Under the LDFX directory 202 there is page directory 212. Under the page directory 212 there are one or more numbered directories 214 (generically referred to here as "x", in other words, an "x" directory 214 is one numbered directory, for example one "x" directory may have the path /LDFX/page/1, another "x" directory may have the path LDFX/page/2, etc.). These "x" directories 214 represent each surface (for example, surface or top level component in a feed such as a section) in the document. Thus, there may be one subdirectory 214 for each surface.

The "x" directories 214 are named as the zero-indexed number of the surface they represent. For example, the LDFX/page/0 directory contains the contents of the first surface in the digital content. "x" is the zero-indexed alphanumeric surface name. Surface content files for page x would go in /page/x/. Note that the numbering of these directories may not correspond to page numbers in a corresponding printed publication. Also, directories like /page/5a might exist to cover case for a surface inserted between 5 and 6. A useful convention in numbering these files is to number surface with a fixed number of digits in the filename (e.g., 0001, 0002, etc.). In one embodiment, files associated with a particular surface will be placed in the corresponding directory for that surface.

In each of the "x" directories 214 (e.g. LDFX/page/0001, LDFX/page/0002, etc.) there is an info.xml file 216, a metadata.xml file 218, a pg.xml file 220, a reflow.svg file 222, an image directory 224, a pdf directory 228 and a swf directory 236 that correspond to the surface associated with that "x" directory.

An info.xml file 216 may be information about the surface, such as the location of files comprising content for the corresponding surface, the surface's size, dimension, ratio or orientation information, etc. The metadata.xml file 218 comprises a structured representation of a physical layout of the corresponding surface and the flows within that surface. In one embodiment, the info.xml file comprises identifying information about all artifacts within that surface. This file may be broken up into four distinct parts; sections, images, flows and surface. The sections part maps the artifacts within this surface to the specific work level "section". The images part specifies the locations within the surface that contain image artifacts. The flows part indicates all flows represented on the surface as well as all of the artifacts which make up the flow. The surface part indicates the page folio, sequence and imposition. It may also specify the size and location of the full size image representation of the surface. The metadata.xml file 18 may references one or more artifacts described in the pg.xml 220.

Pg.xml 220 file contains all the artifacts for a surface and the artifact level associations and identifications associated with the corresponding surface. Thus, the pg.xml file 220 may describe the surface by identifying the artifacts on the surface and how the artifacts are associated with one another with respect to the corresponding page. Each of the artifacts in the pg.xml file may be associated with an area of a visual representation of the surface. In one embodiment, the page.xml file 220 may describe the pg.pdf file 232 by associating the artifacts with at least a portion of the pg.pdf file 232.

The Reflow.svg file 222 is a scalable vector graphics (SVG) file that specifies the text and graphics of the corresponding surface. Thus, the reflow.svg file may be a structure representation of the artifacts on the corresponding surface. The identities and associations as defined in pg.xml are realized in the reflow.svg file 222. Thus, the reflow.svg may comprise content extracted from the pg.pdf utilizing definitions in the pg.xml. In one embodiment, the reflow.svg file 222 may comprise the text and graphics extracted from artifacts of the corresponding surface. This file may be the surface/flow-level representation and may be used for the conversion of the digital content to a desired format. The reflow.svg file 222 may be transformed into a desired output format using an XML transform. Thus, in certain embodiments, the reflow.svg file 222 may comprise information on artifacts, such as whether the artifact is bold, italic, superscript, where on the page the artifact is located, etc.

Examples of elements that may be included in a schema for a reflow.svg file include the following (it will be apparent that these are examples only, and additional, different or fewer elements may be utilized in other embodiments):

Surface

<g class="surface" typeof="page" label="1">, etc.

The surface element may be used to capture as a physical surface for print media. Even though a page in a book is one piece of material it may have 2 surfaces. The surface element will allow for metadata about that surface to be placed.

Flow

<g class="flow" typeof="advertisement">
<g class="flow" typeof="article">
<g class="flow" typeof="teaser">
<g class="flow" typeof="teasergroup">, etc.

The flow element may be used to capture logical associations of content within a surface. For example the flow of a book could be the entire surface or if the surface contains a chapter end and a chapter start then the surface would contain two separate flow elements. To continue the examples with a newspaper surface a flow would be all the content on a given surface that makes up an article. One flow element can be linked to another flow element via a "continue" block. The flow element may allow for metadata about that flow to be placed.

Block
<g class="block" typeof="imagegroup">
<g class="block" typeof="image">
<g class="block" typeof="imagecredit">
<g class="block" typeof="imagecaption">
<g class="block" typeof="preheadline">
<g class="block" typeof="headline">
<g class="block" typeof="subheadline">
<g class="block" typeof="byline">
<g class="block" typeof="dateline">
<g class="block" typeof="articletext">
<g class="block" typeof="continue">
<g class="block" typeof="reference">, etc.

The block element will be used to capture content within flow elements. Block elements will represent logical sub-structures of content with in a flow element. For example a paragraph in a book would be considered as a block element. Another example of a block element for a newspaper would an image for an article. The block element will allow for meta-data about that block to be placed.

<g class="block" typeof="para">

Blocks of type "para" indicate the grouping of text blocks which form a lexical paragraph.

Text

<text transform="matrix(1 0 0-1 0 707.229)" font-size="8.468" font-family="F16" fill="rgb(0,0,0)" fill-rule="evenodd" x="347.668 353.6549 361.0559 365.3745 369.0581 371.4037 375.4006 379.9055 0 387.1203 391.5406 394.279 396.9967 399.343 403.3992 405.7448 410.2498 412.5615 0 418.8617 422.8247 427.3297 429.6753 0 436.7883 439.7353 444.5621 0 451.2179 457.1371 461.9554 465.5881 470.0085 474.8013 479.1199 483.6249">American officials said the European</text>, etc.

The text element may be used to capture lines of text within a block. Text elements will represent text from the logical begin to end of text. The text element may allow for metadata attributes of that text that can override the block to be placed. Matrix and positional information of individual glyphs contained within the text flows are supplied if available.

Span

<text transform="matrix(1 0 0-1 0 1302.464)" font-size="24.300" font-family="F1" fill="rgb(0,0,0)" fill-rule="evenodd" x="16.577 35.945 54.555 64.0396 0 81.4944 96.6377 117.2806 135.8912 162.6714 0 185.7849 214.3978 234.1243 251.9772 283.2602"><tspan font-size="39.851" fill="rgb(200,45,15)">P</tspan>oll shows Obama</text>, etc.

The span element may only be used within a text element to capture instances of characters that either extend outside the text box of a line or have different styling needs. For example the first character of the first line in a book chapter may be of a size where the baseline of that character is on the third line of the paragraph. Another example would be characters that have a different color or font than the current line. The span element may allow for metadata about that span that can override either the block or text to be placed.

Referring still to FIG. 2, the image directory 224 may comprise an image of the surface in a substantially lossless format. In one embodiment, this image may be a substantially full color, substantially full size, substantially full resolution tif image named pg.tif 226. In one embodiment this TIF is used as the base image for all sub-surface image extraction. It may be the primary artifact that will be used to generate images for blocking, tagging and proofing (described at a later point herein).

The pdf directory 228 may comprise original files for the corresponding page, including files which have been processed or normalized. Thus, the pdf directory may comprise three files, pg_parse.pdf 230, pg.pdf 232 and pg_swf.pdf 234. Pg_parse.pdf file 230 may be the initial pdf formatted preprocessed replica representation of the surface, pg.pdf file 232 may be the post-processed (e.g. normalized) replica representation of the surface which is utilized for all textual processing and pg_swf.pdf 234 may be the post-processed replica representation of the surface which is utilized for generating the pg.swf file 238. The pg_swf.pdf may be a rasterized version of pg_parse.pdf 230 which, for example, has been simplified or flattened.

The swf directory 236 may comprise a representation of the corresponding page. Thus, swf directory 236 may comprise pg.swf file 238 which may be a small web format (swf) formatted replica representation of the corresponding page. File directory 240 may comprise the digital content in its original format. Thus, file directory 240 may comprise the originally received set of files in the case where the original digital content was received in a replica format or may comprise the data from the original feed (e.g. in one or more files), if the digital content was received as a feed.

It may be useful here to go into more details regarding various schema that may be utilized in conjunction with embodiments as disclosed herein. FIGS. 3A-3D depicts one embodiment of a schema that may be utilized for backbone.xml 206. In one embodiment, the XML Schema Definition (XSD) that may be utilized for backbone.xml 206 may be:

```
<?xml version="1.0" encoding="UTF-8"?>
<xs:schema xmlns:xs="http://www.w3.org/2001/XMLSchema">
    <xs:element name="Pages">
        <xs:complexType>
            <xs:sequence>
                <xs:element ref="Page" maxOccurs="unbounded"/>
            </xs:sequence>
        </xs:complexType>
    </xs:element>
    <xs:element name="Page">
        <xs:complexType>
            <xs:attribute name="x1" use="required">
                <xs:simpleType>
                    <xs:restriction base="xs:decimal">
                    </xs:restriction>
                </xs:simpleType>
            </xs:attribute>
            <xs:attribute name="x2" use="required">
                <xs:simpleType>
                    <xs:restriction base="xs:decimal">
                    </xs:restriction>
                </xs:simpleType>
            </xs:attribute>
            <xs:attribute name="y1" use="required">
                <xs:simpleType>
                    <xs:restriction base="xs:decimal"
                    </xs:restriction>
                </xs:simpleType>
            </xs:attribute>
            <xs:attribute name="y2" use="required">
                <xs:simpleType>
                    <xs:restriction base="xs:decimal">
                    </xs:restriction>
                </xs:simpleType>
            </xs:attribute>
            <xs:attribute name="src" use="required">
                <xs:simpleType>
                    <xs:restriction base="xs:string">
                    </xs:restriction>
                </xs:simpleType>
            </xs:attribute>
        </xs:complexType>
    </xs:element>
```

```
            <xs:element name="PDF">
                <xs:complexType>
                    <xs:sequence>
                        <xs:element ref="Pages"/>
                    </xs:sequence>
                    <xs:attribute name="Version" use="required">
                        <xs:simpleType>
                            <xs:restriction base="xs:string">
                            </xs:restriction>
                        </xs:simpleType>
                    </xs:attribute>
                    <xs:attribute name="PDFVersion" use="required">
                        <xs:simpleType>
                            <xs:restriction base="xs:decimal">
                            </xs:restriction>
                        </xs:simpleType>
                    </xs:attribute>
                </xs:complexType>
            </xs:element>
</xs:schema>
```

Figure 4B:
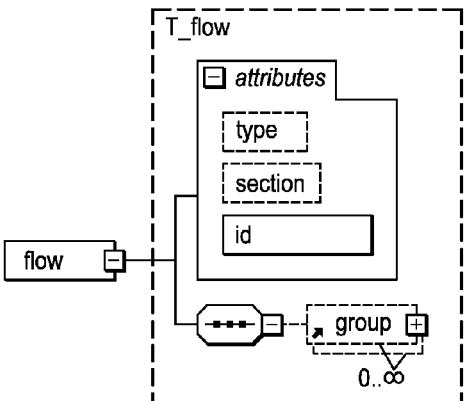
FIGS. 4A-4V are depictions of one embodiment of a schema.
Figure 4J:
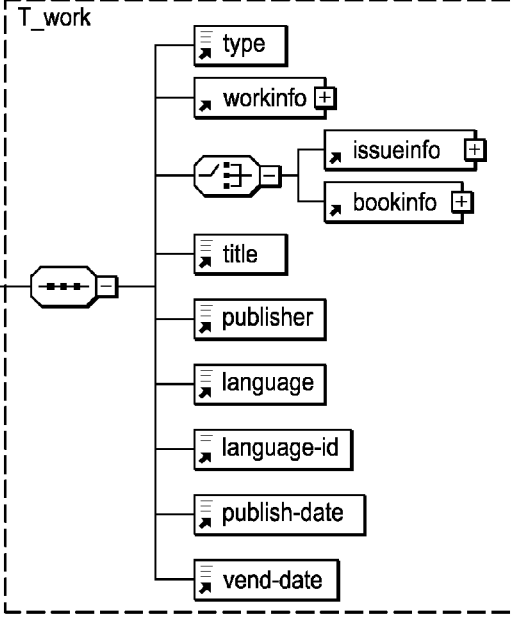
Figure 6A:
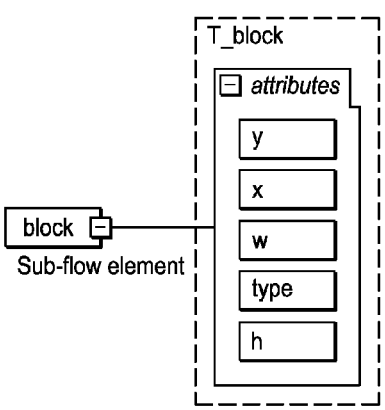
FIGS. 6A-6W are depictions of one embodiment of a schema.
Figure 6H:
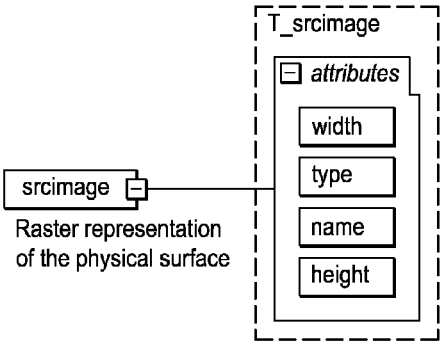
Figure 6Q:
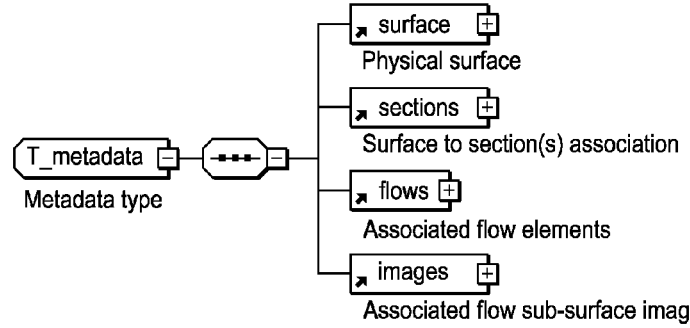
Figure 6V:
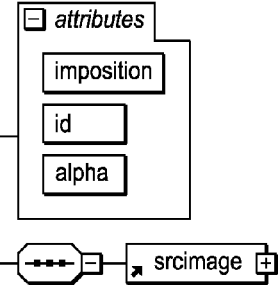
Figure 7F:
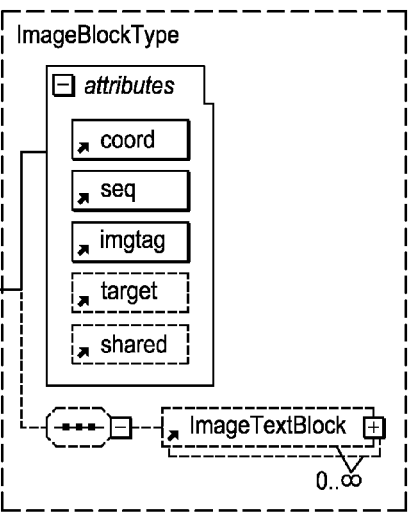
Figure 7I:
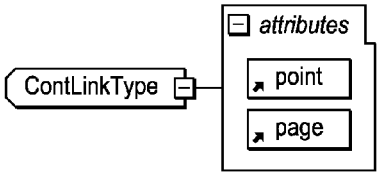
Figure 7K:
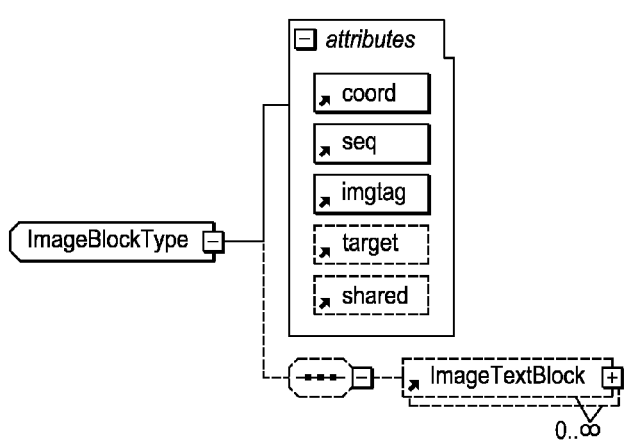

FIGS. 4A-4V depicts one embodiment of a schema that may be utilized for metadata.xml 210. In one embodiment, the XML Schema Definition (XSD) that may be utilized for metadata.xml 210 may be:

```
<?xml version="1.0" encoding="UTF-8"?>
<xs:schema xmlns:xs="http://www.w3.org/2001/XMLSchema">
    <xs:simpleType name="T_vend-date">
        <xs:restriction base="xs:string"/>
    </xs:simpleType>
    <xs:simpleType name="T_type">
        <xs:restriction base="xs:string">
            <xs:enumeration value="book"/>
            <xs:enumeration value="magazine"/>
            <xs:enumeration value="newspaper"/>
        </xs:restriction>
    </xs:simpleType>
    <xs:simpleType name="T_title">
        <xs:restriction base="xs:string"/>
    </xs:simpleType>
    <xs:simpleType name="T_publisher">
        <xs:restriction base="xs:string"/>
    </xs:simpleType>
    <xs:simpleType name="T_publish-date">
        <xs:restriction base="xs:string"/>
    </xs:simpleType>
    <xs:simpleType name="T_onix-product-id">
        <xs:restriction base="xs:string"/>
    </xs:simpleType>
    <xs:simpleType name="T_language-id">
        <xs:restriction base="xs:string"/>
    </xs:simpleType>
    <xs:simpleType name="T_language">
        <xs:restriction base="xs:string"/>
    </xs:simpleType>
    <xs:simpleType name="T_issue-id">
        <xs:restriction base="xs:string"/>
    </xs:simpleType>
    <xs:simpleType name="T_issn">
        <xs:restriction base="xs:string"/>
    </xs:simpleType>
    <xs:simpleType name="T_isbn">
        <xs:restriction base="xs:string"/>
    </xs:simpleType>
    <xs:simpleType name="T_id">
        <xs:restriction base="xs:string"/>
    </xs:simpleType>
    <xs:simpleType name="T_beid">
        <xs:restriction base="xs:string"/>
    </xs:simpleType>
```

```
    <xs:complexType name="T_workinfo">
        <xs:sequence>
            <xs:element ref="id"/>
        </xs:sequence>
    </xs:complexType>
    <xs:complexType name="T_work">
        <xs:sequence>
            <xs:element ref="type"/>
            <xs:element ref="workinfo"/>
            <xs:choice>
                <xs:element ref="issueinfo"/>
                <xs:element ref="bookinfo"/>
            </xs:choice>
            <xs:element ref="title"/>
            <xs:element ref="publisher"/>
            <xs:element ref="language"/>
            <xs:element ref="language-id"/>
            <xs:element ref="publish-date"/>
            <xs:element ref="vend-date"/>
        </xs:sequence>
    </xs:complexType>
    <xs:complexType name="T_surfaces">
        <xs:sequence>
            <xs:element ref="surface" minOccurs="0" maxOccurs="unbounded"/>
        </xs:sequence>
    </xs:complexType>
    <xs:complexType name="T_surface">
        <xs:sequence>
            <xs:element ref="flow" minOccurs="0" maxOccurs="unbounded"/>
        </xs:sequence>
        <xs:attribute name="imposition">
            <xs:simpleType>
                <xs:restriction base="xs:string">
                    <xs:enumeration value="left"/>
                    <xs:enumeration value="right"/>
                </xs:restriction>
            </xs:simpleType>
        </xs:attribute>
        <xs:attribute name="id" use="required">
            <xs:simpleType>
                <xs:restriction base="xs:string"/>
            </xs:simpleType>
        </xs:attribute>
        <xs:attribute name="alpha">
            <xs:simpleType>
                <xs:restriction base="xs:string"/>
            </xs:simpleType>
        </xs:attribute>
    </xs:complexType>
    <xs:complexType name="T_sections">
        <xs:sequence>
            <xs:element ref="section" minOccurs="0" maxOccurs="unbounded"/>
        </xs:sequence>
    </xs:complexType>
    <xs:complexType name="T_section">
        <xs:sequence>
            <xs:element ref="surface" maxOccurs="unbounded"/>
        </xs:sequence>
        <xs:attribute name="name" use="required">
            <xs:simpleType>
                <xs:restriction base="xs:string"/>
            </xs:simpleType>
        </xs:attribute>
        <xs:attribute name="id" use="required">
            <xs:simpleType>
                <xs:restriction base="xs:string"/>
            </xs:simpleType>
        </xs:attribute>
    </xs:complexType>
    <xs:complexType name="T_metadata">
        <xs:sequence>
            <xs:element ref="work"/>
            <xs:element ref="sections"/>
            <xs:element ref="surfaces"/>
        </xs:sequence>
    </xs:complexType>
```

```
<xs:complexType name="T_issueinfo">
    <xs:sequence>
        <xs:element ref="issue-id"/>
        <xs:element ref="issn"/>
    </xs:sequence>
</xs:complexType>
<xs:complexType name="T_group">
    <xs:attribute name="id" use="required">
        <xs:simpleType>
            <xs:restriction base="xs:string"/>
        </xs:simpleType>
    </xs:attribute>
</xs:complexType>
<xs:complexType name="T_flow">
    <xs:sequence>
        <xs:element ref="group" minOccurs="0" maxOccurs="unbounded"/>
    </xs:sequence>
    <xs:attribute name="type">
        <xs:simpleType>
            <xs:restriction base="xs:string"/>
        </xs:simpleType>
    </xs:attribute>
    <xs:attribute name="section">
        <xs:simpleType>
            <xs:restriction base="xs:string"/>
        </xs:simpleType>
    </xs:attribute>
    <xs:attribute name="id" use="required">
        <xs:simpleType>
            <xs:restriction base="xs:string"/>
        </xs:simpleType>
    </xs:attribute>
</xs:complexType>
<xs:complexType name="T_bookinfo">
    <xs:sequence>
        <xs:element ref="beid"/>
        <xs:element ref="isbn"/>
        <xs:element ref="onix-product-id"/>
    </xs:sequence>
</xs:complexType>
<xs:element name="workinfo" type="T_workinfo"/>
<xs:element name="work" type="T_work"/>
<xs:element name="vend-date" type="T_vend-date"/>
<xs:element name="type" type="T_type"/>
<xs:element name="title" type="T_title"/>
<xs:element name="surfaces" type="T_surfaces"/>
<xs:element name="surface" type="T_surface"/>
<xs:element name="sections" type="T_sections"/>
<xs:element name="section" type="T_section"/>
<xs:element name="publisher" type="T_publisher"/>
<xs:element name="publish-date" type="T_publish-date"/>
<xs:element name="onix-product-id" type="T_onix-product-id"/>
<xs:element name="metadata" type="T_metadata"/>
<xs:element name="language-id" type="T_language-id"/>
<xs:element name="language" type="T_language"/>
<xs:element name="issueinfo" type="T_issueinfo"/>
<xs:element name="issue-id" type="T_issue-id"/>
<xs:element name="issn" type="T_issn"/>
<xs:element name="isbn" type="T_isbn"/>
<xs:element name="id" type="T_id"/>
<xs:element name="group" type="T_group"/>
<xs:element name="flow" type="T_flow"/>
<xs:element name="bookinfo" type="T_bookinfo"/>
<xs:element name="beid" type="T_beid"/>
</xs:schema>
```

FIG. 5 depicts one embodiment of a schema that may be utilized for info.xml 216. In one embodiment, the XML Schema Definition (XSD) that may be utilized for info.xml 216 may be:

```
<?xml version="1.0" encoding="UTF-8"?>
<!-- edited with XMLSpy v2010 rel. 3 sp1 (x64)
(http://www.altova.com) by Maggie Way (LibreDigital) -->
<xs:schema xmlns:xs="http://www.w3.org/2001/XMLSchema">
    <xs:element name="Page">
        <xs:annotation>
            <xs:documentation>Top-level element for this surface</xs:documentation>
        </xs:annotation>
        <xs:complexType>
            <xs:sequence>
                <xs:element ref="Contents"/>
                <xs:element ref="CropBox"/>
            </xs:sequence>
            <xs:attribute name="Rotate" use="required">
                <xs:simpleType>
                    <xs:restriction base="xs:integer"/>
                </xs:simpleType>
            </xs:attribute>
        </xs:complexType>
    </xs:element>
    <xs:element name="CropBox">
        <xs:annotation>
            <xs:documentation>Surface bounds coordinates</xs:documentation>
        </xs:annotation>
        <xs:complexType>
            <xs:attribute name="x1" use="required">
                <xs:simpleType>
                    <xs:restriction base="xs:decimal"/>
                </xs:simpleType>
            </xs:attribute>
            <xs:attribute name="y1" use="required">
                <xs:simpleType>
                    <xs:restriction base="xs:decimal"/>
                </xs:simpleType>
            </xs:attribute>
            <xs:attribute name="x2" use="required">
                <xs:simpleType>
                    <xs:restriction base="xs:decimal"/>
                </xs:simpleType>
            </xs:attribute>
            <xs:attribute name="y2" use="required">
                <xs:simpleType>
                    <xs:restriction base="xs:decimal"/>
                </xs:simpleType>
            </xs:attribute>
        </xs:complexType>
    </xs:element>
    <xs:element name="Contents">
        <xs:annotation>
            <xs:documentation>Relative location to the reflow.svg (textual map)</xs:documentation>
        </xs:annotation>
        <xs:complexType>
            <xs:attribute name="src" use="required">
                <xs:simpleType>
                    <xs:restriction base="xs:string"/>
                </xs:simpleType>
            </xs:attribute>
        </xs:complexType>
    </xs:element>
</xs:schema>
```

FIG. 6 depicts one embodiment of a schema that may be utilized for metadata.xml 218. In one embodiment, the XML Schema Definition (XSD) that may be utilized for metadata.xml 218 may be:

```
<?xml version="1.0" encoding="UTF-8"?>
<!-- edited with XMLSpy v2010 rel. 3 sp1 (x64)
```

```
(http://www.altova.com) by Maggie Way (LibreDigital) -->
<xs:schema xmlns:xs="http://www.w3.org/2001/XMLSchema">
    <xs:complexType name="T_surface">
        <xs:annotation>
            <xs:documentation>Surface type</xs:documentation>
        </xs:annotation>
        <xs:sequence>
            <xs:element ref="srcimage"/>
        </xs:sequence>
        <xs:attribute name="imposition" use="required">
            <xs:simpleType>
                <xs:restriction base="xs:string"/>
            </xs:simpleType>
        </xs:attribute>
        <xs:attribute name="id" use="required">
            <xs:simpleType>
                <xs:restriction base="xs:string"/>
            </xs:simpleType>
        </xs:attribute>
        <xs:attribute name="alpha" use="required">
            <xs:simpleType>
                <xs:restriction base="xs:string"/>
            </xs:simpleType>
        </xs:attribute>
    </xs:complexType>
    <xs:complexType name="T_srcimage">
        <xs:annotation>
            <xs:documentation>Source Image type</xs:documentation>
        </xs:annotation>
        <xs:attribute name="width" use="required">
            <xs:simpleType>
                <xs:restriction base="xs:string"/>
            </xs:simpleType>
        </xs:attribute>
        <xs:attribute name="type" use="required">
            <xs:simpleType>
                <xs:restriction base="xs:string"/>
            </xs:simpleType>
        </xs:attribute>
        <xs:attribute name="name" use="required">
            <xs:simpleType>
                <xs:restriction base="xs:string"/>
            </xs:simpleType>
        </xs:attribute>
        <xs:attribute name="height" use="required">
            <xs:simpleType>
                <xs:restriction base="xs:string"/>
            </xs:simpleType>
        </xs:attribute>
    </xs:complexType>
    <xs:complexType name="T_sections">
        <xs:annotation>
            <xs:documentation>Sections type</xs:documentation>
        </xs:annotation>
        <xs:sequence>
            <xs:element ref="section" minOccurs="0" maxOccurs="unbounded"/>
        </xs:sequence>
    </xs:complexType>
    <xs:complexType name="T_section">
        <xs:annotation>
            <xs:documentation>Section type</xs:documentation>
        </xs:annotation>
        <xs:sequence>
            <xs:element ref="flow" minOccurs="0" maxOccurs="unbounded"/>
        </xs:sequence>
        <xs:attribute name="name" use="required">
            <xs:simpleType>
                <xs:restriction base="xs:string"/>
            </xs:simpleType>
        </xs:attribute>
        <xs:attribute name="id" use="required">
            <xs:simpleType>
                <xs:restriction base="xs:string"/>
            </xs:simpleType>
        </xs:attribute>
    </xs:complexType>
    <xs:complexType name="T_metadata">
        <xs:annotation>
            <xs:documentation>Metadata type</xs:documentation>
        </xs:annotation>
        <xs:sequence>
            <xs:element ref="surface"/>
            <xs:element ref="sections"/>
            <xs:element ref="flows"/>
            <xs:element ref="images"/>
        </xs:sequence>
    </xs:complexType>
    <xs:complexType name="T_images">
        <xs:annotation>
            <xs:documentation>Images type</xs:documentation>
        </xs:annotation>
        <xs:sequence>
            <xs:element ref="image" minOccurs="0" maxOccurs="unbounded"/>
        </xs:sequence>
    </xs:complexType>
    <xs:complexType name="T_image">
        <xs:annotation>
            <xs:documentation>Image type</xs:documentation>
        </xs:annotation>
        <xs:attribute name="type" use="required">
            <xs:simpleType>
                <xs:restriction base="xs:string"/>
            </xs:simpleType>
        </xs:attribute>
        <xs:attribute name="id" use="required">
            <xs:simpleType>
                <xs:restriction base="xs:string"/>
            </xs:simpleType>
        </xs:attribute>
    </xs:complexType>
    <xs:complexType name="T_group">
        <xs:annotation>
            <xs:documentation>Group type</xs:documentation>
        </xs:annotation>
        <xs:sequence>
            <xs:element ref="block" minOccurs="0" maxOccurs="unbounded"/>
        </xs:sequence>
        <xs:attribute name="id" use="required">
            <xs:simpleType>
                <xs:restriction base="xs:string"/>
            </xs:simpleType>
        </xs:attribute>
    </xs:complexType>
    <xs:complexType name="T_flows">
        <xs:annotation>
            <xs:documentation>Flows type</xs:documentation>
        </xs:annotation>
        <xs:sequence>
            <xs:element ref="flow" minOccurs="0" maxOccurs="unbounded"/>
        </xs:sequence>
    </xs:complexType>
    <xs:complexType name="T_flow">
        <xs:annotation>
            <xs:documentation>Flow type</xs:documentation>
        </xs:annotation>
        <xs:sequence>
            <xs:element ref="group"/>
        </xs:sequence>
```

```
            <xs:attribute name="type">
                <xs:simpleType>
                    <xs:restriction base="xs:string"/>
                </xs:simpleType>
            </xs:attribute>
            <xs:attribute name="section">
                <xs:simpleType>
                    <xs:restriction base="xs:string"/>
                </xs:simpleType>
            </xs:attribute>
            <xs:attribute name="id" use="required">
                <xs:simpleType>
                    <xs:restriction base="xs:string"/>
                </xs:simpleType>
            </xs:attribute>
        </xs:complexType>
        <xs:complexType name="T_block">
            <xs:annotation>
                <xs:documentation>Block type</xs:documentation>
            </xs:annotation>
            <xs:attribute name="y" use="required">
                <xs:simpleType>
                    <xs:restriction base="xs:string"/>
                </xs:simpleType>
            </xs:attribute>
            <xs:attribute name="x" use="required">
                <xs:simpleType>
                    <xs:restriction base="xs:string"/>
                </xs:simpleType>
            </xs:attribute>
            <xs:attribute name="w" use="required">
                <xs:simpleType>
                    <xs:restriction base="xs:string"/>
                </xs:simpleType>
            </xs:attribute>
            <xs:attribute name="type" use="required">
                <xs:simpleType>
                    <xs:restriction base="xs:string"/>
                </xs:simpleType>
            </xs:attribute>
            <xs:attribute name="h" use="required">
                <xs:simpleType>
                    <xs:restriction base="xs:string"/>
                </xs:simpleType>
            </xs:attribute>
        </xs:complexType>
        <xs:element name="surface" type="T_surface">
            <xs:annotation>
                <xs:documentation>Physical surface</xs:documentation>
            </xs:annotation>
        </xs:element>
        <xs:element name="srcimage" type="T_srcimage">
            <xs:annotation>
                <xs:documentation>Raster representation of the physical surface</xs:documentation>
            </xs:annotation>
        </xs:element>
        <xs:element name="sections" type="T_sections">
            <xs:annotation>
                <xs:documentation>Surface to section(s) association</xs:documentation>
            </xs:annotation>
        </xs:element>
        <xs:element name="section" type="T_section">
            <xs:annotation>
                <xs:documentation>Surface to section association</xs:documentation>
            </xs:annotation>
        </xs:element>
        <xs:element name="metadata" type="T_metadata">
            <xs:annotation>
                <xs:documentation>Top-level element for the surface-level metadata</xs:documentation>
            </xs:annotation>
        </xs:element>
        <xs:element name="images" type="T_images">
            <xs:annotation>
                <xs:documentation>Associated flow sub-surface image map(s)</xs:documentation>
            </xs:annotation>
        </xs:element>
        <xs:element name="image" type="T_image">
            <xs:annotation>
                <xs:documentation>Surface to sub-surface image map</xs:documentation>
            </xs:annotation>
        </xs:element>
        <xs:element name="group" type="T_group">
            <xs:annotation>
                <xs:documentation>Group of associated flow elements.</xs:documentation>
            </xs:annotation>
        </xs:element>
        <xs:element name="flows" type="T_flows">
            <xs:annotation>
                <xs:documentation>Associated flow elements</xs:documentation>
            </xs:annotation>
        </xs:element>
        <xs:element name="flow" type="T_flow">
            <xs:annotation>
                <xs:documentation>Individual sub-surface extraction element</xs:documentation>
            </xs:annotation>
        </xs:element>
        <xs:element name="block" type="T_block">
            <xs:annotation>
                <xs:documentation>Sub-flow element</xs:documentation>
            </xs:annotation>
        </xs:element>
</xs:schema>
```

FIGS. 7A-7M depicts one embodiment of a schema that may be utilized for pg.xml 220. In one embodiment, the XML Schema Definition (XSD) that may be utilized for pg.xml 220 may be:

```
<?xml version="1.0" encoding="UTF-8" standalone="yes"?>
<xs:schema xmlns:xs="http://www.w3.org/2001/XMLSchema" elementFormDefault="qualified"?
    <xs:attribute name="coord">
        <xs:simpleType>
            <xs:restriction base="xs:string">
                <xs:pattern value="[0-9\.]*,[0-9\.]*,[0-9\.]*,[0-9\.]*"/>
            </xs:restriction>
        </xs:simpleType>
    </xs:attribute>
    <xs:attribute name="ibttag">
        <xs:simpleType>
            <xs:restriction base="xs:string">
                <xs:enumeration value="imagecaption"/>
                <xs:enumeration value="imagecredit"/>
            </xs:restriction>
        </xs:simpleType>
    </xs:attribute>
    <xs:attribute name="imgtag">
        <xs:simpleType>
            <xs:restriction base="xs:string">
                <xs:enumeration value="advert"/>
                <xs:enumeration value="graphic"/>
                <xs:enumeration value="photo"/>
            </xs:restriction>
        </xs:simpleType>
    </xs:attribute>
    <xs:attribute name="page">
        <xs:simpleType>
            <xs:restriction base="xs:string"/>
        </xs:simpleType>
    </xs:attribute>
    <xs:attribute name="point">
        <xs:simpleType>
```

```
            <xs:restriction base="xs:string">
                <xs:pattern value="[0-9\.]*,[0-9\.]*"/>
            </xs:restriction>
        </xs:simpleType>
    </xs:attribute>
    <xs:attribute name="seq">
        <xs:simpleType>
            <xs:restriction base="xs:positiveInteger"/>
        </xs:simpleType>
    </xs:attribute>
    <xs:attribute name="target">
        <xs:simpleType>
            <xs:restriction base="xs:string"/>
        </xs:simpleType>
    </xs:attribute>
    <xs:attribute name="tbttag">
        <xs:simpleType>
            <xs:restriction base="xs:string">
                <xs:enumeration value="articletext"/>
                <xs:enumeration value="byline"/>
                <xs:enumeration value="dateline"/>
                <xs:enumeration value="headline"/>
                <xs:enumeration value="ignoretext"/>
                <xs:enumeration value="preheadline"/>
                <xs:enumeration value="subheadline"/>
            </xs:restriction>
        </xs:simpleType>
    </xs:attribute>
    <xs:attribute name="grttag">
        <xs:simpleType>
            <xs:restriction base="xs:string">
                <xs:enumeration value="article"/>
                <xs:enumeration value="chapter"/>
            </xs:restriction>
        </xs:simpleType>
    </xs:attribute>
    <xs:attribute name="shared">
        <xs:simpleType>
            <xs:restriction base="xs:string"/>
        </xs:simpleType>
    </xs:attribute>
    <xs:element name="ContLink" type="ContLinkType"/>
    <xs:element name="Group">
        <xs:complexType>
            <xs:complexContent>
                <xs:extension base="GroupType"/>
            </xs:complexContent>
        </xs:complexType>
    </xs:element>
    <xs:element name="ImageBlock" type="ImageBlockType"/>
    <xs:element name="ImageTextBlock" type="ImageTextBlockType"/>
    <xs:element name="Page" type="PageType"/>
    <xs:element name="RefLink" type="RefLinkType"/>
    <xs:element name="TextBlock" type="TextBlockType"/>
    <xs:complexType name="ContLinkType">
        <xs:attribute ref="point" use="required"/>
        <xs:attribute ref="page" use="required"/>
    </xs:complexType>
    <xs:complexType name="GroupType">
        <xs:sequence>
            <xs:element ref="RefLink" minOccurs="0" maxOccurs="unbounded"/>
            <xs:element ref="ContLink" minOccurs="0"/>
            <xs:choice maxOccurs="unbounded">
                <xs:element ref="TextBlock" maxOccurs="unbounded"/>
                <xs:element ref="ImageBlock" maxOccurs="unbounded"/>
            </xs:choice>
        </xs:sequence>
        <xs:attribute ref="seq" use="required"/>
        <xs:attribute ref="grttag"/>
    </xs:complexType>
    <xs:complexType name="ImageBlockType">
        <xs:sequence minOccurs="0">
            <xs:element ref="ImageTextBlock"
                minOccurs="0" maxOccurs="unbounded"/>
        </xs:sequence>
        <xs:attribute ref="coord" use="required"/>
        <xs:attribute ref="seq" use="required"/>
        <xs:attribute ref="imgtag" use="required"/>
        <xs:attribute ref="target" use="optional"/>
        <xs:attribute ref="shared"/>
    </xs:complexType>
    <xs:complexType name="ImageTextBlockType">
        <xs:attribute ref="coord" use="required"/>
        <xs:attribute ref="seq" use="required"/>
        <xs:attribute ref="ibttag" use="required"/>
        <xs:attribute ref="shared"/>
    </xs:complexType>
    <xs:complexType name="PageType">
        <xs:sequence>
            <xs:element ref="Group" minOccurs="0" maxOccurs="unbounded"/>
        </xs:sequence>
    </xs:complexType>
    <xs:complexType name="RefLinkType">
        <xs:attribute ref="coord" use="required"/>
        <xs:attribute ref="target" use="required"/>
    </xs:complexType>
    <xs:complexType name="TextBlockType">
        <xs:attribute ref="coord" use="required"/>
        <xs:attribute ref="seq" use="required"/>
        <xs:attribute ref="tbttag" use="required"/>
        <xs:attribute ref="shared"/>
    </xs:complexType>
</xs:schema>
```

Figure 8C:
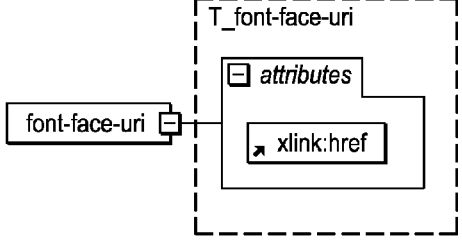
FIGS. 8A-8AL are depictions of one embodiment of a schema.
Figure 8F:
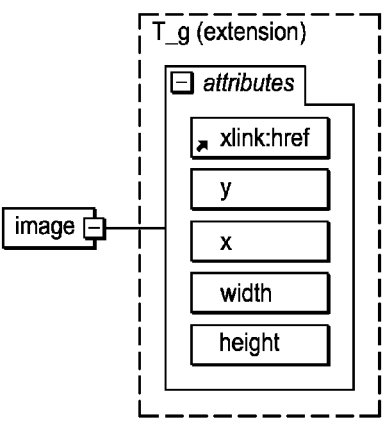
Figure 8G:
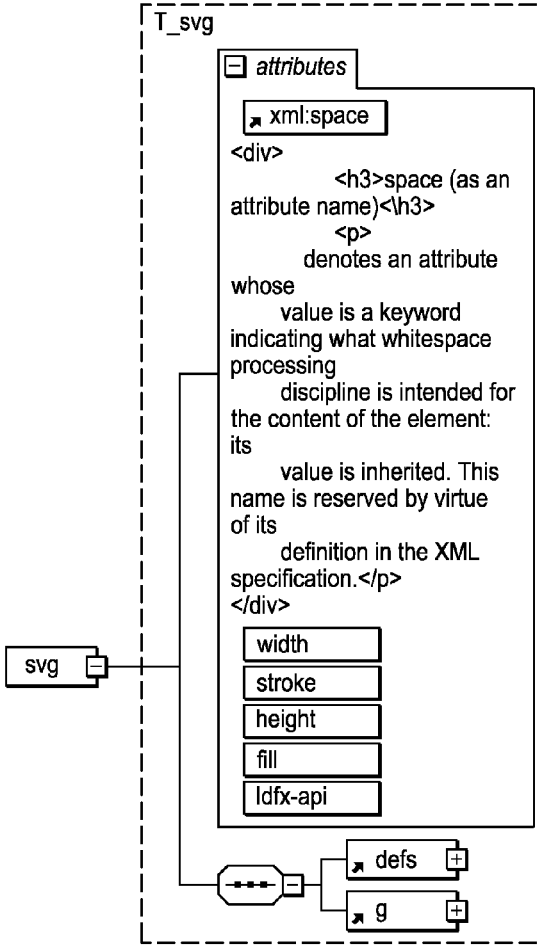
Figure 8I:
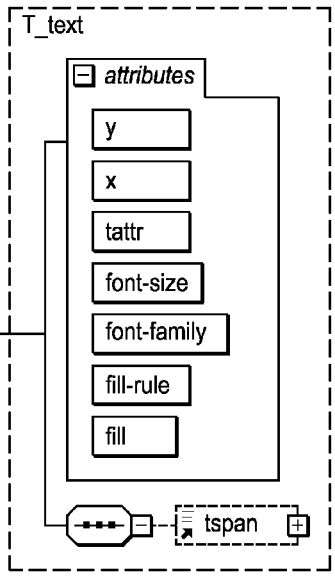
Figure 11C:
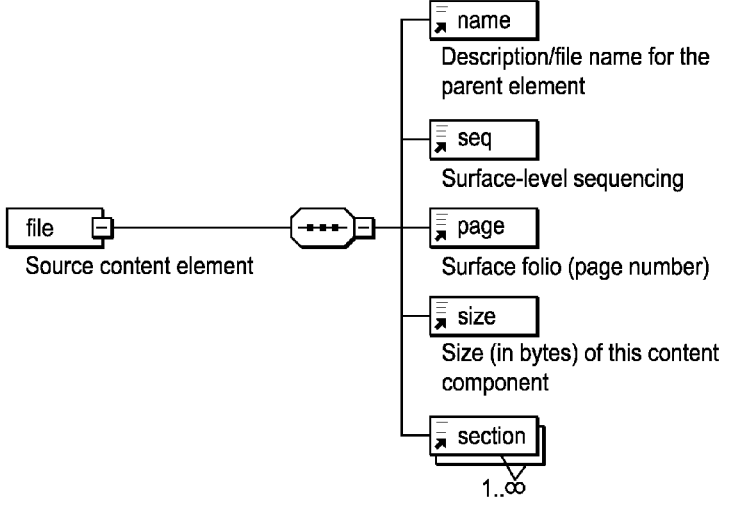
Figure 11G:
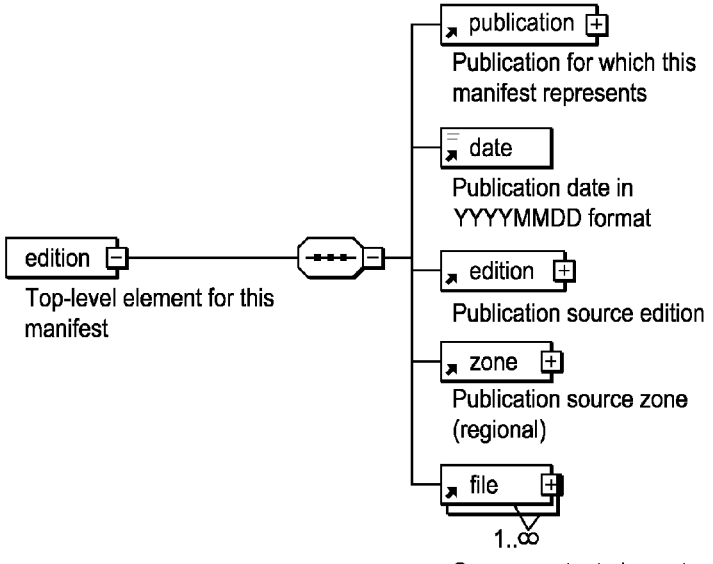
Figure 11H:
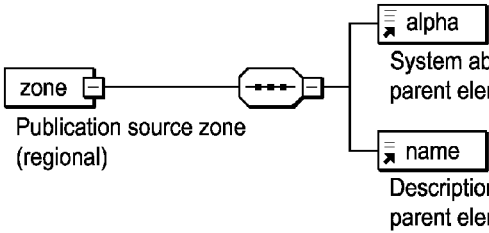

FIGS. 8A-8AL depict one embodiment of a schema that may be utilized for reflow.svg 222. In one embodiment, the XML Schema Definition (XSD) that may be utilized for reflow.svg 222 may be:

```
?xml version="1.0" encoding="UTF-8"?>
<xs:schema xmlns="http://www.w3.org/2000/svg"
    xmlns:xlink="http://www.w3.org/1999/xlink"
    xmlns:xs="http://www.w3.org/2001/XMLSchema"
    xmlns:xml="http://www.w3.org/XML/1998/namespace"
    targetNamespace="http://www.w3.org/2000/svg">
    <xs:import
        namespace="http://www.w3.org/XML/1998/namespace"/>
    <xs:import namespace="http://www.w3.org/1999/xlink"
        schemaLocation="LDfxSurfaceReflow1.xsd"/>
    <xs:simpleType name="ST_tspan">
        <xs:restriction base="xs:string"/>
    </xs:simpleType>
    <xs:complexType name="T_tspan">
        <xs:simpleContent>
            <xs:extension base="ST_tspan">
                <xs:attribute name="font-size"
                    use="required">
                    <xs:simpleType>
                        <xs:restriction
                            base="xs:string"/>
                    </xs:simpleType>
                </xs:attribute>
                <xs:attribute name="font-family"
                    use="required">
                    <xs:simpleType>
                        <xs:restriction
                            base="xs:string"/>
                    </xs:simpleType>
                </xs:attribute>
            </xs:extension>
        </xs:simpleContent>
    </xs:complexType>
    <xs:complexType name="T_text" mixed="true">
        <xs:sequence>
            <xs:element ref="tspan" minOccurs="0"/>
        </xs:sequence>
```

```
            <xs:attribute name="y" type="xs:string"
use="required"/>
            <xs:attribute name="x" type="xs:string"
use="required"/>
            <xs:attribute name="tattr" type="xs:string"
use="required"/>
            <xs:attribute name="font-size" use="required">
                <xs:simpleType>
                    <xs:restriction base="xs:string"/>
                </xs:simpleType>
            </xs:attribute>
            <xs:attribute name="font-family" use="required">
                <xs:simpleType>
                    <xs:restriction base="xs:string"/>
                </xs:simpleType>
            </xs:attribute>
            <xs:attribute name="fill-rule" use="required">
                <xs:simpleType>
                    <xs:restriction base="xs:string"/>
                </xs:simpleType>
            </xs:attribute>
            <xs:attribute name="fill" use="required">
                <xs:simpleType>
                    <xs:restriction base="xs:string"/>
                </xs:simpleType>
            </xs:attribute>
        </xs:complexType>
        <xs:complexType name="T_svg">
            <xs:sequence>
                <xs:element ref="defs"/>
                <xs:element ref="g"/>
            </xs:sequence>
            <xs:attribute ref="xml:space" use="required"/>
            <xs:attribute name="width" use="required">
                <xs:simpleType>
                    <xs:restriction base="xs:string"/>
                </xs:simpleType>
            </xs:attribute>
            <xs:attribute name="stroke" use="required">
                <xs:simpleType>
                    <xs:restriction base="xs:string"/>
                </xs:simpleType>
            </xs:attribute>
            <xs:attribute name="height" use="required">
                <xs:simpleType>
                    <xs:restriction base="xs:string"/>
                </xs:simpleType>
            </xs:attribute>
            <xs:attribute name="fill" use="required">
                <xs:simpleType>
                    <xs:restriction base="xs:string"/>
                </xs:simpleType>
            </xs:attribute>
            <xs:attribute name="ldfx-api" use="required">
                <xs:simpleType>
                    <xs:restriction base="xs:string"/>
                </xs:simpleType>
            </xs:attribute>
        </xs:complexType>
        <xs:complexType name="T_image">
            <xs:attribute ref="xlink:href" use="required"/>
            <xs:attribute name="y" use="required">
                <xs:simpleType>
                    <xs:restriction base="xs:string"/>
                </xs:simpleType>
            </xs:attribute>
            <xs:attribute name="x" use="required">
                <xs:simpleType>
                    <xs:restriction base="xs:string"/>
                </xs:simpleType>
            </xs:attribute>
            <xs:attribute name="width" use="required">
                <xs:simpleType>
                    <xs:restriction base="xs:string"/>
                </xs:simpleType>
            </xs:attribute>
            <xs:attribute name="height" use="required">
                <xs:simpleType>
                    <xs:restriction base="xs:string"/>
                </xs:simpleType>
            </xs:attribute>
        </xs:complexType>
        <xs:complexType name="T_g">
            <xs:choice minOccurs="0">
                <xs:element ref="g" maxOccurs="unbounded"/>
                <xs:element ref="image"/>
                <xs:element ref="text" maxOccurs="unbounded"/>
            </xs:choice>
            <xs:attribute name="yPct">
                <xs:simpleType>
                    <xs:restriction base="xs:string"/>
                </xs:simpleType>
            </xs:attribute>
            <xs:attribute name="y">
                <xs:simpleType>
                    <xs:restriction base="xs:string"/>
                </xs:simpleType>
            </xs:attribute>
            <xs:attribute name="xPct">
                <xs:simpleType>
                    <xs:restriction base="xs:string"/>
                </xs:simpleType>
            </xs:attribute>
            <xs:attribute name="x">
                <xs:simpleType>
                    <xs:restriction base="xs:string"/>
                </xs:simpleType>
            </xs:attribute>
            <xs:attribute name="w">
                <xs:simpleType>
                    <xs:restriction base="xs:string"/>
                </xs:simpleType>
            </xs:attribute>
            <xs:attribute name="type" use="required">
                <xs:simpleType>
                    <xs:restriction base="xs:string"/>
                </xs:simpleType>
            </xs:attribute>
            <xs:attribute name="label">
                <xs:simpleType>
                    <xs:restriction base="xs:string"/>
                </xs:simpleType>
            </xs:attribute>
            <xs:attribute name="id">
                <xs:simpleType>
                    <xs:restriction base="xs:string"/>
                </xs:simpleType>
            </xs:attribute>
            <xs:attribute name="h">
                <xs:simpleType>
                    <xs:restriction base="xs:string"/>
                </xs:simpleType>
            </xs:attribute>
            <xs:attribute name="dest">
                <xs:simpleType>
                    <xs:restriction base="xs:string"/>
                </xs:simpleType>
            </xs:attribute>
            <xs:attribute name="class" use="required">
                <xs:simpleType>
                    <xs:restriction base="xs:string">
                        <xs:enumeration value="block"/>
                        <xs:enumeration value="flow"/>
                        <xs:enumeration value="surface"/>
                    </xs:restriction>
                </xs:simpleType>
            </xs:attribute>
            <xs:attribute name="flow-root">
                <xs:simpleType>
                    <xs:restriction base="xs:string"/>
                </xs:simpleType>
            </xs:attribute>
```

-continued

```
    <xs:attribute name="revision">
        <xs:simpleType>
            <xs:restriction base="xs:string"/>
        </xs:simpleType>
    </xs:attribute>
</xs:complexType>
<xs:complexType name="T_font-face-uri">
    <xs:attribute ref="xlink:href" use="required"/>
</xs:complexType>
<xs:complexType name="T_font-face-src">
    <xs:sequence>
        <xs:element ref="font-face-name"/>
        <xs:element ref="font-face-uri"/>
    </xs:sequence>
</xs:complexType>
<xs:complexType name="T_font-face-name">
    <xs:attribute name="name" use="required">
        <xs:simpleType>
            <xs:restriction base="xs:string"/>
        </xs:simpleType>
    </xs:attribute>
</xs:complexType>
<xs:complexType name="T_font-face">
    <xs:sequence>
        <xs:element ref="font-face-src"/>
    </xs:sequence>
    <xs:attribute name="font-family" use="required">
        <xs:simpleType>
            <xs:restriction base="xs:string"/>
        </xs:simpleType>
    </xs:attribute>
</xs:complexType>
<xs:complexType name="T_defs">
    <xs:sequence>
        <xs:element ref="font-face" minOccurs="0" maxOccurs="unbounded"/>
    </xs:sequence>
</xs:complexType>
<xs:element name="tspan" type="T_tspan"/>
<xs:element name="text" type="T_text"/>
<xs:element name="svg" type="T_svg"/>
<xs:element name="image" type="T_image"/>
<xs:element name="g">
    <xs:complexType>
        <xs:complexContent>
            <xs:extension base="T_g"/>
        </xs:complexContent>
    </xs:complexType>
</xs:element>
<xs:element name="font-face-uri" type="T_font-face-uri"/>
<xs:element name="font-face-src" type="T_font-face-src"/>
<xs:element name="font-face-name" type="T_font-face-name"/>
<xs:element name="font-face" type="T_font-face"/>
<xs:element name="defs" type="T_defs"/>
</xs:schema>
```

Moving now to FIG. 9, one embodiment of a method for transforming digital content from a particular format to the LDfx format such that the digital content may be stored in an LDfx container is depicted. It should be noted here that certain steps of the transformation method may, or may not be, applied based on the format of the digital content ingested and that certain steps may be performed differently. The embodiment described with respect to FIG. 9, may, for example, be usefully applied to digital content ingested in the .pdf format. A person of ordinary skill in the art, after reviewing the disclosed embodiments herein, will be able to determine which steps to apply and how to apply such steps to ingested content, based on the particular format of the content received.

Initially at step 910 digital content in a particular format may be ingested and at step 920 pre-processing may be performed on the received digital content. In the case of file input the system locates the appropriate files, identifies, categorizes or validates the file for digital content or set of files, and stores the files. The digital content can be normalized to a predefined, consistent set of characteristics. A full-size, full-resolution, full-color .tif file is generated and a manifest is created identifying and classifying all the input files associated with the digital. This step may also entail the creation of the LDfx container, including certain files that are associated with the digital content being processed.

FIG. 10 depicts one embodiment of a method for ingesting digital content. This ingestion may comprise, at step 1010, receiving (e.g. retrieving or being provided with) the digital content at a content transformation system. The digital content may come in the form of one or more files of a particular format (for example in the .pdf or ePub format) or an XML feed. For example, in the case of a replica format such as .pdf each file of the digital content may correspond to one surface of the digital content. These files may, for example be received according to the file transfer protocol (FTP), the hyper-text transfer protocol (HTTP) or in some other manner altogether.

In addition to the content itself, a manifest may also be received at step 1020. This manifest may comprise metadata associated with the digital content such as the publisher name, name associated with the digital content, what type of publication corresponds to the digital content, circulation, edition number, etc. In some embodiments, the operators of a content transformation system may provide an application to publishers such that publishers may utilize such an application to package digital content, create manifests or provide digital content or accompanying manifests to a content transformation system. One example of such an application is the PAPERPUSHER by LibreDigital of Austin, Tex.

FIGS. 11A-11H depict one embodiment of a schema that may be utilized for a manifest. In one embodiment, the XML Schema Definition (XSD) that may be utilized for a manifest may be:

```
?xml version="1.0" encoding="UTF-8" standalone="yes"?>
<!-- edited with XMLSpy v2010 rel. 3 spl (x64)
(http://www.altova.com) by Maggie Way (LibreDigital) -->
<xs:schema xmlns:xs="http://www.w3.org/2001/XMLSchema"
elementFormDefault="qualified"?
    <xs:element name="alpha" type="xs:string">
        <xs:annotation>
            <xs:documentation>System abreviation for the
parent element</xs:documentation>
        </xs:annotation>
    </xs:element>
    <xs:element name="date" type="xs:integer">
        <xs:annotation>
            <xs:documentation>Publication date in
YYYYMMDD format</xs:documentation>
        </xs:annotation>
    </xs:element>
    <xs:element name="edition">
        <xs:annotation>
            <xs:documentation>Publication source
edition</xs:documentation>
        </xs:annotation>
        <xs:complexType>
            <xs:sequence>
                <xs:element ref="alpha"/>
                <xs:element ref="name"/>
            </xs:sequence>
        </xs:complexType>
    </xs:element>
    <xs:element name="file">
        <xs:annotation>
            <xs:documentation>Source content
```

```
element</xs:documentation>
    </xs:annotation>
    <xs:complexType>
        <xs:sequence>
            <xs:element ref="name"/>
            <xs:element ref="seq"/>
            <xs:element ref="page"/>
            <xs:element ref="size"/>
            <xs:element ref="section"
maxOccurs="unbounded"/>
        </xs:sequence>
    </xs:complexType>
</xs:element>
<xs:element name="name" type="xs:string">
    <xs:annotation>
        <xs:documentation>Description/file name for
the parent element</xs:documentation>
    </xs:annotation>
</xs:element>
<xs:element name="page" type="xs:string">
    <xs:annotation>
        <xs:documentation>Surface folio (page
number)</xs:documentation>
    </xs:annotation>
</xs:element>
<xs:element name="publication">
    <xs:annotation>
        <xs:documentation>Publication for which this
manifest represents</xs:documentation>
    </xs:annotation>
    <xs:complexType>
        <xs:sequence>
            <xs:element ref="alpha"/>
            <xs:element ref="name"/>
        </xs:sequence>
    </xs:complexType>
</xs:element>
<xs:element name="section" type="xs:string>">
    <xs:annotation>
        <xs:documentation>Section(s) associated with
this content element</xs:documentation>
    </xs:annotation>
</xs:element>
<xs:element name="seq" type="xs:integer">
    <xs:annotation>
        <xs:documentation>Surface-level
sequencing</xs:documentation>
    </xs:annotation>
</xs:element>
<xs:element name="size" type="xs:integer">
    <xs:annotation>
        <xs:documentation>Size (in bytes) of this
content component</xs:documentation>
    </xs:annotation>
</xs:element>
<xs:element name="toc">
    <xs:annotation>
        <xs:documentation>Top-level element for this
manifest</xs:documentation>
    </xs:annotation>
    <xs:complexType>
        <xs:sequence>
            <xs:element ref="publication"/>
            <xs:element ref="date"/>
            <xs:element ref="edition"/>
            <xs:element ref="zone"/>
            <xs:element ref="file"
maxOccurs="unbounded"/>
        </xs:sequence>
    </xs:complexType>
</xs:element>
<xs:element name="zone">
    <xs:annotation>
        <xs:documentation>Publication source zone
(regional)</xs:documentation>
    </xs:annotation>
    <xs:complexType>
        <xs:sequence>
            <xs:element ref="alpha"/>
            <xs:element ref="name"/>
        </xs:sequence>
    </xs:complexType>
</xs:element>
</xs:schema>
```

At step 1030 the received digital content can then be validated against the corresponding received manifest. If the received digital content and the received manifest do not match (e.g. the manifest describes, more, fewer or different files of digital content) an error condition may be asserted or a user alerted to the error condition.

Any files that were received that correspond to multiple surfaces may, at step 1040, be separated into one or more files that represent single surfaces. Files that correspond to multiple surfaces may be identified based on the received manifest. If it was a feed that was received, the feed, or portions thereof, may be categorized at this step.

A skeleton LDfx container structure corresponding to the digital content may be created in a data store at step 1050. This skeleton LDfx container structure may comprise each of the directories of the LDfx container desired based on the manifest, including each of the desired subdirectories and the mimetype file 204. Thus, for example, an LDFX directory 202 corresponding to the digital content may be created. Under this LDFX directory 202 a META-INF directory 208, a page directory 213 and a file directory 240 may be created. Under the page directory 212 a number of "x" directories 214 may be created, along with image directory 224, pdf directory 228 and swf directory 236 for each "x" directory 214. It will be noted here that the number of "x" subdirectories of the page directory 212 may be determined based on the manifest and each of these directories created at this step.

At step 1060 the originally received digital content (e.g. the digital content files or the feed data) may be stored in the file directory 240. Additionally, each of the "x" subdirectories 214 of the page directory 212 may be populated based on the correlation of the received digital content files with the received manifest. In one embodiment, if the digital content is in a replica format each of the surface files may be stored in the pdf directory 228 corresponding to that surface. For example, a file for surface 1 may be stored at LDFX/page/1/pdf. In one embodiment, the surface file may be stored as pgparse.pdf 230.

Skeleton files can then be created at step 1070. These skeleton files may be shells of files under LDFX directory 202, where the skeleton files may for example, include header information or other top level elements. In one embodiment, metadata.xml 210 and backbone.xml 206 may be created based on the manifest. The metadata.xml 210 file may be created based on the manifest. In each of the "x" directories 214 of the page directory 212 the info.xml file 216, metadata.xml 218 and pg.xml 220 files may be created. The info.xml 216 file may be created based on a detected orientation and dimensions of the corresponding surface. These may be detected, for example, from the digital content file corresponding to that "x" subdirectory 214.

Furthermore, at this step pg.tif 226, pg.pdf 232, pg_swf.pdf 234, pg.xml 220 and pg.swf under each "x" directory may be created. For example, the pg_parse.pdf 230 may be normalized to produce the pg.pdf 232 file or the pg_swf.pdf. The pg.xml file 220 may be created with a high level structure representation of the surface of the corresponding surface.

At step 1080, work packets associated with each of the "x" directories may be created. A work packets associated with a particular "x" directory 214 may, in turn, be associated with the pg.xml 220 file in that "x" directory. Additionally, a jpeg image that, when rendered, will present a visual representation of the surface corresponding to that "x" directory may be created from the pg.tif 226 file associated with that "x" directory. This jpeg file may also be associated with the work packet associated with that "x" directory. Thus, for example, the pg.xml file 220 and the pg.tif file 226 of the directory LDFX/page/1 may be utilized to create a first work packet associated with a first surface, the pg.xml file 220 and the pg.tif file 226 of the directory LDFX/page/2 may be utilized to create a second work packet associated with a second surface, etc.

Returning to FIG. 9, these work packets may be utilized in blocking step 930. During blocking, geographic areas of each surface of digital content may defined and categorized to define artifacts and these artifacts associated. The identification and associations within a particular surface may be stored in the pg.xml 220 file in the "x" directory 214 associated with that surface, such that the flow(s) for each surface are stored in the pg.xml 220 file 220 of each "x" directories 214.

Additionally, any association between artifacts on the surface and another surface, or an artifact on another surface, may be stored in the pg.xml file 220 (these types of associations may be referred as continuations).

In one embodiment, this blocking step 930 may performed by user at a computing device. The user may be presented with a visual representation of the surface to be blocked. The user may identify specific geographic areas of the surface (known as a block), categorize (tag) this block (e.g., as a type of artifact such as an article, graphic, headline, byline, etc.) or associated the block with one or more other identified blocks on the surface. Furthermore, if needed, the user may associate an artifact with one or more artifacts on other surfaces. Additionally, the user may specify an order for associated artifacts. This data may be stored in the pg.xml file 220 associated with the surface. Thus, after the blocking step 920 the pg.xml file 220 may comprise the flows for that surface and any association between artifacts on that surface and another surface or area or artifacts on another surface.

In one embodiment, the work packet associated with a surface and comprising the pg.xml file 220 associated with the surface and a jpeg image of the surface may be provided to the user at a computing device using a digital workflow module. A tool on the computing device (which may, for example, an application executing on the computing device, a web based application, etc.) may present the jpeg image to the user and allow the user to identify blocks on the presented image and tag these blocks, associate those identified artifacts with other artifacts or order the artifacts. Furthermore, the tool may allow a user to associate an artifact with another surface or area of another surface. For example, if a user indicates that the artifact should be associated with another surface the tool may allow the user to specify the other surface, obtain the jpeg image of the other surface and allow the user to associate an identified artifact in the original surface with a geographic area or block in a presented image of the other surface. This data (identity, location on surface, tags, associations, order, etc.) may be stored in the pg.xml included in the work packet and the work packet, or just the pg.xml, may be returned to the digital work flow module. The pg.xml file 220 can then be stored in the LDfx container 202 corresponding to the digital content at the appropriate "x" directory 214. In one embodiment, as separate work packets are created for each surface the digital workflow module may distribute these work packets to various users at various computing devices, allowing a distributed workflow to be implemented and greatly increasing the efficacy of this blocking process.

Turning to FIG. 12, one embodiment of an interface of such a tool is presented. Here a surface is presented in area 1100 of the interface. Notice that various blocks 1110 have been identified by a user using the interface. These blocks may be identified as a type of artifact using area 1120. For example, headline artifacts may include Pre-Headline, Headline or Sub-Headline; text artifacts may include Title, Chapter Title, Page Name, Paragraph, Text Callout, Ignore Text, Reference Link, etc.; Image artifacts may include Photo, Graphic, Chart, Figure, Graph, Table, Image Credit, Image Caption, Photo, Graphic, Chart, Graph, Table, Comic, Advertisement, Image Credit, Image Caption, etc. Additionally, these artifacts may associated in area 1130, for example, an article may comprise a artifacts of type preheadline, an artifact of type graphic, an artifacts of type headline and an artifacts of type article text.

Returning back to FIG. 9, after each of the surfaces has been blocked at step 930 an initial reflow may be performed at step 940. During the initial reflow, the reflow.svg file 222 may be created in each "x" directory 214 and data associated with each of the artifacts identified in the surface corresponding to that "x" directory may be stored in the reflow.svg file 222. Thus, at the end of the initial reflow step a reflow.svg file 222 file may exist in every "x" directory 214.

FIG. 13 depicts one embodiment of a method that may be used to create the reflow.svg 222 file for a particular "x" directory 214. At step 1210 the pg.xml file 220 comprising data on the artifacts within the surface corresponding to the "x" directory 214 is obtained. Next, at step 1220 a shell reflow.svg 222 file is created in the "x" directory 214 based on the pg.xml 220 file. In one embodiment, elements corresponding to each of the blocks identified in the pg.xml file 220 may be stubbed out in the reflow.svg 222 file.

At step 1230 the pg.pdf 232 file stored in pdf directory 228 under that "x" directory may also be obtained. For each of the artifacts defined in the pg.xml then, extraction may be performed using the pg.pdf 232 file at step 1240. More specifically, for an artifact the area of the surface pertaining to the artifact may be obtained from the pg.xml 220. This area may be identified in the pg.pdf 232 and the extraction process performed on the identified portion of the pg.pdf 232 file based on the type associated with the artifact in the pg.xml 220 file. The data may also be serialized. For example, text extraction may be utilized to extract text from a text artifact using font decoding or font realization such that the extracted data includes for example, the type of artifact, font attributes (point size, bold, superscript/subscript, type of hyphenation), end-of-line hyphenation (either hard hyphens or soft hyphens), ligature decomposition (the separation of compound letters often used in typesetting), URI detection (URLs, email addresses), etc. For images artifacts, the location of the source image (e.g. where it is stored in the LDFX container 202 or located in a file of the LDFX container 202) may be extracted.

The extracted data for each artifact may be stored in an associated element of the reflow.svg file 222 at step 1250 and the elements of the reflow.svg associated with one another based on the associations of the artifacts defined in the pg.xml 220 at step 1260.

Returning to FIG. 9, at step 950 proofing may occur. This proofing step may ensure that each of the reflow.svg 222 files of pg.xml files 220 in each of the "x" directories 214 is correct by juxtaposing an image of the surface itself with the elements defined in the reflow.svg after the initial reflow step (940) and the artifacts defined in the pg.xml 220 file. It can then be determined if the defined elements or artifacts are correct.

More specifically, in one embodiment, to proof a reflow.svg 222 file for a particular "x" directory 214 associated with a particular surface, a jpeg associated with the surface may be rendered as a visual representation. The elements defined in the reflow.svg 222 file of that "x" directory may be visually rendered relative to the rendered jpeg. For example, these elements may be presented as boxes overlaid on a presented image of the surface. Additionally, the pg.xml 220 of that "x" directory may also be visually rendered relative to the rendered jpeg and the visually rendered reflow.svg file 222. For example, the artifacts defined in the pg.xml 220 may be presented as boxes overlaid on the presented image of the surface and the boxes associated with the elements of the reflow.svg. It will be noted that steps may be taken to visually distinguish the boxes associated with the reflow.svg file 222 and the pg.xml file 220, for example, by presenting them in different colors.

A user may then use such a presented interface to verify the accuracy of the extraction of the artifacts of a surface of the digital content and the linkage of such artifacts and correct any errors. Based on any corrections both the reflow.svg file 222 and the pg.xml 220 may be updated.

It will be noted that the proofing step may, in one embodiment, be accomplished in a substantially similar to the blocking step described above. A work packet may be made comprising the pg.xml file 220, the reflow.svg file 222 and a jpeg image of the surface. The work packet provided to the user at a computing device using a digital workflow module. A tool on the computing device (which may, for example, an application executing on the computing device, a web based application, etc.) may present the .jpeg image, reflow.svg file 222 and pg.xml file 220 to the user and allow the user to identify artifacts on the presented image and tag, associate those identified artifacts with other artifacts or order the artifacts such that artifacts may be redefined and the reflow.svg file 222 or the pg.xml file 220 updated. The updated reflow.svg file 222 or pg.xml file 220, may be returned to the digital work flow module and then be stored in the LDFX container 202 corresponding to the digital content at the appropriate "x" directory 214.

Once the last surface for a publication has been proofed, a final reflow may be performed at step 960. This final reflow step may entail the updating of the metadata.xml file 210 using associations of artifacts across surfaces such that the groups for the digital content are defined in the metadata.xml file 210. The updating of the metdata.xml 210 file may be done based on the linking of artifacts across each of the surfaces of the digital content as defined in blocking step 930. More specifically, each of the reflow.svg files 222 may have elements that are associated with another surface represented by the reflow.svg file 222 of the "x" directory 214 associated with that surface. In such cases, metadata.xml file 210 may be updated to include the association between the two reflow.svg files 222 or elements in the two different reflow.svg files 222 associated with each of these surfaces. This association may be accomplished in the metadata.xml file 210 using one or more appropriate XML elements.

At this point, all data to represent the digital content in the LDfx format may be stored in a container of the LDfx format. At any later point then, output in a replica or non-replica format may be generated from the LDfx container for the digital content by transforming the objects associated with the LDfx container for that digital content.

It may be useful here to give an example of a reflow.svg: The following example contains elements from a textual (reflow) representation of the front page of the Apr. 28, 2009 edition of the International Herald Tribune.

```
<?xml version="1.0" encoding="utf-8"?>
<svg xml:space="preserve" xmlns="http://www.w3.org/2000/svg"
xmlns:pdf="http://ns.adobe.com/pdf/2006"
xmlns:xlink="http://www.w3.org/1999/xlink" fill="none"
stroke="none" width="988" height="1580.27">
  <defs>
    <font-face font-family="F1">
      <font-face-src>
        <font-face-name name="NYTCheltenham-Book"/>
        <font-face-uri xlink:href="/font/f-1._sfnt"/>
      </font-face-src>
    </font-face>
  </defs>
<g class="surface" typeof="page" label="1"
transform="matrix(1 0 0 -1 0 1580.27)">
  <!-- Masthead -->
  <g class="flow" typeof="masthead">
    ...
  </g>
  <!-- Advert (DIOR CHRISTAL) -->
  <g class="flow" typeof="advertisement">
    ...
  </g>
  <!—Teaser group -->
  <g class="flow" typeof="teasergroup">
    ...
  </g>
  <!-- Teaser (G.M. RESIZED: LEANER AND MINUS PONTIAC)
-->
  <g class="flow" typeof="teaser">
    ...
  </g>
  <!-- Article (Travel curb surged as flu outbreak
widens) -->
  <g class="flow" typeof="article">
    ...
  </g>
</g>
</svg>
```

Masthead Flow

```
<!-- Masthead -->
<g class="flow" typeof="masthead">
  <g class="block" typeof="masthead">
    <text transform="matrix(1 0 0 -1 0 1384.1379)" font-
size="92.595" font-family="F0" fill="rgb(36.21,36.21,36.21)"
fill-rule="evenodd" pdf:Overprint="true" x="15.836 50.1891
93.2457 118.6164 151.4874 183.2479 226.3045 264.8242
291.4912 315.2887 352.7898 395.8463 434.3661 467.515
531.4059 564.2769 593.3522 631.8719 653.722 705.6664 759.095
790.8555 814.653 853.728 896.9696
940.0261">InternationalHeraldTribune</text>
    "text transform="matrix(1 0 0 -1 0 1359.8831)" font-
size="8.966" font-family="F1" fill="rgb(0,0,0)" fill-
rule="evenodd" x="16.577 22.5663 29.4611 35.2352 40.6775
47.4648 53.5884 58.791 63.2563 69.873 75.5217 81.8607
85.0616 92.4765 97.4168 102.5634 107.0286 111.9688 117.6534
123.3379">TUESDAY,APRIL28,2009</text>
    <text transform="matrix(1 0 0 -1 0 1359.8831)" font-
size="10.959" font-family="F2" fill="rgb(0,0,0)" fill-
rule="evenodd" x="339.978 348.2192 359.0603 370.4001
379.7153 387.3537 397.0085 405.3372 414.4113 426.5429
434.4991 443.7924 448.3732 456.6144 461.1952 470.85 484.6694
```

```
494.3242 506.3682 514.6093 524.4504 536.7902 546.226
554.1822 571.4097 579.7714 589.4262 598.1385 611.2894
619.5305 624.1113 635.3223
643.2785">THEGLOBALEDITIONOFTHENEWYORKTIMES</text>
    <text transform="matrix(1 0 0 -1 0 1359.8831)" font-
size="8.966" font-family="F1" fill="rgb(0,0,0)" fill-
rule="evenodd" x="864.577 871.5704 877.2818 884.5262
890.7487 897.5448 903.3458 906.197 913.2712 919.5473
925.7159 929.0961 937.5062 943.4596 949.0812 951.9324
958.2355 965.48">GLOBAL.NYTIMES.COM</text>
    </g>
</g>
```

Advertisement Flow
```
<!--Advert (DIOR CHRISTAL)-->
<g class="flow" typeof="advertisement">
<image xlink:href="/image/im4.jpg" width="867"
height="1024" x="661.4005" y="386.7945"
transform="matrix(0.35968491 0 0-0.35988846 0 0)"
pdf:Decode="0 1 0 1 0 1" color-profile="DeviceRGE"/>
<text transform="matrix(1 0 0-1 0 47.282)" font-size="8.5"
font-family="F12"    fill="rgb(255,255,255)"    fill-
rule="evenodd" x="693.605 700.6846 703.9904 711.07 0
719.5437 725.5269 732.6065 738.7427 742.0485 747.0882
751.9664 757.9495">DIOR CHRISTAL</text>
<text transform="matrix(0 1 1 0 681.6326 0)" Iont-
size="8.5"
font-family="F12"    fill="rgb(255,255,255)"    fill-
rule="evenodd" x="321.6088 327.9065 334.2042 340.0343
342.1585 346.7223 348.923 353.1722 355.8489 357.9731
361.7463 365.9955">www.dior.com</text>
</g>
```

Teaser Group Flow
```
<g class="flow" typeof="teasergroup">
<!--Prehead-->
<g class="block" typeof="prehead">
    <text transform="matrix(1 0 0-1 0 378.19)" font-
size="7.97"    font-family="F13"    fill="rgb(0,0,0)"    fill-
rule="evenodd" x="501.2571 507.4896 510.5979 515.9696
524.625">VIEWS</text>
</g>
<!-Teaser 1-->
<g class="flow" typeof="teaser">
...
</g>
<!--Teaser 2-->
<g class="flow" typeof="teaser">
...
</g>
</g>
```

Teaser Flow

```
<!-- Teaser (G.M. RESIZED: LEANER AND MINUS PONTIAC) -->
<g class="flow" typeof="teaser">
<!-- Headline -->
<g class="block" typeof="headline">
    <text transform="matrix(1 0 0 -1.0204 0 1549.2684)"
font-size="18.5504" font-family="F10" fill="rgb(0,0,0)"
fill-rule="evenodd" x="671.3164 685.4301 690.4169 707.7399 0
716.2513 729.2891 741.1769 752.4894 758.6821 770.7366
782.6243 796.6823">G.M. RESIZED:</text>
    <text transform="matrix(1 0 0 -1.0204 0 1531.3354)"
font-size="18.5504" font-family="F10" fill="rgb(0,0,0)"
fill-rule="evenodd" x="671.3164 682.8144 694.7021 708.4077
722.8183 734.7061 0 751.2684 764.974 779.3846">LEANER
AND</text>
    <text transform="matrix(1 0 0 -1.0204 0 1513.4025)"
font-size="18.5504" font-family="F10" fill="rgb(0,0,0)"
fill-rule="evenodd" x="671.3164 688.6394 694.832 709.5024
723.746 0 738.5832 750.1182 764.7143 779.1249 791.4392
797.6318 811.3374">MINUS PONTIAC</text>
</g>
<!-- Continuation Link -->
<g class="block" typeof="continue">
    <text transform="matrix(1 0 0 -1 0 1497.9608)" font-
size="7.472" font-family="F11" fill="rgb(0,0,0)" fill-
rule="evenodd" x="671.3164 676.1633 681.3094 686.6494 0
692.8336 697.5758">PAGE 15</text>
</g>
<!-- Subhead -->
<g class="block" typeof="subhead">
    <text transform="matrix(1 0 0 -1 0 1497.9608)" font-
size="7.472" font-family="F4" fill="rgb(0,0,0)" fill-
rule="evenodd" x="711.6234 716.9435 722.4205 727.3969
729.915 735.5565 740.2933 745.1581 0 751.6293 758.5933
761.1115 765.632">BUSINESS WITH</text>
    <!-- Image Group -->
    <g class="block" typeof="imagegroup">
        <!-- Image -->
        <g class="block" typeof="image">
            <image xlink:href="/image/im_0.jpg"
width="92" height="16" x="773.2092" y="1503.4624"
transform="matrix(0.35735768 0 0 −0.33762264 0 0)"
pdf:Decode="0 1 0 1 0 1" color-profile="DeviceRGB"/>
        </g>
    </g>
<!-- Image Group -->
<g class="block" typeof="imagegroup">
    <!-- Image -->
    <g class="block" typeof="image">
        <image xlink:href="image/im_3.jpg" width="376"
height="184" x="838.079" y="1563.7814"
transform="matrix(0.35931882 0 0 −0.35998145 0 0)"
pdf:Decode="0 1 0 1 0 1" color-profile="DeviceRGB"/>
    </g>
</g>
</g>
```

Article Flow

```
<!-- Article (Travel curb surged as flu outbreak widens) -->
<g class="flow" typeof="article">
<!-- Image Group -->
<g class="block" typeof="imagegroup">
    <!-- Image -->
    <g class="block" typeof="image">
        <image xlink:href="/image/im_5.jpg" width="1761"
height="1155" x="339.697" y="1283.4017"
transform="matrix(0.3598648 0 0 −0.35992101 0 0)"
pdf:Decode="0 1 0 1 0 1" color-profile="DeviceRGB"/>
    </g>
    <!-- Image Credit-->
    <g class="block" typeof="imagecredit">
        <text transform="matrix(1 0 0 −1 0 861.931)" font-
size="4.483" font-family="F1" fill="rgb(0,0,0)" fill-
rule="evenodd" x="870.581 873.8196 876.8745 879.7994
883.1771 886.2767 0 890.6362 893.7359 897.1987 900.5226
903.6223 905.153 908.4902 911.8679 914.6851 0 917.5427 0
919.8042 922.7291 926.2591 0 929.973 932.2116 935.863
938.5144 941.9772 944.9693 946.4999 949.4472 952.3721
955.1893 0 959.4098 962.1643 965.264 968.0813
970.7327">ARTURO RODRIGUEZ / THE ASSOCIATED
PRESS</text>
    </g>
    <!-- Image Caption-->
    <g class="block" typeof="imagecaption">
        <text transform="matrix(1 0 0 −1 0 852.103)" font-
size="7.87" font-family="F14" fill="rgb(0,0,0)" fill-
rule="evenodd" x="339.697 344.7428 346.9869 349.2153 353.293
```

355.9622 0 361.2834 365.2747 368.6678 372.0609 374.2736
378.3907 380.6348 385.1375 0 391.0727 393.3168 0 399.514
406.5744 410.566 414.9429 418.336 420.5802 0 426.6491
430.7268 0 436.922 443.9825 448.061 452.5638 456.9406
460.862 464.3495 0 468.018 472.0093 0 477.3306 481.9278
486.3047 490.2959 492.5401 0 498.7348 503.0566 507.0242
510.6061 514.5974 521.3746 0 527.0342 529.7034 534.1746 0
539.8361 542.4101 544.6541 547.9844 551.6141 0 555.9752
559.6122 563.69 568.1613 572.6639 575.3331 578.7262 0
584.5354 588.6131 593.0844 595.7535 599.3827 601.6268
606.0037 0 611.6651 617.4348 621.5131 624.9063 627.5754 0
633.7386 638.8553 645.6324 649.6 652.9932 655.2373 658.8192
0 664.5026 667.1716 0 672.9415 676.5785 680.6562 685.1589
687.7335 689.9776 693.3707 0 701.84 0 707.5251 711.1074
715.0991 718.7283 0 724.388 728.4657 0 732.693 736.3222
742.218 744.462 748.9648 0 754.6251 757.2618 759.4901
763.9614 0 767.6301 772.684 0 777.0451 779.2735 783.2411
787.2324 790.8616 0 795.2228 798.3641 802.0876 0 807.6844
812.0613 816.0289 820.1066 824.4835 826.7119 0 832.3715
836.3628 839.6851 0 845.3448 848.0139 852.4851 856.5629
861.0341 865.2772 869.7485 0 874.1096 876.7787 0 882.5485
887.0198 890.9431 895.0214 0 900.6811 905.058 907.3021
911.2697 0 917.3386 921.4164 0 925.6441 928.281 930.5101 0
936.6735 938.9175 0 945.1121 952.1725 956.1411 960.3291
962.5732 966.2102 970.288">Pilots arriving in Madrid on
Monday, as Spain became the first country outside North
America to confirm a case of swine flu. At least 149 people
are thought to have died of flu in Mexico.</text>
    </g>
</g>
<!-- Headline -->
<g class="block" typeof="headline">
    <text transform="matrix(1 0 0 -1 0 1302.464)" font-
size="39.851" font-family="F13" fill="rgb(0,0,0)" fill-
rule="evenodd" x="339.697 359.4245 372.695 390.1109 407.168
423.8663 0 440.6446 455.709 475.8746 489.1458 508.4747 0
530.3541 550.5197 563.791 581.0074 597.7057 0 624.9247
642.3406 0 664.218 675.2977 684.464 0 712.2411 730.3746
750.5402 761.3809 780.7098 793.981 810.6793 828.0952 0
854.5571 880.7001 890.0663 909.6737 926.372 946.8168">Travel
curbs urged as flu outbreak widens</text>
    </g>
<!--Dateline -->
<g class="block" typeof="dateline">
    <text transform="matrix(1 0 0 -1 0 819.824)" font-
size="7.472" font-family="F18" fill="rgb(0,0,0)" fill-
rule="evenodd" x="339.697 346.6559 351.6498 356.5615
362.0783 364.6811 370.257 375.3858 379.76
385.2844">WASHINGTON</text>
    </g>
<!-- Byline -->
<g class="block" typeof="byline">
    <text transform="matrix(1 0 0 -1 0 800.247)" font-
size="7.671" font-family="F16" fill="rgb(0,0,0)" fill-
rule="evenodd" x="339.697 345.0437 0 352.0627 357.4095
362.8712 365.9243 371.3477 0 379.2104 384.7489 390.8857
396.3475 403.7807 408.2376 413.147 418.6088">BY BRIAN
KNOWLTON</text>
    <text transform="matrix(1 0 0 -1 0 790.583)" font-
size="7.671" font-family="F16" fill="rgb(0,0,0)" fill-
rule="evenodd" x="339.697 345.1204 351.2572 0 358.8362
364.2826 367.3357 372.2988 377.2082 382.67 388.1318 391.1848
0 398.3342 403.6809 409.5799 415.0417 421.1785 426.5406
431.6418">AND VICTORIA BURNETT</text>
    </g>
<!-- Article Text -->
<g class="block" typeof="articletext">
    <g class="block" typeof="para">
      <text transform="matrix(1 0 0 -1 0 774.877)" font-
size="8.468" font-family="F16" fill="rgb(0,0,0)" fill-
rule="evenodd" x="339.697 345.6839 0 354.8632 359.69
364.0087 368.5136 370.8253 373.7723 0 383.8154 388.2357
390.975 393.6926 396.039 400.0952 402.4408 406.9457 409.2574
0 418.4368 422.9417 426.5745 430.9948 435.8131 440.6907 0
450.6829 453.6298 458.4566 0 467.9916 472.7336 475.0453
479.4657 484.1824">As health officials around the
globe</text>
      <text transform="matrix(1 0 0 -1 0 765.213)" font-
size="8.468" font-family="F16" fill="rgb(0,0,0)" fill-
rule="evenodd" x="339.698 343.661 348.0813 352.8996 357.6417

362.4685 0 368.176 371.1229 0 378.3038 382.36 386.7803
391.658 394.5456 399.0506 401.3961 0 409.0343 0 416.2998
418.9756 423.4806 427.4437 430.3906 433.0073 436.9703
441.7631 445.3705 449.6891 454.1941 458.97 461.3156 466.1932
0 473.6958 478.1161 482.9344 485.8813">sought to contain a
fast-spreading out-</text>
      <text transform="matrix(1 0 0 -1 0 755.549)" font-
size="8.468" font-family="F16" fill="rgb(0,0,0)" fill-
rule="evenodd" x="339.698 344.4147 348.022 352.3407 356.8456
0 363.7979 368.2182 0 373.155 377.118 383.7231 386.0686
390.9462 0 397.532 400.3174 402.629 407.4473 0 411.7406
414.6875 419.5143 0 426.0939 432.0131 436.8314 440.4641
444.8845 449.6773 453.9959 458.5009 0 465.644 471.9865
476.864 479.2096 483.6299">break of swine flu, the European
Union</text>
      <text transform="matrix(1 0 0 -1 0 745.885)" font-
size="8.468" font-family="F16" fill="rgb(0,0,0)" fill-
rule="evenodd" x="339.698 344.5248 348.8434 353.3484
355.6601 358.6071 0 365.7626 369.8188 374.2391 381.6401
389.041 391.3866 395.2904 399.2534 401.599 406.0193 410.8969
415.2156 0 421.2278 425.6481 0 432.867 440.7083 445.129
450.0066 454.7825 459.212 0 466.3022 471.121 474.6691
479.411 483.7296">health commissioner on Monday urged</text>
      <text transform="matrix(1 0 0 -1 0 736.221)" font-
size="8.468" font-family="F16" fill="rgb(0,0,0)" fill-
rule="evenodd"0 x="339.698 345.6172 350.4355 354.0682
358.4886 363.2814 367.6 372.105 376.9826 0 382.4698 385.4168
0 391.355 395.7843 400.485 404.9053 407.2509 0 413.5511
416.498 420.043 424.4723 429.173 433.4917 435.8034 438.149
443.0266 0 449.2929 452.2398 0 458.1844 462.6893 465.4244
468.1003 472.4189 476.4751 479.422 483.7407">Europeans to
avoid traveling to affected</text>
      <text transform="matrix(1 0 0 -1 0 726.557)" font-
size="8.468" font-family="F16" fill="rgb(0,0,0)" fill-
rule="evenodd" x="339.699 344.4919 348.9968 352.6804
355.6273 0 361.4702 365.8906 0 370.4463 373.3932 378.2201 0
384.422 390.7645 395.642 397.9876 400.9345 405.2532 0
411.909 416.8035 419.6912 424.1961 427.143 431.4617 0
437.3046 441.7249 0 447.291 455.1323 459.451 464.1592
466.5048 470.561 0 476.8612 481.1799 485.8881">parts of the
United States or Mexico ex-</text>
<text transform="matrix(1 0 0 -1 0 716.893)" font-
size="8.468" font-family="F16" fill="rgb(0,0,0)" fill-
rule="evenodd" x="339.698 343.7542 348.0729 352.8657 0
357.5062 361.9265 0 368.4978 373.316 376.8641 381.6062
385.9248 390.8024 0 395.4429 400.1597 404.978 408.941
411.2866 416.1642 420.4828 424.3866 428.3496">cept on urgent
business.</text>
    </g>
    <g class="block" typeof="para">
      <text transform="matrix(1 0 0 -1 0 707.229)" font-
size="8.468" font-family="F16" fill="rgb(0,0,0)" fill-
rule="evenodd" x="347.668 353.6549 361.0559 365.3745
369.0581 371.4037 375.4006 379.9055 0 387.1203 391.5406
394.279 396.9967 399.343 403.3992 405.7448 410.2498 412.5615
0 418.8617 422.8247 427.3297 429.6753 0 436.7883 439.7353
444.5621 0 451.2179 457.1371 461.9554 465.5881 470.0085
474.8013 479.1199 483.62499">American officials said the
European</text>
      <text transform="matrix(1 0 0 -1 0 697.565)" font-
size="8.468" font-family="F16" fill="rgb(0,0,0)" fill-
rule="evenodd" x="339.698 346.2613 350.766 354.4496 359.3272
361.6728 366.5504 0 377.55 384.1133 388.618 0 398.8389
403.6572 408.475 415.0382 419.543 423.2266 426.7746 431.2796
436.1572 439.1041 443.4228 448.1987 0 456.4889 462.3911
467.2094 0 476.4142 479.3611 484.188">warning was
unwarranted. But the</text>
      <text transform="matrix(1 0 0 -1 0 687.901)" font-
size="8.468" font-family="F16" fill="rgb(0,0,0)" fill-
rule="evenodd" x="339.697 344.5915 347.4792 351.9841
354.9311 0 362.4506 368.9117 373.2303 378.0232 382.5281
386.2117 389.1586 396.5596 400.8782 405.7558 0 411.9036
414.2154 418.7203 421.6672 425.9859 0 432.8703 435.2159
439.1197 443.0827 447.901 452.2197 0 460.1965 462.5421
465.489 0 472.644 477.0224 483.6279">State Department later
issued its own</text>
      <text transform="matrix(1 0 0 -1 0 823.194)" font-
size="8.468" font-family="F16" fill="rgb(0,0,0)" fill-
rule="evenodd" x="501.257 505.7619 510.5379 515.2799
517.6255 521.5886 526.0089 529.6924 0 537.0765 541.5814

-continued

```
546.2727 550.7776 553.1232 558.0009 561.9639 0 567.5359
572.4135 576.8338 581.7114 586.03 589.9338 593.8969 598.2155
603.0931 606.04 608.3856 612.8906 0 617.8273 620.7743
624.317 628.7463 633.447 637.7656 0 642.7025
645.6494">advisory against nonessential travel to</text>
    <text transform="matrix(1 0 0 -1 0 813.53)" font-
size="8.468" font-family="F16" fill="rgb(0,0,0)" fill-
rule="evenodd" x="501.258 509.0993 513.418 518.1261 520.4716
524.5278 528.9481">Mexico.</text>
  </g>
</g>
<!-- Continuation Link -->
<g class="block" typeof="continue">
    <text transform="matrix(1 0 0 -1 0 765.351)" font-
size="6.974" font-family="F17" fill="rgb(0,0,0)" fill-
rule="evenodd" x="824.379 828.8005 832.936 838.124 0 841.869
845.9906 850.5229 855.7464 0 861.7091">FLU, PAGE 5</text>
  </g>
</g>
```

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for transforming content, comprising
receiving digital content at a content transformation system, wherein the digital content comprises one or more files, each file associated with a surface of the digital content and the surface of the digital content corresponds to a single page of the digital content;
creating, at the content transformation system, a container configured for storing the digital content;
storing, at the content transformation system, each of the one or more files in a first directory of the container;
obtaining, at the content transformation system, a set of artifacts for each surface and a set of associations between the set of artifacts, wherein each of the set of artifacts is associated with an area of a visual representation of the surface;
creating, at the content transformation system, a structured representation of the set of artifacts for each surface, wherein creating the structured representation for a surface comprises extracting the content of each of the set of artifacts from the file associated with that surface, and each artifact is extracted based on the association between the artifact and the visual representation of the surface;
creating, at the content transformation system, a first metadata file for associated with each surface, wherein the first metadata file describes the association between the artifacts within that surface;
storing, at the content transformation system, the structured representation and the first metadata file for each surface in a second directory of the container corresponding to that surface;
creating, at the content transformation system, a second metadata file for the digital content, wherein the second metadata file describes the association between one or more artifacts on different surfaces; and
storing, at the content transformation system, the second metadata file in the container.

2. The method of claim 1, further comprising:
receiving a manifest describing the set of files; and
validating the one or more files based on the manifest.

3. The method of claim 2, further comprising creating one or more additional files from the one or more files based on the manifest.

4. The method of claim 1, further comprising creating a third metadata file describing where each surface exists in the container and a location of each artifact within the container.

5. The method of claim 1, wherein the set of artifacts is associated with an area of the visual representation of the surface by identifying an area of the visual representation of the surface comprising the artifact and associating a type with the artifact.

6. The method of claim 1, further comprising verifying the structured representation using a visual representation of the surface.

7. The method of claim 1, wherein the structured representation of each surface is a structure vector graphic (SVG) format.

8. A system for transforming content, comprising
a content transformation system coupled to one or more content publishers over a network, the content transformation system including:
a processor, and
a non-transitory computer readable medium comprising instructions executable for:
receiving digital content, wherein the digital content comprises one or more files, each file associated with a surface of the digital content and the surface of the digital content corresponds to a single page of the digital content;

creating a container configured for storing the digital content;

storing each of the one or more files in a first directory of the container;

obtaining a set of artifacts for each surface and a set of associations between the set of artifacts, wherein each of the set of artifacts is associated with an area of a visual representation of the surface;

creating a structured representation of the set of artifacts for each surface, wherein creating the structured representation for a surface comprises extracting the content of each of the set of artifacts from the file associated with that surface, and each artifact is extracted based on the association between the artifact and the visual representation of the surface;

creating a first metadata file for associated with each surface, wherein the first metadata file describes the association between the artifacts within that surface;

storing the structured representation and the first metadata file for each surface in a second directory of the container corresponding to that surface;

creating a second metadata file for the digital content, wherein the second metadata file describes the association between one or more artifacts on different surfaces; and storing the second metadata file in the container.

9. The system of claim 8, the computer readable medium further comprising instructions for:
receiving a manifest describing the set of files; and
validating the one or more files based on the manifest.

10. The system of claim 9, the computer readable medium further comprising instructions for creating one or more additional files from the one or more files based on the manifest.

11. The system of claim 8, the computer readable medium further comprising instructions for creating a third metadata file describing where each surface exists in the container and a location of each artifact within the container.

12. The system of claim 8, wherein the set of artifacts is associated with an area of the visual representation of the surface by identifying an area of the visual representation of the surface comprising the artifact and associating a type with the artifact.

13. The system of claim 8, the computer readable medium further comprising instructions for verifying the structured representation using a visual representation of the surface.

14. The system of claim 8, wherein the structured representation of each surface is a structure vector graphic (SVG) format.

15. A non-transitory computer readable medium, comprising instructions for:
receiving digital content, wherein the digital content comprises one or more files, each file associated with a surface of the digital content and the surface of the digital content corresponds to a single page of the digital content;

creating a container configured for storing the digital content;

storing each of the one or more files in a first directory of the container;

obtaining a set of artifacts for each surface and a set of associations between the set of artifacts, wherein each of the set of artifacts is associated with an area of a visual representation of the surface;

creating a structured representation of the set of artifacts for each surface, wherein creating the structured representation for a surface comprises extracting the content of each of the set of artifacts from the file associated with that surface, and each artifact is extracted based on the association between the artifact and the visual representation of the surface;

creating a first metadata file associated with each surface, wherein the first metadata file describes the association between the artifacts within that surface;

storing the structured representation and the first metadata file for each surface in a second directory of the container corresponding to that surface;

creating a second metadata file the digital content, wherein the second metadata file describes the association between one or more artifacts on different surfaces; and storing the second metadata file in the container.

16. The computer readable medium of claim 15, the computer readable medium further comprising instructions for:
receiving a manifest describing the set of files; and
validating the one or more files based on the manifest.

17. The computer readable medium of claim 16, the computer readable medium further comprising instructions for creating one or more additional files from the one or more files based on the manifest.

18. The computer readable medium of claim 15, the computer readable medium further comprising instructions for creating a third metadata file describing where each surface exists in the container and a location of each artifact within the container.

19. The computer readable medium of claim 15, wherein the set of artifacts is associated with an area of the visual representation of the surface by identifying an area of the visual representation of the surface comprising the artifact and associating a type with the artifact.

20. The computer readable medium of claim 15, the computer readable medium further comprising instructions for verifying the structured representation using a visual representation of the surface.

21. The computer readable medium of claim 15, wherein the structured representation of each surface is a structure vector graphic (SVG) format.

* * * * *